US 9,310,530 B2

(12) United States Patent
Morioka

(10) Patent No.: US 9,310,530 B2
(45) Date of Patent: Apr. 12, 2016

(54) LENS ARRAY AND OPTICAL MODULE PROVIDED THEREWITH

(75) Inventor: Shimpei Morioka, Kawaguchi (JP)

(73) Assignee: ENPLAS CORPORATION, Kawaguchi-Shi (JP)

(*) Notice: Subject to any disclaimer, the term of this patent is extended or adjusted under 35 U.S.C. 154(b) by 120 days.

(21) Appl. No.: 14/122,224

(22) PCT Filed: Jun. 7, 2012

(86) PCT No.: PCT/JP2012/064686
§ 371 (c)(1),
(2), (4) Date: Nov. 25, 2013

(87) PCT Pub. No.: WO2012/169587
PCT Pub. Date: Dec. 13, 2012

(65) Prior Publication Data
US 2014/0110570 A1    Apr. 24, 2014

(30) Foreign Application Priority Data

Jun. 9, 2011  (JP) .................................. 2011-129150
Jun. 9, 2011  (JP) .................................. 2011-129151
Jul. 12, 2011 (JP) .................................. 2011-153818

(51) Int. Cl.
G02B 6/26    (2006.01)
G02B 3/00    (2006.01)
(Continued)

(52) U.S. Cl.
CPC ............ *G02B 3/0068* (2013.01); *G01J 1/0411* (2013.01); *G02B 6/425* (2013.01); *G02B 6/4214* (2013.01); *G02B 6/4286* (2013.01)

(58) Field of Classification Search
CPC .. G02B 6/4292; G02B 6/4204; G02B 6/4246; G02B 6/36

USPC .................. 385/15, 31, 33, 53, 88, 92, 93, 94
See application file for complete search history.

(56) References Cited

U.S. PATENT DOCUMENTS 5,500,523 A *  3/1996  Hamanaka ..................... 250/216
8,787,714 B2 * 7/2014  Morioka ........................... 385/33
(Continued)

FOREIGN PATENT DOCUMENTS

JP    2006-520491 A    9/2006
JP    2006-344915 A    12/2006
(Continued)

OTHER PUBLICATIONS

International Search Report (ISR) mailed Aug. 28, 2012, issued for International application No. PCT/JP2012/064686.

*Primary Examiner* — Jennifer Doan
(74) *Attorney, Agent, or Firm* — Law Office of Katsuhiro Arai

(57) ABSTRACT

A lens array has structures in which light of each light-emitting element in plural rows that has been incident on first lens faces in plural rows on a first plate-shaped portion is totally reflected by a second prism surface. The light of each light-emitting element is then divided by a reflection/transmission layer on a third prism surface to a side of second lens faces in plural rows on a second plate-shaped portion and a side of third lens faces in plural rows on the first plate-shaped portion. The light of each light-emitting element transmitted to the second lens face side is emitted by the second lens faces towards a side of end faces of an optical transmission body, and monitor light of each light-emitting element reflected towards the third lens face side is emitted by the third lens faces towards a side of light-receiving elements.

19 Claims, 18 Drawing Sheets

(51) Int. Cl.
*G02B 6/42* (2006.01)
*G01J 1/04* (2006.01)

(56) References Cited

U.S. PATENT DOCUMENTS

2004/0179784 A1 9/2004 Vancoille et al.
2010/0295063 A1 11/2010 Morioka

FOREIGN PATENT DOCUMENTS

| | | |
|---|---|---|
| JP | 2010-262222 A | 11/2010 |
| JP | 2011-133807 A | 7/2011 |
| JP | 2011-141478 A | 7/2011 |
| JP | 2011-211152 A | 10/2011 |
| WO | 2011/077723 A1 | 6/2011 |

* cited by examiner

LENS ARRAY AND OPTICAL MODULE PROVIDED THEREWITH

TECHNICAL FIELD

The present invention relates to a lens array and an optical module including the lens array. In particular, the present invention relates to a lens array suitable for optically coupling a plurality of light-emitting elements and end faces of an optical transmission body, and an optical module including the lens array.

BACKGROUND ART

In recent years, the application of so-called optical interconnection has become wide-spread as a technology for transmitting signals at high speed within a system device, between devices, or between optical modules. Here, optical interconnection refers to a technology in which optical components are handled as if they are electronic components, and are mounted on motherboards, circuit boards, and the like used in personal computers, vehicles, optical transceivers, and the like.

An optical module used in optical interconnection such as this serves various purposes, such as internal connection for media converters and switching hubs, and in-device and inter-device component connection for optical transceivers, medical equipment, testing devices, video systems, high-speed computer clusters, and the like.

As an optical component applied to this type of optical module, there is an increasing demand for a lens array in which a plurality of lenses having a small diameter are disposed in an array, as a compactly structured component effective for actualizing multichannel optical communication.

Here, the lens array is conventionally configured such that a photoelectric conversion device including a plurality of light-emitting elements (such as a vertical cavity surface emitting laser [VCSEL]) can be attached thereto, and a plurality of optical fibers serving as an optical transmission body can be attached thereto.

In a state in which the lens array is disposed between the photoelectric conversion device and the plurality of optical fibers in this way, the lens array optically couples light emitted from each light-emitting element of the photoelectric conversion device with an end face of each optical fiber. As a result, multichannel optical transmission can be performed.

In addition, among photoelectric conversion devices, there is a photoelectric conversion device that includes, together with the light-emitting elements, light-receiving elements that receive light including communication information that is carried through the optical fibers and emitted from the end faces of the optical fibers, to support optical transmission and reception (bidirectional communication). A lens array supporting a photoelectric conversion device such as this couples the light emitted from the end faces of the optical fibers with the light-receiving elements.

Furthermore, among photoelectric conversion devices, there is a photoelectric conversion device that includes monitor light-receiving elements that are used to monitor light (particularly intensity or amount of light) emitted from the light-emitting elements, to stabilize output characteristics of the light-emitting elements. A lens array supporting a photoelectric conversion device such as this reflects a portion of the light emitted from the light-emitting elements towards the monitor light-receiving element side as monitor light.

As a lens array supporting optical transmission and reception that includes a reflection function for generating the monitor light such as this, the inventors of the present invention have made proposals in the past, such as that in Patent Literature 1.

PRIOR ART LITERATURES

Patent Literature

Patent Literature 1: Japanese Patent Laid-open Publication No. 2010-262222

SUMMARY OF INVENTION

Problem to be Solved by the Invention

A lens array described in Patent Literature 1 is capable of obtaining monitor light with certainty by separating the light emitted from the light-emitting elements into light to be coupled with the end faces of the optical fibers and the monitor light, using transmittance and Fresnel reflection at a reflection/transmission surface.

In addition, in the lens array described in Patent Literature 1, a lens array main body is configured such as to be divided into an area for optical transmission (in other words, an area in which the reflection/transmission surface and lens faces for transmission are formed) and an area for optical reception (in other words, an area in which the reflection/transmission surface is not formed and lens faces for reception are formed) in an array direction of the lens faces. Components for optical transmission are positioned outside of an optical path for optical reception (see configurations in FIG. 11 to FIG. 15 of Patent Literature 1). As a result, unlike instances in which the components (reflection/transmission surface) for optical transmission are positioned not only on an optical path for optical transmission but also on the optical path for optical reception, when designing the optical path for optical reception, changes (such as refraction) in the traveling direction of light for optical reception caused by the components for optical transmission are not required to be considered. An optical path that is specific to optical reception can be easily designed.

As a result of keen research into discovering further additional value while keeping in mind such merits of the lens array described in Patent Literature 1, the inventors of the present invention have achieved the present invention that is more suitable for effectively obtaining the monitor light, reducing size, and increasing channels.

The present invention has been achieved in light of the above-described issues. An object of the present invention is to provide a lens array supporting optical transmission and reception that is capable of efficiently obtaining monitor light, and achieving further size reduction and more channels, and an optical module including the lens array.

Means for Solving Problem

To achieve the above-described object, a lens array according to claim 1 is a lens array disposed between a photoelectric conversion device and an optical transmission body, which lens array is capable of optically coupling a plurality of light-emitting elements and an end face of the optical transmission body, in which photoelectric conversion device the plurality of light-emitting elements and a plurality of light-receiving elements are formed, the plurality of light-receiving elements each receiving, respectively, monitor light of each light-emitting element for monitoring light emitted from the plurality of light-emitting elements. As the photoelectric conversion device, a photoelectric conversion device is disposed in which a row of the light-emitting elements formed by the plurality of light-emitting elements being arrayed along a predetermined first direction are arrayed in parallel in a plurality of rows along a predetermined second direction that is perpendicular to the first direction. In addition, a row of the light-receiving elements formed by the plurality of light-receiving elements being arrayed along the first direction in a position on the second direction side and the optical transmission body side in relation to the light-emitting elements in the plurality of rows are arrayed in parallel in a plurality of rows along the second direction. The lens array includes: a first plate-shaped portion of a lens array main body that faces the photoelectric conversion device in a third direction perpendicular to the first direction and the second direction; a second plate-shaped portion of the lens array main body that is connected to an end portion of the first plate-shaped portion on the second direction side and the optical transmission body side, faces the end face of the optical transmission body in the second direction, and has a same refractive index as the first plate-shaped portion; first lens faces in a plurality of rows, in which a plurality of first lens faces are formed in an array along the first direction on a first surface of the first plate-shaped portion facing the photoelectric conversion device and the first lens faces are formed in a plurality of rows in parallel along the second direction, each on which the light emitted from each light-emitting element in the plurality of rows is incident; second lens faces in a plurality of rows, in which a plurality of second lens faces are formed in an array along the first direction on a second surface of the second plate-shaped portion facing the end face of the optical transmission body and the second lens faces are formed in a plurality of rows in parallel along the third direction, each emitting the light of each light-emitting element in the plurality of rows that has been incident on each first lens face in the plurality of rows towards the end face of the optical transmission body; third lens faces in a plurality of rows, in which a plurality of third lens faces are formed in an array along the first direction on the first surface in a position on the second direction side and the second plate-shaped portion side in relation to the first lens faces in the plurality of rows and the third lens faces are formed in a plurality of rows in parallel along the second direction, each emitting the monitor light of each light-emitting element in the plurality of rows that has been incident from an inner side of the first plate-shaped portion towards the light-receiving elements in the plurality of rows; a prism that is disposed such as to provide a predetermined gap on the third direction side and the photoelectric conversion device side in relation to a third surface on a side opposite to the first surface of the first plate-shaped portion, and forms an optical path of the light of each light-emitting element in the plurality of rows after being incident on the first lens faces in the plurality of rows; a first prism surface that forms a portion of a surface of the prism and is disposed in a position facing the third surface, on which the light of each light-emitting element in the plurality of rows that has been incident on the first lens faces in the plurality of rows is incident; a second prism surface that forms a portion of the surface of the prism, has a predetermined slope angle in relation to the first prism surface such as to slope towards the second plate-shaped portion side as the second prism surface becomes farther from the first prism surface, and totally reflects the light of each light-emitting element in the plurality of rows that has been incident on the first prism surface towards the second lens faces in the plurality of rows; a third prism surface that forms a portion of the surface of the prism, has a predetermined slope angle in relation to the first prism surface such as to slope towards a side opposite to the second plate-shaped portion as the third prism surface becomes farther from the first prism surface, on which the light of each light-emitting element in the plurality of rows that has been totally reflected by the second prism surface is incident; a reflection/transmission layer formed on the third prism surface that reflects the light of each light-emitting element in the plurality of rows that has been incident on the third prism surface towards a side of the third lens faces in the plurality of rows as the monitor light of each light-emitting element in the plurality of rows at a predetermined reflectance, and transmits the light of each light-emitting element in the plurality of rows towards the side of the second lens faces in the plurality of rows at a predetermined transmittance; a first filler material that fills an area between the third surface and the first prism surface; and a second filler material that fills an area between the reflection/transmission layer and a fourth surface of the second plate-shaped portion on a side opposite to the second surface, and of which a refractive index difference with the prism is a predetermined value or less.

In the invention according to claim 1, the light of each light-emitting element in the plurality of rows that has been incident on the first lens faces in the plurality of rows is totally reflected by the second prism surface. Thereafter, the light of each light-emitting element in a plurality of rows is divided by the reflection/transmission layer to the side of the second lens faces in the plurality of rows and the side of the third lens faces in the plurality of rows. The light of each light-emitting element in the plurality of rows that has been divided to the side of the second lens faces in the plurality of rows can be emitted by the second lens faces in the plurality of rows towards the side of the end face of the optical transmission body. In addition, the monitor light of each light-emitting element in the plurality of rows that has been divided with sufficient reflectance to the side of the third lens faces in the plurality of rows can be emitted by the third lens faces in the plurality of rows towards the side of the light-receiving elements in the plurality of rows. As a result, optical coupling between the light-emitting elements in the plurality of rows and the end face of the optical transmission body can be appropriately performed, and monitor light can be efficiently obtained with certainty. In addition, as a result of a total reflection function (second prism surface) and a light-dividing function (reflection/transmission layer) being concentrated in positions near each other on a single component (prism), a compact and simple design can be achieved. Furthermore, as a result of the prism and the second filler material being formed such that the difference in refractive index is a predetermined value or less, linearity between an optical path between the second prism surface and the third prism surface and an optical path within the second filler material can be ensured. Therefore, in an instance in which the light incident on the second lens faces in the plurality of rows is confirmed to be misaligned from the center of each lens face during product inspection, the areas requiring size adjustment to resolve the misalignment can be reduced. Moreover, this configuration can contribute to facilitation of manufacturing.

In addition, a lens array according to claim 2 is the lens array according to claim 1 in which, further, the third surface is formed such as to be perpendicular to an optical axis of the first lens faces in the plurality of rows. The first prism surface is disposed in parallel with the third surface.

In the invention according to claim 2, the light of each light-emitting element in the plurality of rows can be perpendicularly incident on the first filler material and the first prism surface. Therefore, a simple design can be achieved in which linearity of an optical path between the first lens faces in the plurality of rows and the second prism surface can be ensured. In addition, the degree of freedom in the selection of materials (refractive index) for the lens array main body, the first filler material, and the prism can be widened.

Furthermore, a lens array according to claim 3 is the lens array according to claim 1 or 2 in which, further, a refractive index difference between the lens array main body and the first filler material is a predetermined value or less.

In the invention according to claim 3, because refraction and Fresnel reflection of the light of each light-emitting element in the plurality of rows at the boundary between the third surface and the first filler material can be suppressed, a simple design can be performed in which linearity of an optical path before and after the third surface is ensured without being restricted by the linearity between the third surface and the optical axis of the first lens faces in the plurality of rows. In addition, generation of stray light that is a hindrance to optical transmission and monitoring can be suppressed.

Still further, a lens array according to claim 4 is the lens array according to any one of claims 1 to 3 in which, further, a refractive index difference between the first filler material and the prism is a predetermined value or less.

In the invention according to claim 4, because refraction and Fresnel reflection of the light of each light-emitting element in the plurality of rows at the boundary between the first filler material and the first prism surface can be suppressed, a simple design can be performed in which linearity of an optical path before and after the first prism surface is ensured without being restricted by the linearity between the first prism surface and the optical axis of the first lens faces in the plurality of rows. In addition, generation of stray light that is a hindrance to optical transmission and monitoring can be suppressed.

In addition, a lens array according to claim 5 is the lens array according to any one of claims 1 to 4 in which, further, the fourth surface is formed such as to be perpendicular to an optical axis of the second lens faces in the plurality of rows, and such that the light of each light-emitting element in the plurality of rows that has passed through the reflection/transmission layer is perpendicularly incident from the second filler material side.

In the invention according to claim 5, a simple design can be achieved in which linearity of an optical path before and after the fourth surface is ensured. In addition, the degree of freedom in the selection the materials (refractive index) for the lens array main body and the second filler material can be widened.

In addition, a lens array according to claim 6 is the lens array according to any one of claims 1 to 5 in which, further, a refractive index difference between the second filler material and the lens array main body is a predetermined value or less.

In the invention according to claim 6, because refraction and Fresnel reflection of the light of each light-emitting element in the plurality of rows at the boundary between the second filler material and the fourth surface can be suppressed, a simple design can be performed in which linearity of an optical path before and after the fourth surface is ensured without being restricted by the linearity between the fourth surface and the optical axis of the second lens faces in the plurality of rows. In addition, generation of stray light that is a hindrance to optical transmission and monitoring can be suppressed.

Furthermore, a lens array according to claim 7 is the lens array according to any one of claims 1 to 6 in which, further, the third surface is a recessing plane that is formed in a recessing manner such as to ensure space to be filled with the first filler material.

In the invention according to claim 7, a stable filling space for the first filler material can be easily ensured by the third surface being formed into the recessing plane.

In addition, a lens array according to claim 8 is the lens array according to any one of claims 1 to 6 in which, further, the first prism surface is a recessing plane that is formed in a recessing manner such as to ensure space to be filled with the first filler material.

In the invention according to claim 8, a stable filling space for the first filler material can be easily ensured by the first prism surface being formed into the recessing plane.

Furthermore, a lens array according to claim 9 is the lens array according to any one of claims 1 to 8 in which, further, the first filler material and the second filler material are composed of a light-transmitting adhesive. The prism is adhered to the lens array main body by the first and second filler materials.

In the invention according to claim 9, as a result of the filler material also serving as an adhesive, the prism can be stably held and the number of components can be reduced.

Still further, a lens array according to claim 10 is the lens array according to any one of claims 1 to 9 in which, further, the first filler material and the second filler material are the same material.

In the invention according to claim 10, processes during assembly can be simplified, and easier manufacturing can be performed.

In addition, a lens array according to claim 11 is the lens array according to any one of claims 1 to 10 in which, further, the second prism surface is formed having a slope angle of 45° in relation to the first prism surface. The third prism surface is formed having a slope angle that is a right angle to the second prism surface and 45° in relation to the first prism surface.

In the invention according to claim 11, because the prism can be formed into an isosceles right triangle, measurement of the dimensional accuracy of the prism can be easily performed, and handleability can be improved.

In addition, a lens array according to claim 12 is the lens array according to any one of claims 1 to 11 in which, further, the prism has a wall portion for preventing leakage of the second filler material onto the second prism surface in a boundary position between the second prism surface and the third prism surface.

In the invention according to claim 12, leakage of the second filler material onto the second prism surface can be suppressed by the wall portion. Therefore, total reflection function of the second prism surface can be appropriately ensured.

Still further, a lens array according to claim 13 is the lens array according to any one of claims 1 to 12 in which, further, the prism has a projecting stepped portion for preventing leakage of the second filler material onto the second prism surface in an edge portion of the third prism surface.

In the invention according to claim 13, leakage of the second filler material onto the second prism surface can be suppressed by the projecting stepped portion. Therefore, total reflection function of the second prism surface can be appropriately ensured.

In addition, an optical module according to claim 14 includes a lens array according to any one of claims 1 to 13, and a photoelectric conversion device according to claim 1.

In the invention according to claim 14, optical coupling between the light-emitting elements in the plurality of rows and the end face of the optical transmission body can be appropriately performed and monitor light can be efficiently obtained with certainty. In addition, as a result of the total reflection function and the light-dividing function being concentrated in positions near each other on a single component, a compact and simple design can be achieved. Furthermore, linearity between an optical path between the second prism surface and the third prism surface and an optical path within the second filler material can be ensured. In an instance in which the light incident on the second lens faces in the plurality of rows is confirmed to be misaligned from the center of each lens face during product inspection, the areas requiring size adjustment to resolve the misalignment can be reduced. Therefore, this configuration can contribute to facilitation of manufacturing.

Furthermore, a lens array according to claim 15 is a lens array disposed between a first photoelectric conversion device for optical transmission and reception and an optical transmission body, which lens array is capable of optically coupling a plurality of light-emitting elements and an end face of the optical transmission body for optical transmission and is capable of optically coupling the end face of the optical transmission body and a plurality of second light-receiving elements for optical reception, in which first photoelectric conversion device the plurality of light-emitting elements, a plurality of first light-receiving elements, and the plurality of second light-receiving elements are formed. The plurality of first light-receiving elements each receive, respectively, monitor light of each light-emitting element for monitoring light emitted from the plurality of light-emitting elements. The plurality of second light-receiving elements receive light transmitted through the optical transmission body. As the first photoelectric conversion device, a first photoelectric conversion device is disposed in which the plurality of light-emitting elements are formed in an array along a predetermined first direction, the plurality of first light-receiving elements are formed in an array along the first direction in a position on a second direction side perpendicular to the first direction and the optical transmission body side in relation to the row of light-emitting elements, and the plurality of second light-receiving elements are formed in an array along the first direction in a position on the second direction side and a side opposite to the optical transmission body in relation to the row of first light-receiving elements. The lens array includes: a first plate-shaped portion of a lens array main body that faces the first photoelectric conversion device in a third direction perpendicular to the first direction and the second direction; a second plate-shaped portion of the lens array main body that extends from an end portion of the first plate-shaped portion on the second direction side and the optical transmission body side towards the third direction and a side opposite to the first photoelectric conversion device, faces the end face of the optical transmission body in the second direction, and has a same refractive index as the first plate-shaped portion; a plurality of first lens faces that are formed in an array along the first direction on a first surface of the first plate-shaped portion facing the first photoelectric conversion device, each on which the light emitted of each of the plurality of light-emitting elements is incident; a plurality of second lens faces that are formed in an array along the first direction on a second surface of the second plate-shaped portion facing the end face of the optical transmission body, each emitting the light emitted of each of the plurality of light-emitting elements that has been incident on each of the plurality of first lens faces towards the end face of the optical transmission body; a plurality of third lens faces that are formed in an array along the first direction on the first surface in a position on the second direction side and the second plate-shaped portion side in relation to the row of first lens faces, each emitting the monitor light of each of the plurality of light-emitting elements that has been incident from an inner side of the first plate-shaped portion towards the plurality of first light-receiving elements; a plurality of fourth lens faces that are formed in an array along the first direction on the second surface in a position on the third direction side in relation to the row of second lens faces, on which transmitted light emitted from the end face of the optical transmission body is incident; a plurality of fifth lens faces that are formed in an array along the first direction on the first surface in a position on the second direction side and a side opposite to the second plate-shaped portion in relation to the row of third lens faces, each emitting the transmitted light that has been incident on each of the plurality of fourth lens faces towards the plurality of second light-receiving elements; a prism that is disposed such as to provide a predetermined gap on the third direction side and a side opposite to the first photoelectric conversion device in relation to a third surface on a side opposite to the first surface of the first plate-shaped portion, and forms an optical path of the light of each of the plurality of light-emitting elements after being incident on the plurality of first lens faces and an optical path of the transmitted light after being incident on the plurality of fourth lens faces; a first prism surface that forms a portion of a surface of the prism and is disposed in a position facing the third surface, on which the light of each of the plurality of light-emitting elements after being incident on the plurality of first lens faces is incident, and that transmits the transmitted light that has been incident from the inner side of the prism and after being incident on the plurality of fourth lens faces towards the plurality of fifth lens faces side; a second prism surface that forms a portion of the surface of the prism, has a predetermined slope angle in relation to the first prism surface such as to slope towards the second plate-shaped portion side as the second prism surface becomes farther from the first prism surface, totally reflects the light of each of the plurality of light-emitting elements that has been incident on the first prism surface towards the plurality of second lens faces, and totally reflects the transmitted light that has been incident from the inner side of the prism and after being incident on the plurality of fourth lens faces and before being incident on the first prism surface towards the first prism surface; a third prism surface that forms a portion of the surface of the prism, has a predetermined slope angle in relation to the first prism surface such as to slope towards a side opposite to the second plate-shaped portion as the third prism surface becomes farther from the first prism surface, on which the light of each of the plurality of light-emitting elements that has been totally reflected by the second prism surface is incident from the inner side of the prism, and on which the transmitted light after being incident on the plurality of fourth lens faces and before being incident on the second prism surface is incident and that transmits the incident transmitted light towards the second prism surface; a reflection/transmission layer formed on the third prism surface over a predetermined area including an incidence position of the light of each of the plurality of light-emitting elements and excluding an incidence position of the transmitted light, that reflects the light of each of the plurality of light-emitting elements that has been incident on the third prism surface towards the plurality of third lens faces as the monitor light of each of the plurality of light-emitting elements at a predetermined reflectance, and transmits the light of each of the plurality of light-emitting elements towards the plurality of second lens faces side at a predetermined transmittance; a first filler material that fills an area between the third surface and the first prism surface; and a second filler material that fills an area between the third prism surface and a fourth surface of the second plate-shaped portion on a side opposite to the second surface, and of which a refractive index difference with the prism is a predetermined value or less.

In the invention according to claim 15, the light of each of the plurality of light-emitting elements that has been incident on the plurality of first lens faces are totally reflected by the second prism surface. Thereafter, the light of each of the plurality of light-emitting elements is divided by the reflection/transmission layer on the third prism surface towards the side of the plurality of second lens faces and the side of the plurality of third lens faces. Then, the light of each of the plurality of light-emitting elements that has been divided towards the side of the plurality of second lens faces can be emitted by the plurality of second lens faces towards the side of the end face of the optical transmission body. In addition, the monitor light of each of the plurality of light-emitting elements that has been divided towards the side of the plurality of third lens faces with sufficient reflectance can be emitted from the plurality of third lens faces towards the side of the plurality of first light-receiving elements. On the other hand, the light transmitted through the optical transmission body that has been incident on the plurality of fourth lens faces is transmitted through the area of the third prism surface on which the reflection/transmission layer is not formed. Thereafter, the transmitted light is totally reflected by the second prism surface towards the side of the plurality of fifth lens faces, and emitted by the plurality of fifth lens faces towards the side of the plurality of second light-receiving elements. As a result, optical coupling of the plurality of light-emitting elements and the end face of the optical transmission body for optical transmission can be appropriately performed, and the monitor light can be efficiently obtained with certainty. In addition, optical coupling of the end face of the optical transmission body and the plurality of second light-receiving elements for optical reception can be appropriately performed. In addition, as a result of a total reflection function (second prism surface) and a light-dividing function (reflection/transmission layer) being concentrated in positions near each other on a single component (prism), a compact and simple design can be achieved. Furthermore, the area for optical transmission and the area for optical reception are separated in a direction perpendicular to the array direction of the lens faces, and separation of the optical path for optical transmission and the optical path for optical reception can be selected by whether or not the reflection/transmission layer is formed. As a result, when more channels are achieved as in the present invention, excessive increase in the width of the lens array main body in the array directions of the lens faces can be suppressed. In addition, the optical path for optical reception can be disposed outside of the components (reflection/transmission layer) for optical transmission by a simple method. Therefore, a design that is compact while having multiple channels and a simple design for the optical path for optical reception can be achieved. In addition, as a result of the prism and the second filler material being formed such that the difference in refractive index is a predetermined value or less, linearity between the optical path between the second prism surface and the third prism surface and the optical path within the second filler material can be ensured. Therefore, in an instance in which the light incident on the plurality of second lens faces is confirmed to be misaligned from the center of each lens face during product inspection, the areas requiring size adjustment to resolve the misalignment can be reduced. Moreover, this configuration can contribute to facilitation of manufacturing.

In addition, a lens array according to claim 16 is the lens array according to claim 15 in which, further, in the first photoelectric conversion device, the row of second light-receiving elements is disposed in a position between the row of light-emitting elements and the row of first light-receiving elements, and the row of fifth lens faces is disposed in a position between the row of first lens faces and the row of third lens faces. In the second prism surface, a total-reflection position of the light of each of the plurality of light-emitting elements is set further to the first plate-shaped portion side than a total-reflection position of the transmitted light. In the third prism surface, an incidence position of the light of each of the plurality of light-emitting elements is set further to the first plate-shaped portion side than an incidence position of the transmitted light. The reflection/transmission layer is formed in part of an area of the third prism surface on the first plate-shaped portion side. The row of second lens faces is disposed in a position on the third direction side and the first-plate shaped portion side in relation to the row of fourth lens faces.

In the invention according to claim 16, regarding the light of each of the plurality of light-emitting elements of which high accuracy is required for the expected coupling efficiency in relation to the end face of the optical transmission body, optical path design can be achieved in which the optical path length within the prism that has superior optical stability based on uniformity of density than the second filler material is longer than the optical path length within the second filler material. Therefore, the coupling efficiency in relation to the end face of the optical transmission body can be stably ensured.

In addition, a lens array according to claim 17 is the lens array according to claim 15 in which, further, in the first photoelectric conversion device, the row of second light-receiving elements is disposed in a position on the second direction side and a side opposite to the optical transmission body in relation to the row of light-emitting elements; and the row of fifth lens faces is disposed in a position on the second direction side and a side opposite to the second plate-shaped portion in relation to the row of first lens faces. In the second prism surface, a total-reflection position of the light of each of the plurality of light-emitting elements is set further on a side opposite to the first plate-shaped portion than a total-reflection position of the transmitted light. In the third prism surface, an incidence position of the light of each of the plurality of light-emitting elements is set further to a side opposite to the first plate-shaped portion than an incidence position of the transmitted light. The reflection/transmission layer is formed in part of an area of the third prism surface on a side opposite to first plate-shaped portion. The row of second lens faces is disposed in a position on the third direction side and a side opposite to the first-plate shaped portion in relation to the row of fourth lens faces.

In the invention according to claim 17, the optical path of the light of each of the plurality of light-emitting elements subsequent to the second prism surface can be shortened. Therefore, even when a manufacturing or assembly error occurs in the slope angle of the second prism surface, the effect the error has on the coupling efficiency of the light of each of the plurality of light-emitting elements can be reduced.

In addition, a lens array according to claim 18 is the lens array according to any one of claims 15 to 17 in which, further, the third surface is formed such as to be perpendicular to an optical axis of the plurality of first lens faces. The first prism surface is disposed in parallel with the third surface.

In the invention according to claim 18, the light of each of the plurality of light-emitting elements can be perpendicularly incident on the first filler material and the first prism surface. Therefore, a simple design can be achieved in which linearity of an optical path between the plurality of first lens faces and the second prism surface can be ensured. In addition, the degree of freedom in the selection of materials (refractive index) for the lens array main body, the first filler material, and the prism can be widened.

In addition, a lens array according to claim 19 is the lens array according to any one of claims 15 to 18 in which, further, a refractive index difference between the lens array main body and the first filler material is a predetermined value or less.

In the invention according to claim 19, because refraction and Fresnel reflection of the light of each of the plurality of light-emitting elements at the boundary between the third surface and the first filler material can be suppressed, a simple design can be performed in which linearity of an optical path before and after the third surface is ensured without being restricted by the linearity between the third surface and the optical axis of the plurality of first lens faces. In addition, generation of stray light that is a hindrance to optical transmission and reception, and monitoring can be suppressed.

Furthermore, a lens array according to claim 20 is the lens array according to any one of claims 15 to 19 in which, further, a refractive index difference between the first filler material and the prism is a predetermined value or less.

In the invention according to claim 20, because refraction and Fresnel reflection of the light of each of the plurality of light-emitting elements at the boundary between the first filler material and the first prism surface can be suppressed, a simple design can be performed in which linearity of an optical path before and after the first prism surface is ensured without being restricted by the linearity between the first prism surface and the optical axis of the plurality of first lens faces. In addition, generation of stray light that is a hindrance to optical transmission and reception, and monitoring can be suppressed.

Still further, a lens array according to claim 21 is the lens array according to any one of claims 15 to 20 in which, further, the fourth surface is formed such as to be perpendicular to an optical axis of the plurality of second lens faces, and such that the light of each of the plurality of light-emitting elements that has passed through the reflection/transmission layer is perpendicularly incident from the second filler material side.

In the invention according to claim 21, a simple design can be achieved in which linearity of an optical path before and after the fourth surface is ensured. In addition, the degree of freedom in the selection the materials (refractive index) for the lens array main body and the second filler material can be widened.

In addition, a lens array according to claim 22 is the lens array according to any one of claims 15 to 21 in which, further, a refractive index difference between the second filler material and the lens array main body is a predetermined value or less.

In the invention according to claim 22, because refraction and Fresnel reflection of the light of each of the plurality of light-emitting elements at the boundary between the second filler material and the fourth surface can be suppressed, a simple design can be performed in which linearity of an optical path before and after the fourth surface is ensured without being restricted by the linearity between the fourth surface and the optical axis of the plurality of second lens faces. In addition, generation of stray light that is a hindrance to optical transmission and reception, and monitoring can be suppressed.

In addition, a lens array according to claim 23 is the lens array according to any one of claims 15 to 22 in which, further, the third surface is a recessing plane that is formed in a recessing manner such as to ensure space to be filled with the first filler material.

In the invention according to claim 23, a stable filling space for the first filler material can be easily ensured by the third surface being formed into the recessing plane.

In addition, a lens array according to claim 24 is the lens array according to any one of claims 15 to 22 in which, further, the first prism surface is a recessing plane that is formed in a recessing manner such as to ensure space to be filled with the first filler material.

In the invention according to claim 24, a stable filling space for the first filler material can be easily ensured by the first prism surface being formed into the recessing plane.

Still further, a lens array according to claim 25 is the lens array according to any one of claims 15 to 24 in which, further, the first filler material and the second filler material are composed of a light-transmitting adhesive. The prism is adhered to the lens array main body by the first and second filler materials.

In the invention according to claim 25, as a result of the filler material also serving as an adhesive, the prism can be stably held and the number of components can be reduced.

In addition, a lens array according to claim 26 is the lens array according to any one of claims 15 to 25 in which, further, the first filler material and the second filler material are the same material.

In the invention according to claim 26, processes during assembly can be simplified, and easier manufacturing can be performed.

Furthermore, a lens array according to claim 27 is the lens array according to any one of claims 15 to 26 in which, further, the second prism surface is formed having a slope angle of 45° in relation to the first prism surface. The third prism surface is formed having a slope angle that is a right angle to the second prism surface and 45° in relation to the first prism surface.

In the invention according to claim 27, because the prism can be formed into an isosceles right triangle, measurement of the dimensional accuracy of the prism can be easily performed, and handleability can be improved.

Still further, a lens array according to claim 28 is the lens array according to any one of claims 15 to 27 in which, further, the prism has a wall portion for preventing leakage of the second filler material onto the second prism surface in a boundary position between the second prism surface and the third prism surface.

In the invention according to claim 28, leakage of the second filler material onto the second prism surface can be suppressed by the wall portion. Therefore, total reflection function of the second prism surface can be appropriately ensured.

In addition, a lens array according to claim 29 is the lens array according to any one of claims 15 to 28 in which, further, the prism has a projecting stepped portion for preventing leakage of the second filler material onto the second prism surface in an edge portion of the third prism surface.

In the invention according to claim 29, leakage of the second filler material onto the second prism surface can be suppressed by the projecting stepped portion. Therefore, total reflection function of the second prism surface can be appropriately ensured.

Furthermore, a lens array according to claim 30 is the lens array according to any one of claims 15 to 29 in which, further, instead of the first photoelectric conversion device, as a second photoelectric conversion device that is optical transmission-dedicated, the second photoelectric conversion device is disposed that has a plurality of the row of light-emitting elements by the row of light-emitting elements being formed instead of the row of second light-receiving elements, and has a plurality of the row of first light-receiving elements in correspondence with the plurality of rows of light-emitting elements. In a state in which, instead of the prism in which the reflection/transmission layer is formed over the predetermined area on the third prism surface, the prism is disposed in which the reflection/transmission layer is formed on the overall third prism surface, the second photoelectric conversion device is capable of optically coupling the plurality of rows of light-emitting elements with end face of the optical transmission body as that dedicated to optical transmission. A plurality of rows of third lens faces are disposed such as to be adjacent to each other in the second direction on the first surface. In a usage state as that dedicated to optical transmission, the light of each of the plurality of light-emitting elements of a row differing from a row corresponding to the plurality of first lens faces in the plurality of rows of light-emitting elements is incident on the plurality of fifth lens faces. The light of each of the plurality of light-emitting elements that has been incident on the plurality of fifth lens faces is incident on the first prism surface. The second prism surface totally reflects the light of each of the plurality of light-emitting elements that has been incident on the first prism surface after being incident on the plurality of fifth lens faces towards the plurality of fourth lens faces. The reflection/transmission layer reflects the light of each of the plurality of light-emitting elements that has been incident on the third prism surface after having passed through the plurality of fifth lens faces, the first prism surface, and the second prism surface towards the plurality of third lens faces in a row differing from a row corresponding with the plurality of first lens faces in the plurality of rows of third lens faces at a predetermined reflectance as the monitor light of each of the plurality of light-emitting elements, and transmits the light towards the plurality of fourth lens faces side at a predetermined transmittance. The plurality of fourth lens faces each emit the light of each of the plurality of light-emitting elements that has been transmitted by the reflection/transmission layer towards the end face of the optical transmission body.

In the invention according to claim 30, when a plurality of rows of the third lens faces in the lens array main body are formed from the beginning, an optical transmission-dedicated lens array can be selected by the prism being selected in which the reflection/transmission layer is formed on the overall surface. On the other hand, a lens array for optical transmission and reception can be selected by the prism being selected in which the reflection/transmission layer is formed over a predetermined area. Therefore, selection of the usage state between optical transmission and reception, and optical transmission-dedicated can be performed easily and at low cost.

Still further, an optical module according to claim 31 includes a lens array according to any one of claims 15 to 29, and a first photoelectric conversion device according to claim 15, and is used for optical transmission and reception.

In the invention according to claim 31, optical coupling of the plurality of light-emitting elements and the end face of the optical transmission body for optical transmission can be appropriately performed, and the monitor light can be efficiently obtained with certainty. In addition, optical coupling of the end face of the optical transmission body and the plurality of second light-receiving elements for optical reception can be appropriately performed. In addition, as a result of a total reflection function and a light-dividing function being concentrated in positions near each other on a single component, a compact and simple design can be achieved. Furthermore, the area for optical transmission and the area for optical reception are separated in a direction perpendicular to the array direction of the lens faces, and separation of the optical path for optical transmission and the optical path for optical reception can be selected by whether or not the reflection/transmission layer is formed. As a result, when more channels are achieved as in the present invention, excessive increase in the width of the lens array main body in the array directions of the lens faces can be suppressed. In addition, the optical path for optical reception can be disposed outside of the components for optical transmission by a simple method. Therefore, a design that is compact while having multiple channels and a simple design for the optical path for optical reception can be achieved. In addition, linearity between the optical path between the second prism surface and the third prism surface and the optical path within the second filler material can be ensured. In an instance in which the light incident on the plurality of second lens faces is confirmed to be misaligned from the center of each lens face during product inspection, the areas requiring size adjustment to resolve the misalignment can be reduced. Therefore, this configuration can contribute to facilitation of manufacturing.

In addition, an optical module according to claim 32 is the optical module according to claim 31, in which instead of the first photoelectric conversion device, a second photoelectric conversion device according to claim 30 is disposed. Instead of a prism according to claim 15 in which a reflection/transmission layer is formed over the predetermined area on a third prism surface, a prism according to claim 30 is disposed in which the reflection/transmission layer is formed on the overall third prism surface, thereby being capable of transitioning to optical transmission-dedicated.

In the invention according to claim 32, when a plurality of rows of the third lens faces in the lens array are formed from the beginning, an optical transmission-dedicated optical module can be selected by the prism in which the reflection/transmission layer is formed on the overall surface and the second photoelectric conversion device being selected. On the other hand, an optical module for optical transmission and reception can be selected by the prism in which the reflection/transmission layer is formed over a predetermined area and the first photoelectric conversion device being selected. Therefore, selection of the usage state between optical transmission and reception, and optical transmission-dedicated can be performed easily and at low cost.

Furthermore, a lens array according to claim 33 is a lens array disposed between a photoelectric conversion device and an optical transmission body, which lens array is capable of optically coupling a plurality of light-emitting elements and an end face of the optical transmission body, in which photoelectric conversion device the plurality of light-emitting elements and a plurality of light-receiving elements are formed, the plurality of light-receiving elements each receiving, respectively, monitor light of each light-emitting element for monitoring light emitted from the plurality of light-emitting elements. As the photoelectric conversion device, a photoelectric conversion device is disposed in which a row of the light-emitting elements formed by the plurality of light-emitting elements being arrayed along a predetermined first direction are arrayed in parallel in a plurality of rows along a predetermined second direction that is perpendicular to the first direction, and a row of the light-receiving elements formed by the plurality of light-receiving elements being arrayed along the first direction in a position on the second direction side and the optical transmission body side in relation to the light-emitting elements in the plurality of rows are arrayed in parallel in a plurality of rows along the second direction. The lens array includes: a first lens member that faces the photoelectric conversion device in a third direction perpendicular to the first direction and the second direction; and a second lens member that is bonded to the first lens member and faces the end face of the optical transmission body in the second direction. The first lens member includes: first lens faces in a plurality of rows, in which a plurality of first lens faces are formed in an array along the first direction on a surface facing the photoelectric conversion device and the first lens faces are formed in a plurality of rows in parallel along the second direction, each on which the light emitted from each light-emitting element in the plurality of rows is incident; third lens faces in a plurality of rows, in which a plurality of third lens faces are formed in an array along the first direction on the surface facing the photoelectric conversion device in a position on the second direction side and the optical transmission body side in relation to the first lens faces in the plurality of rows and the third lens faces are formed in a plurality of rows in parallel along the second direction, each emitting the monitor light of each light-emitting element in the plurality of rows that has been incident from an inner side of the first lens member towards the light-receiving elements in the plurality of rows; a first sloped surface that is disposed a side opposite to the photoelectric conversion device in relation to the surface facing the photoelectric conversion device, has a predetermined slope angle in relation to the surface facing the photoelectric conversion device such as to slope towards the optical transmission body side as the first sloped surface becomes farther from the surface, and totally reflects the light of each light-emitting element in the plurality of rows that has been incident on each of the first lens faces in the plurality of rows towards the optical transmission body side; and a second sloped surface that is disposed a side opposite to the photoelectric conversion device in relation to the surface facing the photoelectric conversion device and on the optical transmission body side in relation to the first sloped surface, has a predetermined slope angle in relation to the surface facing the photoelectric conversion device such as to slope towards a side opposite to the optical transmission body as the second sloped surface becomes farther from the surface, on which the light of each light-emitting element in the plurality of rows that has been totally reflected by the first slope surface is incident. The second lens member includes: a third sloped surface that has a predetermined slope angle in relation to a surface facing the end face of the optical transmission body such as to slope towards a side opposite to the photoelectric conversion device as the third sloped surface becomes farther from the surface, faces the second sloped surface with a predetermined gap therebetween, and on which the light of each light-emitting element in the plurality of rows that has been incident on the second slope surface is incident; and second lens faces in a plurality of rows, in which a plurality of second lens faces are formed in an array along the first direction on the surface facing the end face of the optical transmission body and the second lens faces are formed in a plurality of rows in parallel along the third direction, each emitting the light of each light-emitting element in the plurality of rows that has been incident on the third slope surface towards the end face of the optical transmission body. An area between the second sloped surface and the third sloped surface is filled by a filler material of which a refractive index difference with the first lens member and the second lens member is a predetermined value or less. A reflection/transmission layer is formed on the second sloped surface or the third sloped surface. The reflection/transmission layer reflects the light of each light-emitting element in the plurality of rows that has been incident on the second sloped surface towards a side of the third lens faces in the plurality of rows as the monitor light of each light-emitting element in the plurality of rows at a predetermined reflectance, and transmits the light of each light-emitting element in the plurality of rows towards the third sloped surface side at a predetermined transmittance.

In the invention according to claim 33, the light of each light-emitting element in the plurality of rows that has been incident on the first lens faces in the plurality of rows is totally reflected by the first sloped surface. Thereafter, the light of each light-emitting element in a plurality of rows is divided by the reflection/transmission layer to the third sloped surface side and the side of the third lens faces in the plurality of rows. The light of each light-emitting element in the plurality of rows that has been divided to the third sloped surface side can be emitted by the second lens faces in the plurality of rows towards the side of the end face of the optical transmission body. In addition, the monitor light of each light-emitting element in the plurality of rows that has been divided with sufficient reflectance to the side of the third lens faces in the plurality of rows can be emitted by the third lens faces in the plurality of rows towards the side of the light-receiving elements in the plurality of rows. As a result, optical coupling between the light-emitting elements in the plurality of rows and the end face of the optical transmission body can be appropriately performed, and monitor light can be efficiently obtained with certainty. In addition, as a result of a gap portion between the second sloped surface and the third sloped surface being used for placement of the reflection/transmission layer and the filler material, a compact configuration can be actualized. Furthermore, as a result of the first lens member and the second lens member, and the filler material being formed such that the difference in refractive index is a predetermined value or less, linearity between an optical path between the first sloped surface and the second sloped surface in the first lens member and an optical path in the second lens member can be ensured. Therefore, in an instance in which the light incident on the second lens faces in the plurality of rows is confirmed to be misaligned from the center of each lens face during product inspection, the areas requiring size adjustment to resolve the misalignment can be reduced. Moreover, this configuration can contribute to facilitation of manufacturing.

In addition, a lens array according to claim 34 is the lens array according to claim 33 in which, further, the third sloped surface is a recessing plane that is formed in a recessing manner such as to ensure space to be filled with the filler material. The second lens member has a stepped surface on an outer side of the third sloped surface that projects further towards the first lens member side than the third sloped surface and is parallel with the second sloped surface. The second sloped surface is formed into a surface that is flat over an area corresponding to the third sloped surface and the stepped surface. The reflection/transmission layer is formed on the second sloped surface. The first lens member and the second lens member are bonded in a state in which the stepped surface and the second sloped surface are in contact.

In the invention according to claim 34, placement space of the filler material can be ensured by a simple configuration. In addition, as a result of a total reflection function (first sloped surface) and a light-dividing function (reflection/transmission layer) being concentrated on the same component (first lens member), an easier design can be achieved. Furthermore, bonding between the first lens member and the second lens member can be stably performed by the stepped surface and the second sloped surface being placed in contact with each other.

Furthermore, a lens array according to claim 35 is the lens array according to claim 33 in which, further, the second sloped surface is a recessing plane that is formed in a recessing manner such as to ensure space to be filled with the filler material. The first lens member has a stepped surface on an outer side of the second sloped surface that projects further towards the second lens member side than the second sloped surface and is parallel with the third sloped surface. The third sloped surface is formed into a surface that is flat over an area corresponding to the second sloped surface and the stepped surface. The reflection/transmission layer is formed on the third sloped surface. The first lens member and the second lens member are bonded in a state in which the stepped surface and the third sloped surface are in contact.

In the invention according to claim 35, placement space of the filler material can be ensured by a simple configuration. In addition, bonding between the first lens member and the second lens member can be stably performed by the stepped surface and the third sloped surface being placed in contact with each other.

Still further, a lens array according to claim 36 is the lens array according to claim 34 or 35 in which, further, a contact surface on the first lens member side and a contact surface on the second lens member side are respectively formed on the first lens member and the second lens member, the contact surfaces respectively extending from the stepped surface and the sloped surface in contact therewith and coming into contact with each other in a state having a predetermined angle in relation to the stepped surface and the sloped surface.

In the invention according to claim 36, as a result of the contact surface on the first lens member side and the contact surface on the second lens member side being placed in contact with each other, bonding between the first lens member and the second lens member can be more stably performed with high accuracy.

In addition, a lens array according to claim 37 is the lens array according to any one of claims 33 to 37 in which, further, the filler material is composed of a light-transmitting adhesive. The first lens member and the second lens member are bonded by the filler material.

In the invention according to claim 37, as a result of the filler material also serving as an adhesive, the first lens member and the second lens member can be bonded with certainty, and the number of components can be reduced.

Furthermore, a lens array according to claim 38 is the lens array according to any one of claims 33 to 37 in which, further, the first sloped surface is formed having a slope angle of 45° in relation to the surface facing the photoelectric conversion device. The second sloped surface is formed having a slope angle that is a right angle to the first sloped surface and 45° in relation to the surface facing the photoelectric conversion device. The third sloped surface is formed having a slope angle of 45° in relation to the surface facing the end face of the optical transmission body.

In the invention according to claim 38, as a result of the first to third sloped surfaces being formed into a sloped surface of 45°, measurement of the dimensional accuracy of each sloped surface can be easily performed, and handleability can be improved.

Still further, a lens array according to claim 39 is the lens array according to any one of claims 33 to 38 in which, further, the first lens member and the second lens member are formed by the same material.

In the invention according to claim 39, an easier design can be achieved by unifying the refractive index of the first lens member and the second lens member, and further cost reduction can be achieved by using the same material.

In addition, an optical module according to claim 40 includes a lens array according to any one of claims 33 to 39, and a photoelectric conversion device according to claim 1.

In the invention according to claim 40, optical coupling between the light-emitting elements in the plurality of rows and the end face of the optical transmission body can be appropriately performed, and monitor light can be efficiently obtained with certainty. In addition, as a result of a gap portion between the second sloped surface and the third sloped surface being used for placement of the reflection/transmission layer and the filler material, a compact configuration can be actualized. Furthermore, linearity between an optical path between the first sloped surface and the second sloped surface in the first lens member and an optical path in the second lens member can be ensured. In an instance in which the light incident on the second lens faces in the plurality of rows is confirmed to be misaligned from the center of each lens face during product inspection, the areas requiring size adjustment to resolve the misalignment can be reduced. Therefore, this configuration can contribute to facilitation of manufacturing.

Effect of the Invention

In the present invention, monitor light can be efficiently obtained, and further size reduction and more channels can be achieved.

BEST MODE(S) FOR CARRYING OUT THE INVENTION

First, an embodiment of a lens array and an optical module including the lens array of a first invention of the present application will be described with reference to FIG. 1 to FIG. 9.

Figure 1:
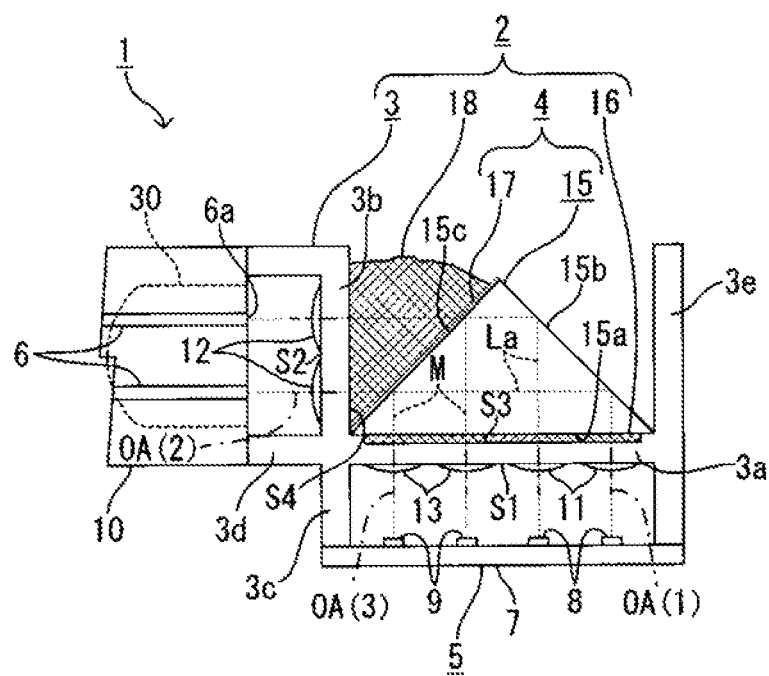
[FIG. 1] An overall configuration diagram of an optical module according to an embodiment of a first invention
Figure 2:
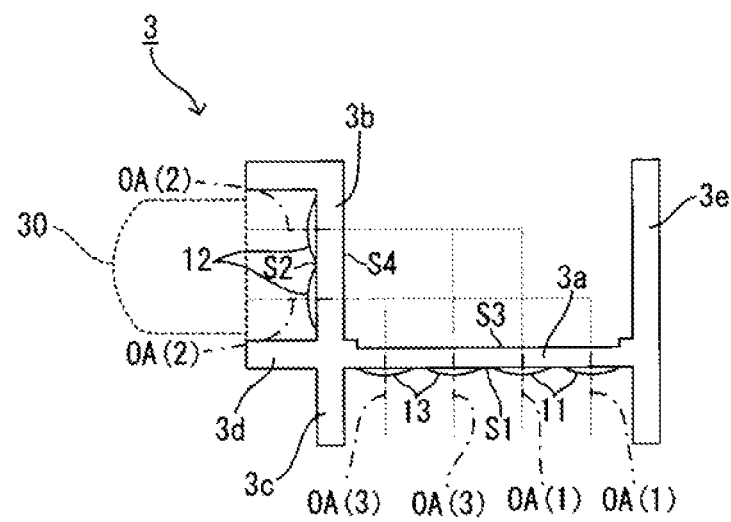
[FIG. 2] A vertical cross-sectional view of a lens array main body of a lens array according to the embodiment of the first invention
Figure 3:
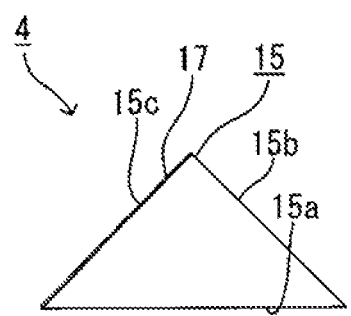
[FIG. 3] A vertical cross-sectional view of an optical path control member of the lens array according to the embodiment of the first invention
Figure 4:
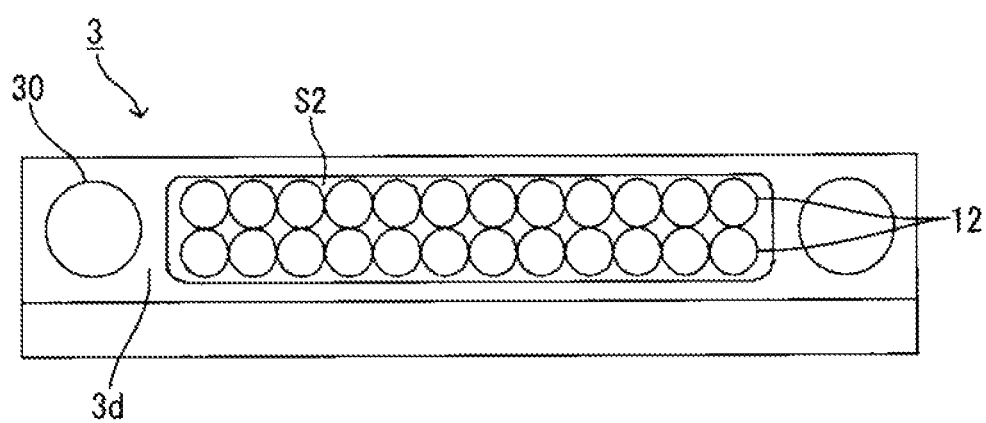
[FIG. 4] A left-side view of FIG. 2
Figure 5:
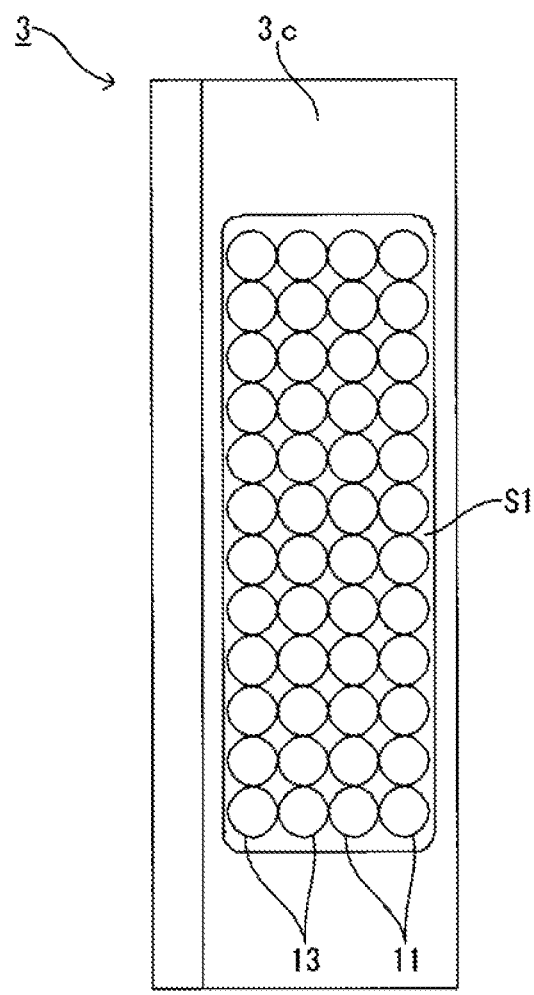
[FIG. 5] A bottom view of FIG. 2

Here, FIG. 1 is an overall configuration diagram showing an overview of an optical module 1 according to the present embodiment together with a vertical cross-sectional view of a lens array 2 according to the present embodiment. In addition, FIG. 2 is a vertical cross-sectional view of a lens array main body 3 configuring the lens array 2. Furthermore, FIG. 3 is a vertical cross-sectional view of an optical path control member 4 configuring the lens array 2 together with the lens array main body 3. Still further, FIG. 4 is a left-side view of FIG. 2. FIG. 5 is a bottom view of FIG. 2.

As shown in FIG. 1, the lens array 2 according to the present embodiment is disposed between a photoelectric conversion device 5 and optical fibers 6 serving as an optical transmission body.

Here, the photoelectric conversion device 5 has a plurality of light-emitting elements 8 on a surface of a semiconductor substrate 7 facing the lens array 2, the light emitting-elements 8 emitting laser light La in a direction perpendicular to this surface (upward direction in FIG. 1). The light-emitting elements 8 configure the above-described VCSEL. The emission direction of the laser light La from each light-emitting element 8 is equivalent to a third direction in the present invention. A plurality of light-emitting elements 8 (12 light-emitting elements 8 according to the present embodiment) are arrayed at an even pitch along a direction that is perpendicular to the surface of the paper on which FIG. 1 is printed in FIG. 1 and is a first direction, thereby forming a row of light-emitting elements 8. In addition, a plurality of such rows of light-emitting elements 8 (two rows according to the present embodiment) are formed in parallel along a lateral direction in FIG. 1 that is a predetermined second direction. According to the present embodiment, the number of light-emitting elements 8 is the same for each row of light-emitting elements 8. In addition, the positions of the light-emitting elements 8 in the array direction are aligned (match) among the rows. However, the present invention is not limited to a configuration such as this. Furthermore, as shown in FIG. 1, the photoelectric conversion device 5 has light-receiving elements 9, the number of which is the same as the number of light-emitting elements 8, on the surface of the semiconductor substrate 7 facing the lens array 2, in a position near the left side in FIG. 1 that is a position on the second direction side and the optical transmission body side in relation to the plurality of rows of light-emitting elements 8. The light-receiving elements 9 receive monitor light M for monitoring output (such as intensity or amount of light) of the laser light La emitted from each light-emitting element 8 in the plurality of rows. In a manner similar to the light-emitting elements 8, a plurality of light-receiving elements 9 (12 light-receiving elements 9) are arrayed at an even pitch along the direction that is perpendicular to the surface of the paper on which FIG. 1 is printed in FIG. 1, thereby forming a row of light-receiving elements 9. In addition, a plurality of such rows of light-receiving elements 9 (two rows) are formed in parallel along the lateral direction in FIG. 1. Furthermore, between the light-receiving elements 9 of each row and an optically corresponding (with which a light monitoring relationship is established) row of light-emitting elements 8, the positions in the array direction of the elements 8 and 9 that are in the same order when counted from one array direction, match each other. However, such positional matching is also established between a row of light-emitting elements 8 and a row of light-receiving elements 9 that do not optically correspond, in an instance in which a configuration is used in which the positions in the array direction of the light-emitting elements 8 are aligned among the rows of light-emitting elements 8. In FIG. 1, a light-emitting element 8 in a first row counted from the right side optically corresponds with a light-receiving element 9 in a first row counted from the left side. In addition, a light-emitting element 8 in a second row from the right side optically corresponds with a light-receiving element 9 in a second row from the left side. The light-receiving element 9 may be a photodetector. Furthermore, a control circuit (not shown) that controls the output of the laser light La emitted from the light-emitting element 8 based on the intensity and the amount of light of the monitor light M received by the light-receiving element 9 is connected to the photoelectric conversion device 5. As shown in FIG. 1, the photoelectric conversion device 5 such as this is disposed opposing the lens array 2 in a state in which the semiconductor substrate 7 is in contact with the lens array 2. The photoelectric conversion device 5, together with the lens array 2, configures the optical module 1 by, for example, being attached to the lens array 2 by a known fixing means (not shown) such as a clamp spring.

In addition, the optical fibers 6 according to the present embodiment are provided, the number thereof being the same as the number of light-emitting elements 8 and the number of light-receiving elements 9. A plurality of optical fibers 6 (12 optical fibers 6) are arrayed along the direction that is perpendicular to the surface of the paper on which FIG. 1 is printed in FIG. 1, thereby forming a row. In addition, a plurality of such rows of optical fibers 6 (two rows) are disposed such as to be arrayed in parallel along a vertical direction (third direction) in FIG. 1. Between the optical fibers 6 of the plurality of rows and an optically corresponding (with which a light coupling relationship is established) row of light-emitting elements 8, the positions in the array direction of the optical fiber 6 and the light-emitting element 8 that are in the same order when counted from one array direction, match each other. However, such positional matching is also established between a row of light-emitting elements 8 and a row of optical fibers 6 that do not optically correspond, in an instance in which a configuration is used in which the positions in the array direction of the light-emitting elements 8 are aligned among the rows of light-emitting elements 8. In FIG. 1, an optical fiber 6 in a first row counted from the top optically corresponds with the light-emitting element 8 in the second row from the right side. In addition, an optical fiber 6 in the second row when from the top optically corresponds with the light-emitting element 8 in the first row from the right side. The optical fibers 6 of each row are, for example, multi-mode optical fibers 6 having the same dimensions as one another. A section of each optical fiber 6 on an end face 6a side is held within a multi-core integrated optical connector 10, such as a mechanically transferable [MT] connector. As shown in FIG. 1, the optical fibers 6 in the plurality of rows such as this are attached to the lens array 2 by a known fixing means (not shown) (such as a clamp spring) in a state in which an end surface of the optical connector 10 on the lens array 2 side is in contact with the lens array 2.

The lens array 2 optically couples the light-emitting elements 8 in the plurality of rows with the corresponding end faces 6a of the optical fibers 6 in the plurality of rows, in a state in which the lens array 2 is disposed between the photoelectric conversion device 5 and the optical fibers 6, such as those described above.

The lens array 2 will be described in further detail. As shown in FIG. 1, the lens array 2 has the lens array main body 3 composed of a light-transmitting material (such as a resin material). The outer shape of the lens array main body 3 is formed into a substantially box-like shape. Specifically, as shown in FIG. 1 and FIG. 2, the lens array main body 3 has a first plate-shaped portion 3a that has a lateral plate shape with a rectangular planar shape. The first plate-shaped portion 3a has a predetermined width in the lateral direction, a predetermined depth in the direction perpendicular to the surface of the paper on which the drawings are printed, and a predetermined thickness in the vertical direction in FIG. 1 and FIG. 2, and faces the photoelectric conversion device 5 from above. In addition, as shown in FIGS. 1 and 2, the lens array main body 3 has a second plate-shaped portion 3b that has a vertical plate shape with a rectangular planar shape. The second plate portion 3b is connected to a left end portion of the first plate-shaped portion 3a that is an end portion on the second direction side and the optical transmission body side. The second plate-shaped portion 3b is formed such that the depth is the same dimension as that of the first plate-shaped portion 3a. In addition, the second plate-shaped portion 3b extends from a left end portion of the first plate-shaped portion 3a upwards in the vertical direction such as to be perpendicular to the first plate-shaped portion 3a. In addition, the second plate-shaped portion 3b naturally has the same refractive index as the first plate-shaped portion 3a because the second plate-shaped portion 3b is integrated with the first plate-shaped portion 3a. Furthermore, the second plate-shaped portion 3b faces the end faces 6a of the optical fibers 6 in the plurality of rows from the right side in FIG. 1 and FIG. 2.

A lower end surface (plane) of the first plate-shaped portion 3a in the lens array main body 3 such as that described above is a first surface S1 that faces the photoelectric conversion device 5. As shown in FIG. 2 and FIG. 5, first lens faces (convex lens faces) 11 having a circular planar shape are formed on the first surface S1, the number of first lens faces 11 being the same as the number of light-emitting elements 8. Here, as shown in FIG. 2 and FIG. 5, a plurality of first lens faces 11 (12 first lens faces 11) are arrayed at an even pitch along the direction that is perpendicular to the surface of the paper on which FIG. 2 is printed in FIG. 2 (vertical direction in FIG. 5), thereby forming a row of first lens faces 11. In addition, a plurality of such rows of first lens faces 11 (two rows) are formed in parallel along the lateral direction in FIG. 2 and FIG. 5. The first lens faces 11 in each row are formed having the same size. In addition, between the first lens faces 11 in each row and the optically corresponding (with which a light incidence relationship is established) row of light-emitting elements 8, the positions in the array direction of the first lens face 11 and the light emitting element 8 that are in the same order when counted from one array direction, match each other. However, such positional matching is also established between a row of light-emitting elements 8 and a row of first lens faces 11 that do not optically correspond, in an instance in which a configuration is used in which the positions in the array direction of the light-emitting elements 8 are aligned between the rows of light-emitting elements 8. In FIG. 1, a first lens face 11 in a first row when counted from the right side optically corresponds with the light-emitting element 8 in the first row when counted from the right side that directly opposes the first lens face 11 from below. In addition, a first lens face 11 in a second row from the right side optically corresponds with the light-emitting element 8 in the second row from the right side that directly opposes the first lens face 11 from below. As shown in FIG. 5, first lens faces 11 that are adjacent to each other in the array direction (vertical direction) and the parallel direction (lateral direction) may be formed in an adjacent state in which the respective circumferential end portions are in contact with each other. In addition, as shown in FIG. 1, an optical axis OA(1) of each first lens face 11 preferably matches the center axis of the laser light La emitted from each light-emitting element 8 that optically corresponds with each first lens face 11. More preferably, the optical axis OA(1) of each first lens face 11 is perpendicular to the first surface S1.

As shown in FIG. 1, the laser light La emitted from each optically corresponding row of light-emitting elements 8 is incident on the first lens faces 11 in each row, such as those described above. More specifically, emitted light from a light-emitting element 8 is incident on a single arbitrary first lens face 11 belonging to a row of first lens faces 11, the light-emitting element 8 being in the same order as the single arbitrary first lens face 11 when counted from one array direction, among the light-emitting elements 8 belonging to the optically corresponding row of light-emitting elements 8. Then, the first lens faces 11 in each row advance the incident laser light La of each light-emitting element 8 in each row towards the interior of the first plate-shaped portion 3a (upwards). The first lens faces 11 in each row may collimate or converge the incident laser light La of each light-emitting element 8 in each row. Alternatively, the laser light La may by dispersed by the first lens faces 11 of each row being formed into concave lens faces.

On the other hand, a left end surface (plane) of the second plate-shaped portion 3b is a second surface S2 that faces the end faces 6a of the optical fibers 6. As shown in FIG. 2 and FIG. 4, second lens faces (convex lens faces) 12 having a circular planar shape are formed on the second surface S2, the number of second lens faces 12 being the same as the number of light-emitting elements 8. Here, as shown in FIG. 2 and FIG. 4, a plurality of second lens faces 12 (12 second lens faces 12) are arrayed at an even pitch along the direction that is perpendicular to the surface of the paper on which FIG. 2 is printed in FIG. 2 (lateral direction in FIG. 4), thereby forming a row of second lens faces 12. A plurality of such rows of second lens faces 12 (two rows) are formed in parallel along the vertical direction in FIG. 2 and FIG. 4. The second lens faces 12 in each row are formed having the same size as each other. In addition, between the second lens faces 12 in each row and the optically corresponding (with which a light incidence relationship is established) row of light-emitting elements 8, the positions in the array direction of the second lens face 12 and the light emitting element 8 that are in the same order when counted from one array direction, match each other. However, such positional matching is also established between a row of light-emitting elements 8 and a row of second lens faces 12 that do not optically correspond, in an instance in which a configuration is used in which the positions in the array direction of the light-emitting elements 8 are aligned between the rows of light-emitting elements 8. In FIG. 1, a second lens face 12 in a first row when counted from the top optically corresponds with the light-emitting element 8 in the second row when counted from the right side. In addition, a second lens face 12 in a second row from the top optically corresponds with the light-emitting element 8 in the first row from the right side. As shown in FIG. 4, second lens faces 12 that are adjacent to each other in the array direction and the parallel direction may be formed in an adjacent state in which the respective circumferential end portions are in contact with each other. In addition, as shown in FIG. 1, an optical axis OA(2) of each second lens face 12 preferably matches the center axis of the end face 6a of each optical fiber 6 that optically corresponds (with which a light coupling relationship is established) with each second lens face 12. More preferably, the optical axis OA(2) of each second lens face 12 is perpendicular to the second surface S2.

As shown in FIG. 1, the laser light La emitted from each optically corresponding row of light-emitting elements 8 is incident on the second lens faces 12 in each row after passing through the optically corresponding first lens faces 11 in each row and a subsequent optical path (described in detail hereafter) of the lens array 2. More specifically, the emitted light from a light-emitting element 8 is incident on a single arbitrary second lens face 12 belonging to a row of second lens faces 12, the light-emitting element 8 being in the same order as the single arbitrary second lens face 12 when counted from one array direction, among the light-emitting elements 8 belonging to the optically corresponding row of light-emitting elements 8, and the light having passed through the first lens face 11 in the same order. At this time, the center axis of the laser light La of each light-emitting element 8 in each row preferably matches the optical axis OA(2) of the corresponding second lens faces 12 in each row. The second lens faces 12 in each row then converge the incident laser light La of each light-emitting element 8 in each row and respectively emit the laser light La towards the end faces 6a of the optical fibers 6 in each row corresponding to the second lens faces 12 in each row.

In this way, the light-emitting elements 8 in each row and the end faces 6a of the optical fibers 6 in each row are optically coupled via the first lens faces 11 in each row and the second lens faces 12 in each row.

Furthermore, as shown in FIG. 2 and FIG. 5, third lens faces (convex lens faces) 13 having a circular planar shape are formed in a position on the first surface S1 on the left side of the first lens faces 11 in each row, the number of third lens faces 13 being the same as the number of light-emitting elements 8. Here, as shown in FIG. 2 and FIG. 5, a plurality of third lens faces 13 (12 third lens faces 13) are arrayed at an even pitch along the direction that is perpendicular to the surface of the paper on which FIG. 2 is printed in FIG. 2 (vertical direction in FIG. 5), thereby forming a row of third lens faces 13. In addition, a plurality of such rows of third lens faces 13 (two rows) are formed in parallel along the lateral direction in FIG. 2 and FIG. 5. The third lens faces 13 in each row are formed having the same size. In addition, between the third lens faces 13 in each row and the optically corresponding (with which a light incidence relationship is established) row of light-emitting elements 8, the positions in the array direction of the third lens face 13 and the light-emitting element 8 that are in the same order when counted from one array direction, match each other. However, such positional matching is also established between a row of light-emitting elements 8 and a row of third lens face 13 that do not optically correspond, in an instance in which a configuration is used in which the positions in the array direction of the light-emitting elements 8 are aligned between the rows of light-emitting elements 8. In FIG. 1, a third lens face 13 in a first row when counted from the left side optically corresponds with the light-emitting element 8 in the first row when counted from the right side. In addition, a third lens face 13 in a second row from the left side optically corresponds with the light-emitting element 8 in the second row from the right side. As shown in FIG. 5, third lens faces 13 that are adjacent to each other in the array direction and the parallel direction may be formed in an adjacent state in which the respective circumferential end portions are in contact with each other. In addition, an optical axis OA(3) of the third lens faces 13 in each row preferably matches the center axis of a light-receiving surface of the light-receiving elements 9 in each row that optical correspond (with which a light coupling relationship is established) with the third lens faces 13 in each row. More preferably, the optical axis OA(3) of the third lens faces 13 in each row is perpendicular to the first surface S1.

As shown in FIG. 1, the monitor light M of each light-emitting element 8 in each row corresponding with the third lens faces 13 in each row is incident on the third lens faces 13 in each row from the inner side of the first plate-shaped portion 3a (above). The third lens faces 13 in each row converge the incident monitor light M of each light-emitting element 8 in each row and respectively emit the monitor light M towards the light-receiving elements 9 in each row that optically corresponds with the third lens faces 13 in each row. A means for generating the monitor light M will be described hereafter.

Furthermore, as shown in FIG. 1, a recessing plane (spot face plane) that slightly recesses downward is formed on an upper end surface of the first plate-shaped portion 3a. The recessing plane is a third surface S3 on the side opposite to the first surface S1 in the first plate-shaped portion 3a. As shown in FIG. 1, the above-described optical path control member 4 is disposed in a position near the upper portion of the third surface S3, such as to provide a space above the third surface S3 (on the third direction side and on the side opposite to the photoelectric conversion device 5).

Here, the optical path control member 4 will be described in detail. As shown in FIG. 1 and FIG. 3, the optical path control member 4 has a prism 15 composed of a light-transmitting material (such as a resin material) and having a triangular vertical cross-sectional shape (triangular prism shape). The prism 15 forms an optical path for the laser light La of each light-emitting element 8 in each row after the laser light La has been incident on the first lens faces 11 in each row.

Specifically, as shown in FIG. 1, the prism 15 has a first prism surface 15a that forms a portion (bottom surface) of the surface of the prism 15. The first prism surface 15a faces the third surface S3 from near above. As shown in FIG. 1, a lateral width of the first prism surface 15a is formed to be substantially the same width as a lateral width of the first plane-shaped portion 3a. In addition, as shown in FIG. 1, a gap portion between the first prism surface 15a and the third surface S3 is a space formed as a result of the third surface S3 being the recessing plane. The space is filled with a first filler material 16 composed of a light-transmitting adhesive. The prism 15 is bonded to the lens array main body 3 using the adhesive force of the first filler material 16. As the first filler material 16, a thermoset resin, an ultra-violet hardening resin, or the like can be used.

As shown in FIG. 1, the laser light La of each light-emitting element 8 in each row that has been incident on the first lens faces 11 in each row and transmitted through the first plate-shaped portion 3a and the first filler material 16 is incident on the first prism surface 15a, such as that described above, from below (third direction). The first prism surface 15a transmits the incident laser light La of each light-emitting element 8 and advances the laser light La onto an optical path within the prism 15.

In addition, as shown in FIG. 1, the prism 15 has a second prism surface 15b that forms a portion (right sloping surface) of the surface of the prism 15. The second prism surface 15b is connected to a right end portion of the first prism surface 15a at a lower end portion of the second prism surface 15b. In addition, the second prism surface 15b has a predetermined slope angle in relation to the first prism surface 15a, such as to slope towards the second plate-shaped portion 3b side (left side) as the second prism surface 15b becomes farther from the first prism surface 15a.

As shown in FIG. 1, the laser light La of each light-emitting element 8 in each row that has been incident on the first prism surface 15a and advanced on the optical path within the prism 15 is internally incident on the second prism surface 15b, such as that described above, from below at an angle of incidence that is greater than the critical angle. The second prism surface 15b then totally reflects the internally incident laser light La of each light-emitting element 8 in each row towards the second lens faces 12 in each row (left side).

Furthermore, as shown in FIG. 1, the prism 15 has a third prism surface 15c that forms a portion (left sloping surface) of the surface of the prism 15. The third prism surface 15c is connected to a left end portion of the first prism surface 15a at a lower end portion of the third prism surface 15c. The third prism surface 15c is also connected to an upper end portion of the second prism surface 15b at an upper end portion. In addition, as shown in FIG. 1, the third prism surface 15c has a predetermined slope angle in relation to the first prism surface 15a such as to slope towards the side opposite to the second plate-shaped portion 3b (right side) as the third prism surface 15c becomes farther from the first prism surface 15a.

As shown in FIG. 1, the laser light La of each light-emitting element 8 in each row that has been totally reflected by the second prism surface 15b and advanced on the optical path within the prism 15 is internally incident on the third prism surface 15c from the right side.

As shown in FIG. 1 and FIG. 3, in addition to the prism 15 such as this, the optical path control member 4 further has a thin reflection/transmission layer 17 on the third prism surface 15c. The reflection/transmission layer 17 may be formed by the third prism surface 15c being coated with a single layer film composed of a single metal, such as Ni, Cr, or Al, or a dielectric multi-layer film obtained by alternately stacking a plurality of dielectric bodies (such as $TiO_2$ and $SiO_2$) having differing dielectric constants. In this instance, a known coating technique, such as Inconel deposition, can be used for coating. When coating such as this is used, the reflection/transmission layer 17 can be formed having a very thin thickness that is, for example, 1 μm or less.

As shown in FIG. 1, the laser light La of each light-emitting element 8 in each row that has been internally incident on the third prism surface 15c is immediately incident on the reflection/transmission layer 17 such as this. Then, the reflection/transmission layer 17 reflects the incident laser light La of each light-emitting element 8 in each row at a predetermined reflectance towards the side of the third lens faces 13 in each row (downward) corresponding with each monitor light M, as the monitor light M of each light-emitting element 8 in each row corresponding with the light-emitting elements 8 in each row. In addition, the reflection/transmission layer 17 transmits the laser light La of each light-emitting element 8 in each row towards the side of the second lens faces 12 in each row (left side) at a predetermined transmittance. At this time, because the thickness of the reflection/transmission layer 17 is thin, refraction of the laser light La passing through the reflection/transmission layer 17 can be ignored (considered straight-advancing transmittance). The reflectance and transmittance of the reflection/transmission layer 17 can be set to desired values based on the material, thickness, and the like of the reflection/transmission layer 17, with the restriction that monitor light M of an amount sufficient to monitor the output of the laser light La can be obtained. For example, when the reflection/transmission layer 17 is formed by the above-described single layer film, the reflectance of the reflection/transmission layer 17 can be 20% and the transmittance 60% (absorption 20%), depending on the thickness. In addition, for example, when the reflection/transmission layer 17 is formed by the above-described dielectric multi-layer film, the reflectance of the reflection/transmission layer 17 can be 10% and the transmittance 90%, depending on the thickness and the number of layers.

In this way, the monitor light M of each light-emitting element 8 in each row that has been reflected by the reflection/transmission layer 17 advances on the optical path within the prism 15 and successively passes through the first prism surface 15a, the first filler material 16, and the first plate-shaped portion 3a. Thereafter, the monitor light M of each light-emitting element 8 in each row is internally incident on the corresponding third lens faces 13 in each row and emitted from the third lens faces 13 in each row towards the corresponding light-receiving elements 9 in each row.

On the other hand, as shown in FIG. 1, the area between the reflection/transmission layer 17 and a fourth surface S4 (right end surface) of the second plate-shaped portion 3b opposite to the second surface S2 is filled with a second filler material 18 composed of a light-transmitting adhesive, such as a thermoset resin or an ultra-violet hardening resin. Therefore, the prism 15 is more stably bonded to the lens array main body 3 using the adhesive force of the second filler material 18 in addition to the first filler material 16. The difference in refractive index between the second filler material 18 and the prism 15 is a predetermined value or less. The difference in refractive index is preferably 0.01 or less, and more preferably 0.005 or less. For example, when the prism 15 is formed by OKP4HT manufactured by Osaka Gas Chemicals Co., Ltd. as polyester, the second filler material 18 may be formed by EA-0200 manufactured by Osaka Gas Chemicals Co., Ltd. as an ultra-violet hardening resin. In this instance, the refractive indexes of the prism 15 and the second filler material 18 in relation to light having a wavelength of 850 nm can both be 1.61.

As shown in FIG. 1, the laser light La of each light-emitting element 8 in each row that has been transmitted by the reflection/transmission layer 17 is immediately incident on the second filler material 18, such as that described above. At this time, the direction of incidence of the laser light La of each light-emitting element 8 in each row in relation to the second filler material 18 can be considered the same as the direction of incidence of the laser light La of each light-emitting element 8 in each row in relation to the reflection/transmission layer 17. This is because the reflection/transmission layer 17 is very thin, and refraction of the laser light La at this layer 17 can be ignored. Then, the laser light La of each light-emitting element 8 in each row that has been incident on the second filler material 18 advances on an optical path within the second filler material 18 towards the side of the second lens faces 12 in each row.

At this time, because the difference in refractive index between the second filler material 18 and the prism 15 is sufficiently small, when the laser light La of each light-emitting element 8 in each row is incident on the second filler material 18, refraction does not occur in the laser light La. Then, the laser light La of each light-emitting element 8 in each row that has advanced on the optical path within the second filler material 18 passes through the second plate-shaped portion 3b, is internally incident on the second lens faces 12 in each row, and is respectively emitted by the second lens faces 12 in each row towards the end faces 6a of the optical fibers 6 in each row corresponding thereto.

In a configuration such as that described above, the laser light La of each light-emitting element 8 in each row that has been incident on the first lens faces 11 in each row is totally reflected by the second prism surface 15b. Thereafter, the laser light La of each light-emitting element 8 in each row is divided by the reflection/transmission layer 17 towards the side of the second lens faces 12 in each row and the side of the third lens faces 13 in each row. Then, the laser light La of each light-emitting element 8 in each row that has been divided (transmitted) towards the side of the second lens faces 12 in each row is emitted by the second lens faces 12 in each row towards the side of the end faces 6a of the optical fibers 6 in each row. In addition, the monitor light M of each light-emitting element 8 in each row that has been divided (reflected) towards the side of the third lens faces 13 in each row with sufficient reflectance can be emitted from the third lens faces 13 in each row towards the side of the light-receiving elements 9 in each row. As a result, optical coupling of the light-emitting elements 8 in each row and the end faces 6a of the optical fibers 6 in each row can be appropriately performed, and the monitor light can be efficiently obtained with certainty. In addition, as a result of a total reflection function 15b and a light-dividing function 17 being concentrated in positions near each other on a single component 15, a compact and simple design can be achieved. Furthermore, as a result of the prism 15 and the second filler material 18 being formed such that the difference in refractive index is a predetermined value or less, linearity between the optical path between the second prism surface 15b and the third prism surface 15c and the optical path within the second filler material 18 can be ensured. Therefore, in an instance in which the laser light La incident on the second lens faces 12 in each row is confirmed to be misaligned from the centers of the lens faces 12 during product inspection, the areas requiring size adjustment to resolve the misalignment can be reduced. Moreover, this configuration contributes to facilitation of manufacturing. Specifically, in a configuration in which, for example, linearity between the optical path between the second prism surface 15b and the third prism surface 15c and the optical path within the second filler material 18 cannot be ensured, to correct the axial misalignment of incident light on each second lens face 12 to be within an allowable limit, the slope angle of the third prism surface 15c may be required to be adjusted. On the other hand, according to the present embodiment, if the total reflection direction at the second prism surface 15b is appropriately ensured, complicated size adjustment, such as resetting the third prism surface 15c to an optimal angle, is not required.

In addition to the above-described configuration, furthermore, according to the present embodiment, as shown in FIG. 1, the third surface S3 is formed such as to be perpendicular to the optical axis OA(1) of the first lens faces 11 in each row. In addition, the first prism surface 15a is disposed in parallel with the third surface S3.

In a configuration such as this, the laser light La of each light-emitting element 8 in each row can be perpendicularly incident on the first filler material 16 and the first prism surface 15a. Therefore, a simple design can be achieved in which linearity of the optical path between the first lens faces 11 in each row and the second prism surface 15b is ensured. In addition, the degree of freedom in the selection of materials (refractive index) for the lens array main body 3, the first filler material 16, and the prism 15 can be widened.

In addition to the above-described configuration, furthermore, according to the present embodiment, as shown in FIG. 1, the fourth surface S4 is formed such as to be perpendicular to the optical axis OA(2) of the second lens faces 12 in each row. The laser light La of each light-emitting element 8 in each row that has passed through the reflection/transmission layer 17 is perpendicularly incident on the fourth surface S4 from the second filler material 18 side.

In a configuration such as this, a simple design can be achieved in which linearity of the optical path before and after the fourth surface S4 is ensured. In addition, the degree of freedom in the selection the materials (refractive index) for the lens array main body 3 and the second filler material 18 can be widened.

In addition to the above-described configuration, furthermore, according to the present embodiment, as shown in FIG. 1 and FIG. 3, the slope angle of the second prism surface 15b is 45° in the clockwise direction in FIG. 1 and FIG. 3 with reference to the first prism surface 15a (0°). In addition, as shown in FIG. 1 and FIG. 3, the slope angle of the third prism surface 15c is 45° in the counter-clockwise direction in FIG. 1 and FIG. 3 with reference to the first prism surface 15a. In other words, the third prism surface 15c is at a right angle to the second prism surface 15b.

In a configuration such as this, because the prism 15 can be formed into an isosceles right triangle, measurement of the dimensional accuracy of the prism 15 can be easily performed, and handleability can be improved.

In addition to the above-described configuration, furthermore, the lens array main body 3 and the first filler material 16 may be formed such that the difference in refractive index is a predetermined value or less (such as 0.01 or less [preferably 0.005 or less]).

In a configuration such as this, because refraction and Fresnel reflection of the light of each light-emitting element 8 in each row at the boundary between the third surface S3 and the first filler material 16 can be suppressed, a simple design can be performed in which linearity of the optical path before and after the third surface S3 is ensured without being restricted by the linearity between the third surface S3 and the optical axis OA(1) of the first lens faces 11 in each row, described above. In addition, generation of stray light that is a hindrance to optical transmission and monitoring can be suppressed.

In addition to the above-described configuration, furthermore, the lens array main body 3 and the second filler material 18 may be formed such that the difference in refractive index is a predetermined value or less (such as 0.01 or less [preferably 0.005 or less]).

In a configuration such as this, because refraction and Fresnel reflection of the light of each light-emitting element 8 in each row at the boundary between the second filler material 18 and the fourth surface S4 can be suppressed, a simple design can be performed in which linearity of the optical path before and after the fourth surface S4 is ensured without being restricted by the linearity between the fourth surface S4 and the optical axis OA(2) of the second lens faces 12 in each row, described above. In addition, generation of stray light that is a hindrance to optical transmission and monitoring can be suppressed.

In addition to the above-described configuration, furthermore, the first filler material 16 and the second filler material 18 may be the same material.

In a configuration such as this, because an operation for changing the filler material is not required during assembly, the manufacturing process can be simplified, and easier manufacturing can be performed.

In addition to the above-described configuration, furthermore, the lens array main body 3 and the prism 15 may be composed of the same material.

In a configuration such as this, cost reduction can be achieved by unifying the material.

In addition to the above-described configuration, as shown in FIG. 1 and FIG. 5, the lens array main body 3 has a device-side circumferential projecting portion 3c for holding the photoelectric conversion device 5. The device-side circumferential projecting portion 3c is formed such as to project further towards the photoelectric conversion device 5 side (downward in FIG. 1) than the first surface S1 and the first lens faces 11, such as to enclose the first surface S1 from four directions. In addition, the device-side circumferential projecting portion 3c comes into contact with and holds the photoelectric conversion device 5 at the tip surface (lower end surface). The tip surface of the device-side circumferential projecting portion 3c is in parallel and flush with the first surface S1. In addition, as shown in FIG. 1 and FIG. 4, the lens array main body 3 has a fiber-side circumferential projecting portion 3d for holding the optical fibers 6. The fiber-side circumferential projecting portion 3d is formed such as to project further towards the optical fiber 6 side (left side in FIG. 1) than the second surface S2 and the second lens faces 12, such as to enclose the second surface S2 from four directions. In addition, the fiber-side circumferential projecting portion 3d comes into contact with and holds the optical fibers 6 at the tip surface (left end surface). The tip surface of the fiber-side circumferential projecting portion 3d is in parallel and flush with the second surface S2. In addition, a positioning means may be formed in the device-side circumferential projecting portion 3c and the photoelectric conversion device 5 (semiconductor substrate 7) to position the photoelectric conversion device 5 to the lens array 2, by mechanically or optically engaging the device-side circumferential projecting portion 3c and the photoelectric conversion device 5 to each other. As the positioning means, a combination of a pin formed on either of the device-side circumferential projecting portion 3c and the photoelectric conversion device 5 and a through-hole or a hole for pin insertion formed on the other, optically detectable marks formed in predetermined positions on the device-side circumferential projecting portion 3c and the photoelectric conversion device 5, and the like can be given. In a similar manner, a positioning means (such as a combination of a pin and a hole or through-hole, or optical marks) may be formed in the fiber-side circumferential projecting portion 3d and the optical fibers 6 (connector 10) to position the optical fibers 6 to the lens array 2, by mechanically or optically engaging the fiber-side circumferential projecting portion 3d and the optical fibers 6 to each other. As an example of the positioning means, in FIG. 1, FIG. 2, and FIG. 4, a pin 30 formed in the fiber-side circumferential projecting portion 3d is shown. Furthermore, as shown in FIG. 1 and FIG. 2, a third plate-shaped portion 3e is formed in the lens array main body 3 that opposes the second plate-shaped portion 3b and is perpendicularly connected to a right end portion of the first plate-shaped portion 3a. The third plate-shaped portion 3e can be provided as required.

Furthermore, in addition to the above-described configurations, various variation examples can be applied to the present invention.

(First Variation Example)

Figure 6:
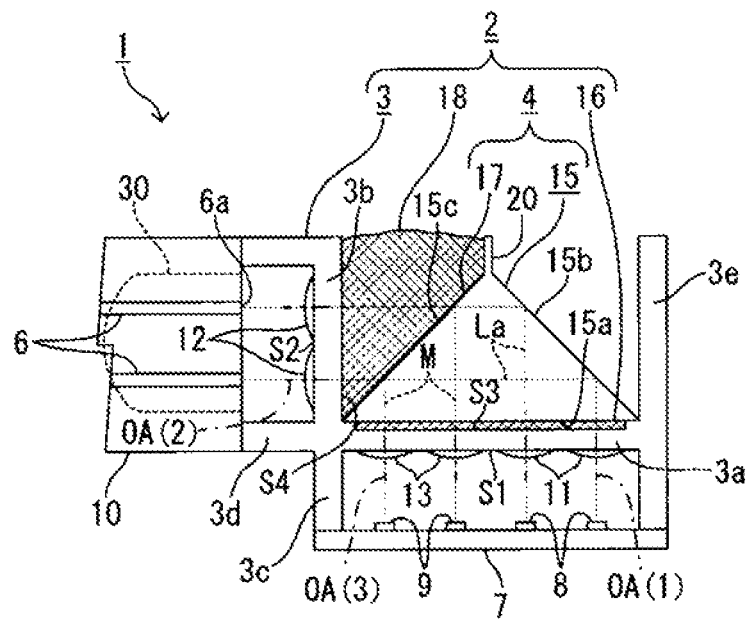
[FIG. 6] A vertical cross-sectional view of a first variation example of the first invention

For example, as shown in FIG. 6, as the prism 15, that in which a wall portion 20 for preventing leakage of the second filler material 18 onto the second prism surface 15b is erected in a boundary position between the second prism surface 15b and the third prism surface 15c may be used.

In a configuration such as this, when filling with the second filler material 18, leakage of the second filler material 18 onto the second prism surface 15b can be suppressed with certainty as a result of the wall portion 20 blocking the second filler material 18. Therefore, the total reflection function of the second prism surface 15b can be appropriately ensured.

(Second Variation Example)

Figure 7:
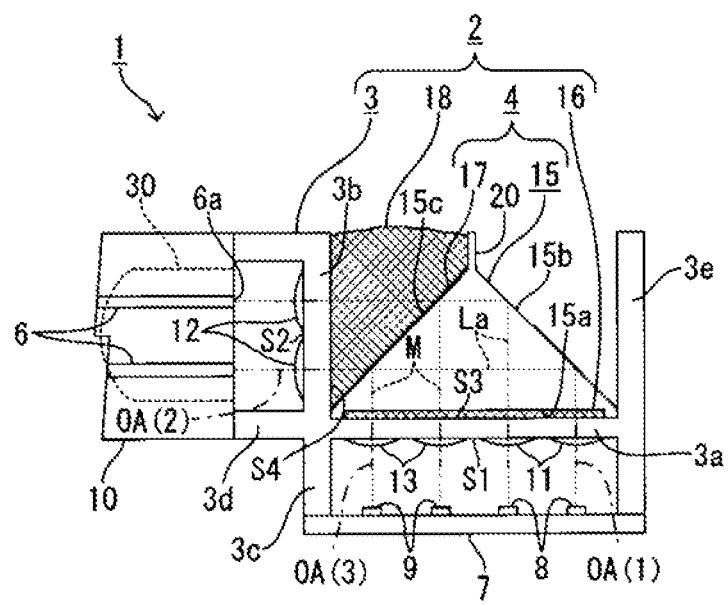
[FIG. 7] A vertical cross-sectional view of a second variation example of the first invention

In addition, as shown in FIG. 7, instead of the third surface S3 being formed into the recessing plane, the first prism surface 15a may be formed into a recessing plane.

In a configuration such as this as well, the filling space (gap portion) for the first filler material 16 between the third surface S3 and the first prism surface 15a can be easily ensured.

(Third Variation Example)

Figure 8A:
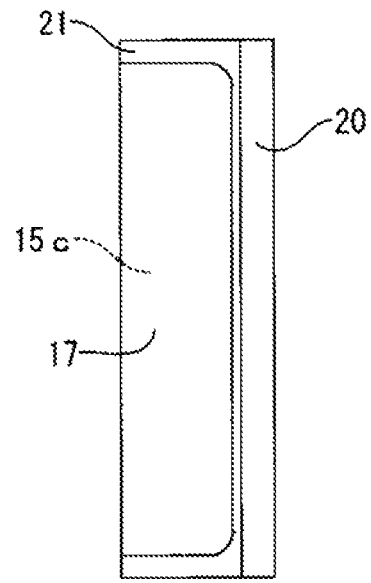
[FIG. 8] (a) A left-side view and (b) a planar view of a third variation example of the first invention
Figure 8B:
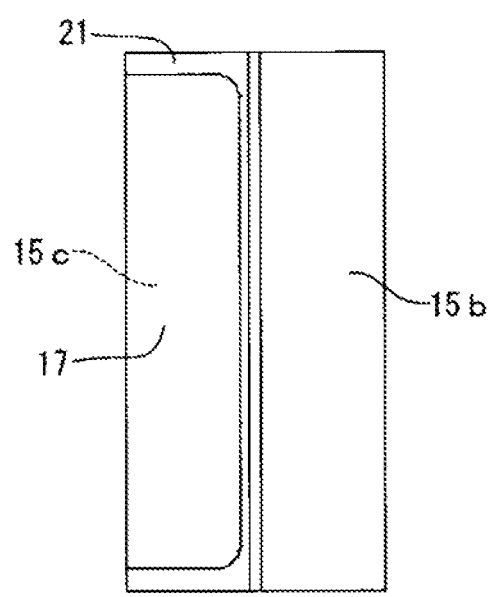

Furthermore, as shown in the left-side view in FIG. 8A and the planar view in FIG. 8B, as the prism 15, that in which a projecting stepped portion 21 for preventing leakage of the second filler material 18 onto the second prism surface 15b is formed in an edge portion of the third prism surface 15c may be used. The projecting stepped portion 21 is formed having a substantially U-shaped planar shape such as to enclose the reflection/transmission layer 17, and projects further, by a predetermined dimension, in the normal direction of the third prism surface 15c than the reflection/transmission layer 17.

In a configuration such as this, because the projecting stepped portion 21 allows the second filler material 18 to more easily accumulate on the reflection/transmission layer 17, leakage of the second filler material 18 onto the second prism surface 15b can be effectively suppressed. The total reflection function of the second prism surface 15c can be appropriately ensured.

(Fourth Variation Example)

Figure 9:
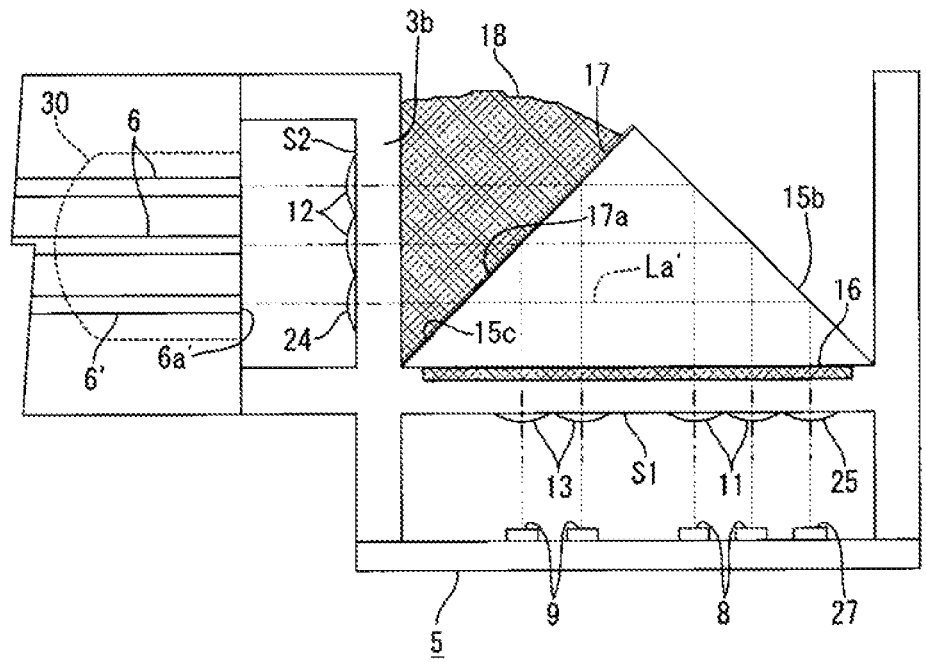
[FIG. 9] A vertical cross-sectional view of a fourth variation example of the first invention

Still further, as shown in FIG. 9, a configuration may be used that supports reception of optical signals in addition to transmission of optical signals. In other words, as shown in FIG. 9, a plurality of optical fibers 6' for reception are disposed in an array along the direction that is perpendicular to the surface of the paper on which FIG. 9 is printed, near the bottom of the optical fibers 6 in each row. In addition, as shown in FIG. 9, fourth lens faces 24 for reception are formed in an array along the direction that is perpendicular to the surface of the paper on which FIG. 9 is printed, in a position on the second surface S2 facing the end faces 6a of the optical fibers 6' for reception, the number of fourth lens faces 24 being the same as the number of optical fibers 6' for reception. Furthermore, as shown in FIG. 9, a section in a predetermined area of the third prism surface 15c on the lower end portion side is an extending portion that extends further than a lower end portion 17a of the reflection/transmission layer 17. The reflection/transmission layer 17 is not formed on the extending portion. Still further, as shown in FIG. 9, fifth lens faces 25 for reception are formed on the first surface S1 in an array along the direction that is perpendicular to the surface of the paper on which FIG. 9 is printed, the number of fifth lens faces 25 being the same as the number of optical fibers 6' for reception. In addition, as shown in FIG. 9, the photoelectric conversion device 5 includes light-receiving elements 27 for reception, the number of light-receiving elements 27 for reception being the same as the number of optical fibers 6' for reception.

In a configuration such as this, laser light La' for reception emitted from end faces 6a' of the optical fibers 6' for reception are converged by the fourth lens faces 24 and successively transmitted through the second plate-shaped portion 3b, the second filler material 18, and the extending portion of the third prism surface 15c (straight advancement). Thereafter, the light La' for reception is totally reflected at the second prism surface 15 towards the fifth lens face 25 side, converged at the fifth lens faces 25, and appropriately coupled with the light-receiving elements 27 for reception.

The above-described first invention is not limited to the above-described embodiment and may be variously modified to the extent that features thereof are not compromised.

For example, three or more rows of the light-emitting elements 8, the light-receiving elements 9, and the first to third lens faces 11 to 13 may be provided. In addition, two or more rows of the fourth and fifth lens faces 24 and 25 may be provided. Furthermore, the present invention can also be effectively applied to an optical transmission body other than the optical fibers, such as an optical waveguide.

Next, an embodiment of a lens array and an optical module including the lens array of a second invention of the present application will be described with reference to FIG. 10 to FIG. 21.

Figure 10:
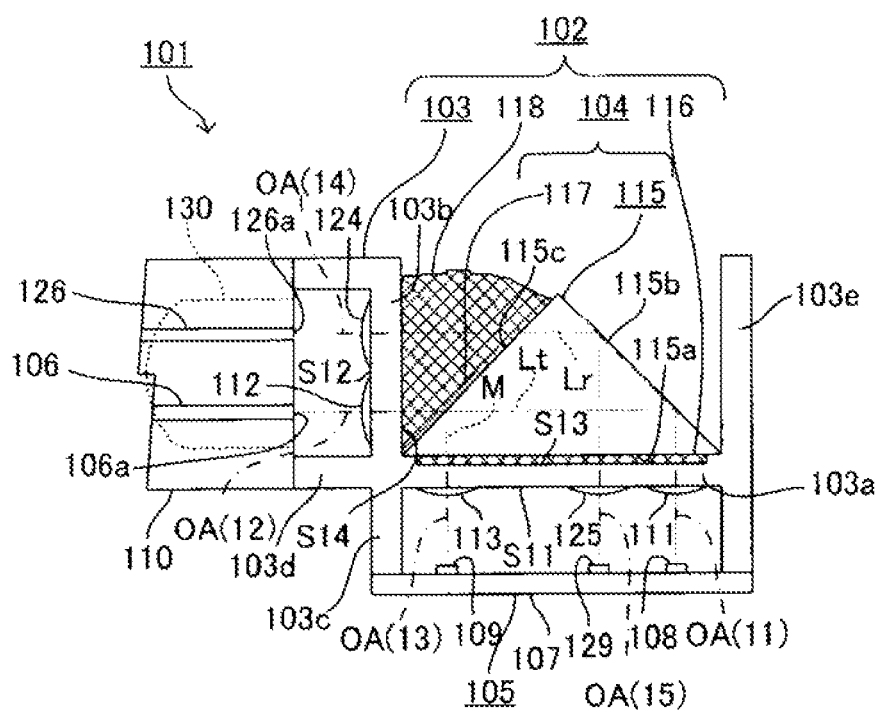
[FIG. 10] An overall configuration diagram of an optical module according to an embodiment of a second invention
Figure 11:
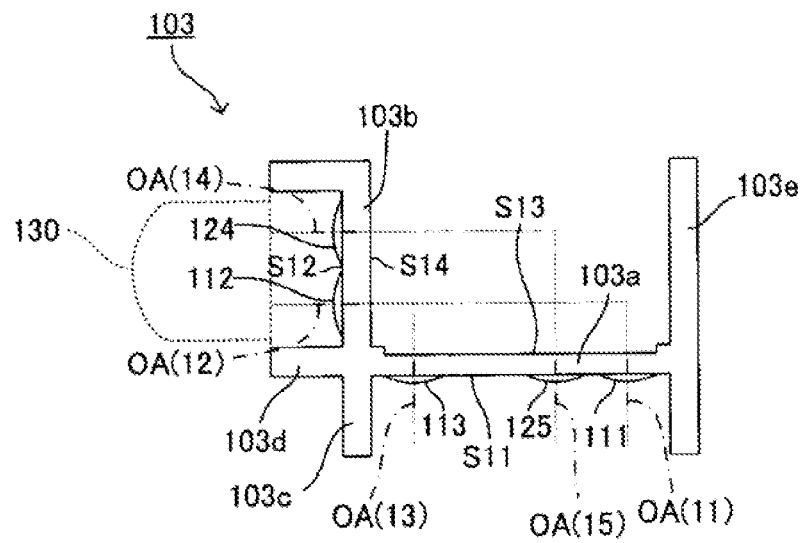
[FIG. 11] A vertical cross-sectional view of a lens array main body of a lens array according to the embodiment of the second invention
Figure 12:
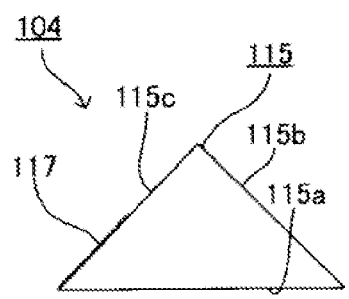
[FIG. 12] A vertical cross-sectional view of an optical path control member of the lens array according to a second embodiment of the second invention
Figure 13:
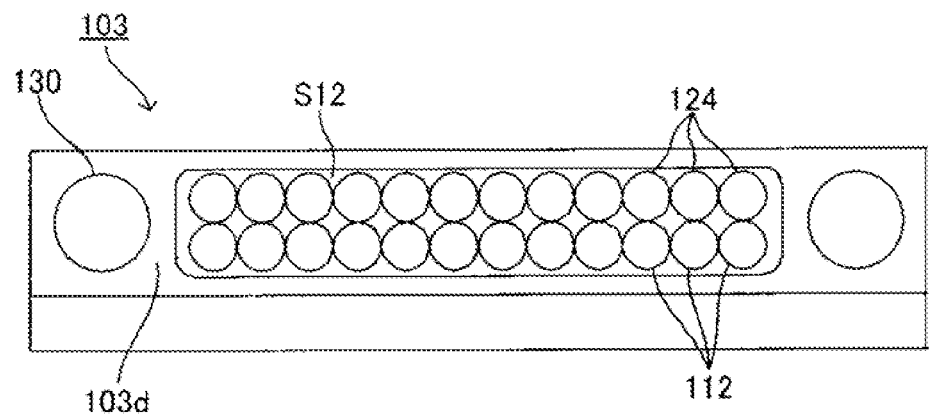
[FIG. 13] A left-side view of FIG. 11
Figure 14:
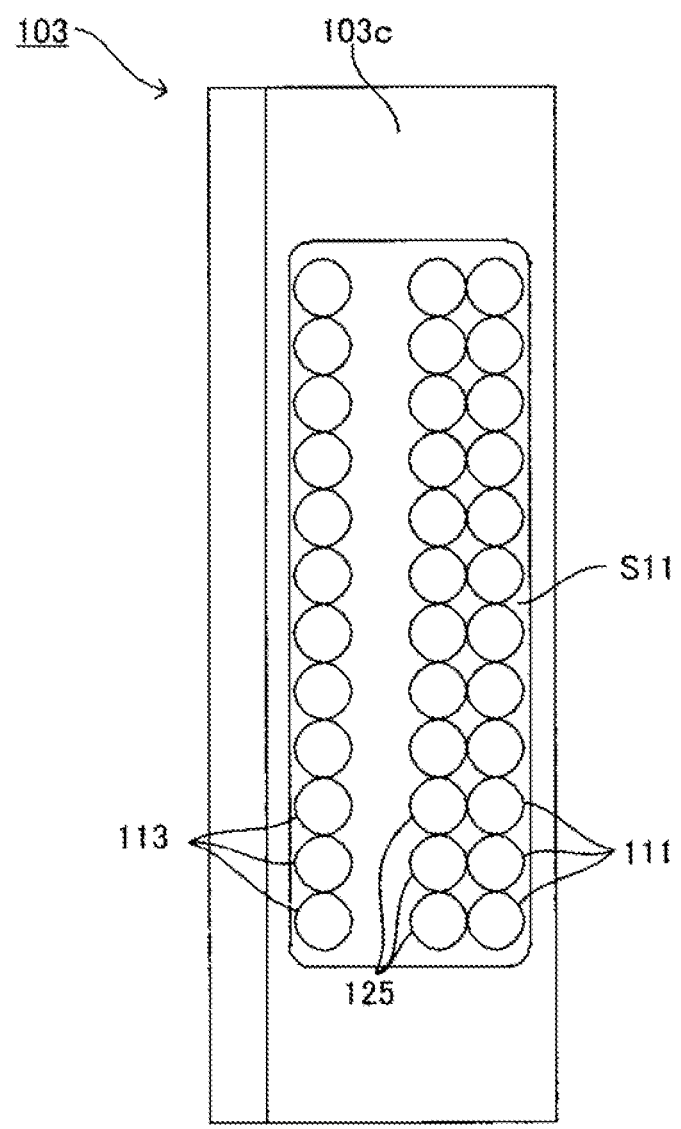
[FIG. 14] A bottom view of FIG. 11

Here, FIG. 10 is an overall configuration diagram showing an overview of an optical module 10 according to the embodiment of the second invention of the present application together with a vertical cross-sectional view of a lens array 102 according to the present embodiment. In addition, FIG. 11 is a vertical cross-sectional view of a lens array main body 103 configuring the lens array 102. Furthermore, FIG. 12 is a vertical cross-sectional view of an optical path control member 104 configuring the lens array 102 together with the lens array main body 103. Still further, FIG. 13 is a left-side view of FIG. 11. FIG. 14 is a bottom view of FIG. 11.

As shown in FIG. 10, the lens array 102 according to the present embodiment is disposed between a first photoelectric conversion device 105 for optical transmission and reception, and optical fibers 106 for optical transmission and optical fibers 126 for optical reception serving as optical transmission bodies.

Here, the first photoelectric conversion device 105 has a plurality of light-emitting elements 108 on a surface of a semiconductor substrate 107 facing the lens array 102, the light emitting-elements 108 emitting laser light Lt (only the center light of the light beam is shown) in a direction perpendicular to this surface (upward direction in FIG. 10). The light-emitting elements 108 configure the above-described VCSEL. The emission direction of the laser light Lt from each light-emitting element 108 is equivalent to a third direction in the present invention. The light-emitting elements 108 (12 light-emitting elements 108 according to the present embodiment) are formed in an array at an even pitch along a direction that is perpendicular to the surface of the paper on which FIG. 10 is printed in FIG. 10 and is a first direction, thereby forming a row of light-emitting elements 108 (single row). Furthermore, the first photoelectric conversion device 105 has a plurality of first light-receiving elements 109, the number of which is the same as the number of light-emitting elements 108, on the surface of the semiconductor substrate 107 facing the lens array 102, in a position on the left side in FIG. 10 that is a position on a second direction side and the optical transmission body side in relation to the row of light-emitting elements 108. The first light-receiving elements 109 receive monitor light M (only the center light is shown) for monitoring output (such as intensity or amount of light) of the laser light Lt emitted from each of the plurality of light-emitting elements 108. In a manner similar to the light-emitting elements 108, the first light-receiving elements 109 are formed in an array at an even pitch along a direction that is perpendicular to the surface of the paper on which FIG. 10 is printed in FIG. 10, thereby forming a row of first light-receiving elements 109 (single row). In addition, between each first light-receiving element 109 and a light-emitting element 108 that is in the same order when counted from one array direction, the positions in the array direction match each other. The first light-receiving element 109 may be a photodetector. Furthermore, as shown in FIG. 10, the first photoelectric conversion device 105 has a plurality of second light-receiving elements 129, the number of which is the same as the number of light-emitting elements 108, on the surface of the semiconductor substrate 107 facing the lens array 102, in a position near the left side of the light-emitting elements 108 that is a position between the row of light-emitting elements 108 and the row of first light-receiving elements 109. The second light-receiving elements 129 receive light Lr (only the center light is shown) transmitted via the optical fibers 126 for optical reception. In a manner similar to the light-emitting elements 108, the second light-receiving elements 129 are formed in an array at an even pitch along a direction that is perpendicular to the surface of the paper on which FIG. 10 is printed in FIG. 10, thereby forming a row of second light-receiving elements 129 (single row). The second light-receiving element 129 may be a photodetector. Furthermore, a control circuit (not shown) that controls the output of the laser light Lt emitted from the light-emitting element 108 based on the intensity and the amount of light of the monitor light M received by the first light-receiving element 109 is connected to the first photoelectric conversion device 105. As shown in FIG. 10, the first photoelectric conversion device 105 such as this is disposed opposing the lens array 102 in a state in which the semiconductor substrate 107 is in contact with the lens array 102. The first photoelectric conversion device 105, together with the lens array 102, configures the optical module 101 by, for example, being attached to the lens array 102 by a known fixing means (not shown) such as a clamp spring.

In addition, the same number of optical fibers 106 for optical transmission according to the present embodiment are provided as the number of light-emitting elements 108 and the number of first light-receiving elements 109. The optical fibers 106 for optical transmission are disposed in an array in the direction that is perpendicular to the surface of the paper on which FIG. 10 is printed in FIG. 10. Between the plurality of optical fibers 106 for optical transmission and the light-emitting element 108 that is in the same order when counted from one array direction, the positions in the array direction match each other. Furthermore, the same number of optical fibers 126 for optical reception according to the present embodiment are provided as the number of second light-receiving elements 129 (according to the present embodiment, the numbers of light-emitting elements 108, first light-receiving elements 109, and optical fibers 106 for optical transmission are also the same). The optical fibers 126 for optical reception are disposed in an array in the direction that is perpendicular to the surface of the paper on which FIG. 10 is printed in FIG. 10. Between the plurality of optical fibers 126 for optical reception and the second light-receiving element 129 that is in the same order when counted from one array direction, the positions in the array direction match each other. In addition, as shown in FIG. 10, the row of optical fibers 126 for optical reception are disposed above the row of optical fibers 106 for optical transmission. The optical fibers 106 and 126 of each row are, for example, multi-mode optical fibers 106 and 126 having the same dimensions as one another. A section of each optical fiber 106 and 126 on an end face 106a and 126a side is held within a multi-core integrated optical connector 110, such as a mechanically transferable [MT] connector. As shown in FIG. 10, the optical fibers 106 and 126 in each row such as this are attached to the lens array 102 by a known fixing means (not shown) (such as a clamp spring) in a state in which an end surface of the optical connector 110 on the lens array 102 side is in contact with the lens array 102.

The lens array 102 optically couples the plurality of light-emitting elements 8 with the end faces 106a of the plurality of optical fibers 106 for optical transmission to perform optical transmission, in a state in which the lens array 102 is disposed between the first photoelectric conversion device 105 and the optical fibers 106 and 126 for optical transmission and for optical reception, such as those described above. In addition, the lens array 102 optically couples the end faces 126a of the plurality of optical fibers 126 for optical reception and the plurality of second light-receiving elements 129 to perform optical reception.

The lens array 102 will be described in further detail. As shown in FIG. 10, the lens array 102 has the lens array main body 103 composed of a light-transmitting material (such as a resin material). The outer shape of the lens array main body 103 is formed into a substantially box-like shape. Specifically, as shown in FIG. 10 and FIG. 11, the lens array main body 103 has a first plate-shaped portion 103a that has a lateral plate shape with a rectangular planar shape. The first plate-shaped portion 103a has a predetermined width in the lateral direction, a predetermined depth in the direction perpendicular to the surface of the paper on which the drawings are printed, and a predetermined thickness in the vertical direction in FIG. 10 and FIG. 11, and faces the first photoelectric conversion device 105 from above. In addition, as shown in FIGS. 10 and 11, the lens array main body 103 has a second plate-shaped portion 103b that has a vertical plate shape with a rectangular planar shape. The second plate portion 103b extends at a right angle from a left end portion of the first plate-shaped portion 3a that is an end portion on the second direction side and the optical transmission body side, upwards on the side opposite to the first voltaic device 105 on the third direction side. The second plate-shaped portion 103b is formed such that the depth is the same dimension as that of the first plate-shaped portion 103a. In addition, the second plate-shaped portion 103b naturally has the same refractive index as the first plate-shaped portion 103a because the second plate-shaped portion 103b is integrated with the first plate-shaped portion 103a. Furthermore, the second plate-shaped portion 103b faces the end faces 106a and 126a of the optical fibers 106 and 126 for optical transmission and for optical reception from the right side in FIG. 10 and FIG. 11.

A lower end surface (plane) of the first plate-shaped portion 103a in the lens array main body 103 such as that described above is a first surface S1 that faces the first photoelectric conversion device 105. As shown in FIG. 11 and FIG. 14, first lens faces (convex lens faces) 111 having a circular planar shape are formed on the first surface S1, the number of first lens faces 111 being the same as the number of light-emitting elements 108. Here, as shown in FIG. 11 and FIG. 14, the first lens faces 111 are formed in an array at an even pitch along a direction that is perpendicular to the surface of the paper on which FIG. 11 is printed in FIG. 11 (vertical direction in FIG. 14), thereby forming a row of first lens faces 111 (single row). In addition, between the plurality of first lens faces 111 and a light-emitting element 108 that is in the same order when counted from one array direction, the positions in the array direction match each other. As shown in FIG. 14, first lens faces 111 that are adjacent to each other may be formed in an adjacent state in which the respective circumferential end portions are in contact with each other. In addition, as shown in FIG. 10, an optical axis OA(11) of each first lens face 111 preferably matches the center axis of the laser light Lt emitted from each light-emitting element 108. More preferably, the optical axis OA(11) of each first lens face 111 is perpendicular to the first surface S1.

As shown in FIG. 10, the laser light Lt emitted from each of the plurality of light-emitting elements 108 is incident on the plurality of first lens faces 11, such as those described above. More specifically, emitted light from a light-emitting element 108 is incident on a single arbitrary first lens face 111, the light-emitting element 108 being in the same order as the single arbitrary first lens face 111 when counted from one array direction, among the plurality of light-emitting elements 108. Then, each first lens face 111 advances the incident laser light Lt of each light-emitting element 108 towards the interior of the first plate-shaped portion 3a. Each first lens face 111 may collimate or converge the incident laser light Lt of each light-emitting element 8. Alternatively, the laser light Lt may by dispersed by each first lens face 111 being formed into a concave lens face.

On the other hand, a left end surface (plane) of the second plate-shaped portion 103b is a second surface S12 that faces the end faces 106a and 126a of the optical fibers 106 and 126 for optical transmission and for optical reception. As shown in FIG. 11 and FIG. 13, second lens faces (convex lens faces) 112 having a circular planar shape are formed on the second surface S12, the number of second lens faces 112 being the same as the number of light-emitting elements 108. Here, as shown in FIG. 11 and FIG. 13, the second lens faces 112 are formed in an array at an even pitch along a direction that is perpendicular to the surface of the paper on which FIG. 11 is printed in FIG. 11 (lateral direction in FIG. 13), thereby forming a row of second lens faces 112 (single row). Between the plurality of second lens faces 112 and a light-emitting element 108 that is in the same order when counted from one array direction, the positions in the array direction match each other. As shown in FIG. 13, second lens faces 112 that are adjacent to each other may be formed in an adjacent state in which the respective circumferential end portions are in contact with each other. In addition, as shown in FIG. 10, an optical axis OA(12) of each second lens face 112 preferably matches the center axis of the end face 106a of each optical fiber 106 for optical transmission. More preferably, the optical axis OA(12) of each second lens face 112 is perpendicular to the second surface S12.

As shown in FIG. 10, the laser light Lt emitted from each of the plurality of light-emitting elements 108 is incident on the plurality of second lens faces 112, such as those described above, after passing through the plurality of first lens faces 111 and a subsequent optical path (described in detail hereafter) of the lens array 102. More specifically, emitted light from a light-emitting element 108 is incident on a single arbitrary second lens face 112, the light-emitting element 108 being in the same order as the single arbitrary second lens face 112 when counted from one array direction, and the light having passed through the first lens face 111 in the same order. At this time, the center axis of the laser light Lt of each light-emitting element 108 preferably matches the optical axis OA(12) of each second lens face 112. Each second lens face 112 then converges the incident laser light Lt of each light-emitting element 108 and emits the laser light Lt towards the end face 106a of each optical fiber 106 for optical transmission corresponding to each second lens face 112.

In this way, each light-emitting element 108 and the end face 106a of each optical fiber 106 for optical transmission are optically coupled via each first lens face 111 and each second lens face 112.

Furthermore, as shown in FIG. 11 and FIG. 14, third lens faces (convex lens faces) 113 having a circular planar shape are formed in a position on the first surface S11 on the left side of the row of first lens faces 111, the number of third lens faces 113 being the same as the number of light-emitting elements 108. Here, as shown in FIG. 11 and FIG. 14, the third lens faces 113 are formed in an array at an even pitch along a direction that is perpendicular to the surface of the paper on which FIG. 11 is printed in FIG. 11 (vertical direction in FIG. 14), thereby forming a row of third lens faces 113 (single row). Between the plurality of third lens faces 113 and a light-emitting element 108 that is in the same order when counted from one array direction, the positions in the array direction match each other. As shown in FIG. 14, third lens faces 113 that are adjacent to each other may be formed in an adjacent state in which the respective circumferential end portions are in contact with each other. In addition, an optical axis OA(13) of each third lens face 113 preferably matches the center axis of a light-receiving surface of each first light-receiving element 109. More preferably, the optical axis OA(13) of each third lens face 113 is perpendicular to the first surface S11.

As shown in FIG. 10, the monitor light M of each light-emitting element 108 is incident on each third lens face 113, such as that described above, from the inner side of the first plate-shaped portion 103a (above). More specifically, monitor light from a light-emitting element 108 is incident on a single arbitrary third lens face 113, the light-emitting element 108 being in the same order as the single arbitrary third lens face 113 when counted from one array direction, and the light having passed through the first lens face 111 in the same order. Each third lens face 113 then converges the incident monitor light M of each light-emitting element 108 and emits the monitor light M towards each first light-receiving element 109 optically corresponding with each third lens face 113. A means for generating the monitor light M will be described hereafter.

Figure 15:
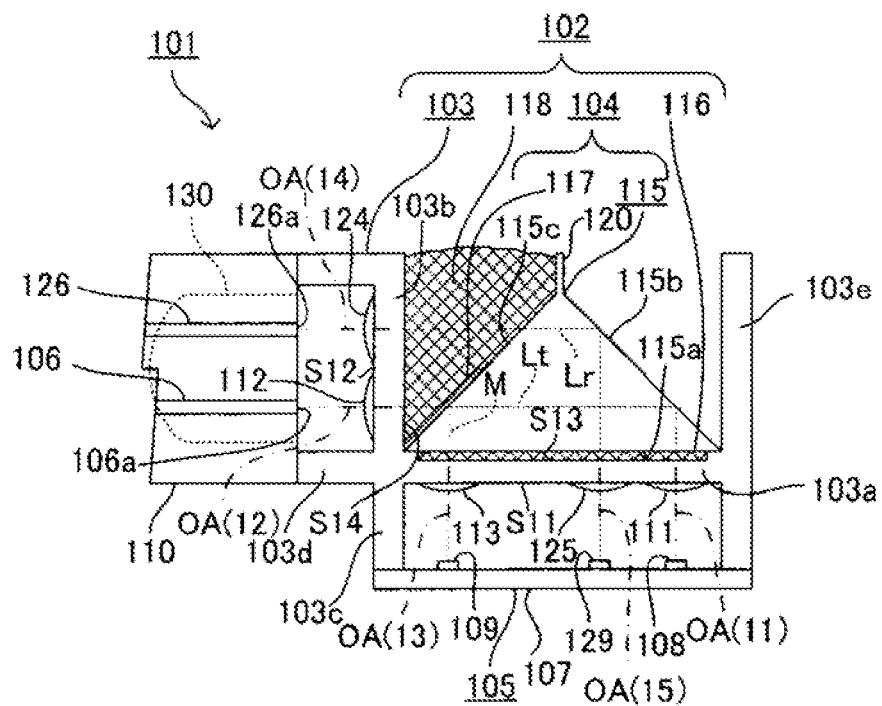
[FIG. 15] A vertical cross-sectional view of a first variation example of the second invention

Still further, as shown in FIG. 11 and FIG. 13, fourth lens faces (convex lens faces) 124 having a circular planar shape are formed on the second surface S12 in a position on the upper side on the side opposite to the first plate-shaped portion 103a on the third direction side in relation to the row of second lens faces 112, the number of fourth lens faces 124 being the same as the number of optical fibers 126 for optical reception. Here, as shown in FIG. 11 and FIG. 15, the fourth lens faces 124 are formed in an array at an even pitch along a direction that is perpendicular to the surface of the paper on which FIG. 11 is printed in FIG. 11 (lateral direction in FIG. 13), thereby forming a row of fourth lens faces 124 (single row). Between the plurality of fourth lens faces 124 and an optical fiber 126 for optical reception that is in the same order when counted from one array direction, the positions in the array direction match each other. As shown in FIG. 13, fourth lens faces 124 that are adjacent to each other may be formed in an adjacent state in which the respective circumferential end portions are in contact with each other. In addition, as shown in FIG. 13, an adjacent state such as this may be established with the second lens faces 112 as well. Furthermore, an optical axis OA(14) of each fourth lens face 124 preferably matches the center axis of the end face 126a of each optical fiber 126 for optical reception. More preferably, the optical axis OA(14) of each fourth lens face 124 is perpendicular to the second surface S12.

As shown in FIG. 10, laser light Lr emitted from each of the plurality of optical fibers 126 for optical reception is incident on the plurality of fourth lens faces 124, such as those described above. More specifically, emitted light from an end face 126a of an optical fiber 126 is incident on a single arbitrary fourth lens face 124, the optical fiber 126 being in the same order as the single arbitrary fourth lens face 124 when counted from one array direction, among the plurality of optical fibers 126 for optical reception. Then each fourth lens face 124 advances the incident laser light Lr of each optical fiber 126 towards the interior of the second plate-shaped portion 103b (left side). Each fourth lens face 124 may collimate or converge the incident laser light Lr of each optical fiber 126. Alternatively, the laser light Lr may by dispersed by each fourth lens face 124 being formed into a concave lens face.

Furthermore, as shown in FIG. 11 and FIG. 14, fifth lens faces (convex lens faces) 125 having a circular planar shape are formed in a position on the first surface S11 near the left side of the row of first lens faces 111 that is a position between the row of first lens faces 11 and the row of third lens faces, the number of fifth lens faces 125 being the same as the number of optical fibers 126 for optical reception. Here, as shown in FIG. 11 and FIG. 14, the fifth lens faces 125 are formed in an array at an even pitch along a direction that is perpendicular to the surface of the paper on which FIG. 11 is printed in FIG. 11 (vertical direction in FIG. 14), thereby forming a row of fifth lens faces 125 (single row). Between the plurality of fifth lens faces 125 and an optical fiber 126 for optical reception that is in the same order when counted from one array direction, the positions in the array direction match each other. As shown in FIG. 14, fifth lens faces 125 that are adjacent to each other may be formed in an adjacent state in which the respective circumferential end portions are in contact with each other. In addition, as shown in FIG. 14, an adjacent state such as this may be established with the first lens faces 111 as well. Furthermore, an optical axis OA(15) of each fifth lens face 125 preferably matches the center axis of a light-receiving surface of each second light-receiving element 129. More preferably, the optical axis OA(15) of each fifth lens face 125 is perpendicular to the first surface S11.

As shown in FIG. 10, the laser light Lr emitted from each of the plurality of optical fibers 126 for optical reception is incident on the plurality of fifth lens faces 125, such as those described above, after passing through the plurality of fourth lens faces 124 and a subsequent optical path (described in detail hereafter) of the lens array 102. More specifically, emitted light from an optical fiber 126 for optical reception is incident on a single arbitrary fifth lens face 125, the optical fiber 126 being in the same order as the single arbitrary fifth lens face 125 when counted from one array direction, and the light having passed through the fourth lens face 124 in the same order. At this time, the center axis of the laser light Lr of each optical fiber 126 preferably matches the optical axis OA(15) of each fifth lens face 125. Each fifth lens face 125 then converges the incident laser light Lr of each optical fiber 126 and emits the laser light Lr towards each second light-receiving element 129 corresponding to each fifth lens face 125.

In this way, the end face 126a of each optical fiber 126 for optical reception and each second light-receiving element 129 are optically coupled via each fourth lens face 124 and each fifth lens face 125.

Next, a specific means for forming the optical path that relays among the lens faces 111, 112, and 113 for optical transmission and for monitoring, and between the lens faces 124 and 125 for optical reception will be described.

In other words, as shown in FIG. 10, a recessing plane (spot face plane) that slightly recesses downward is formed on an upper end surface of the first plate-shaped portion 103a. The recessing plane is a third surface S13 on the side opposite to the first surface S11 in the first plate-shaped portion 103a. As shown in FIG. 10, the above-described optical path control member 104 is disposed in a position near the upper portion of the third surface S13, such as to provide a space above the third surface S13 (on the third direction side and on the side opposite to the first photoelectric conversion device 105).

Here, the optical path control member 104 will be described in detail. As shown in FIG. 10 and FIG. 12, the optical path control member 104 has a prism 115 composed of a light-transmitting material (such as a resin material) and having a triangular vertical cross-sectional shape (triangular prism shape). The prism 115 forms each of an optical path for the laser light Lt of each light-emitting element 108 after the laser light Lt has been incident on each first lens face 111, and an optical path for the laser light Lr of each optical fiber 126 after the laser light Lr has been incident on each fourth lens face 124.

Specifically, as shown in FIG. 10, the prism 115 has a first prism surface 115a that forms a portion (bottom surface) of the surface of the prism 115. The first prism surface 115a faces the third surface S13 from near above. As shown in FIG. 10, a lateral width of the first prism surface 115a is formed to be substantially the same width as a lateral width of the first plane-shaped portion 103a. In addition, as shown in FIG. 10, a gap portion between the first prism surface 115a and the third surface S13 is a space formed as a result of the third surface S13 being the recessing plane. The space is filled with a first filler material 116 composed of a light-transmitting adhesive. The prism 115 is bonded to the lens array main body 103 using the adhesive force of the first filler material 116. As the first filler material 116, a thermoset resin, an ultra-violet hardening resin, or the like can be used.

As shown in FIG. 10, the laser light Lt of each light-emitting element 108 that has been incident on each first lens face 111 and transmitted through the first plate-shaped portion 103a and the first filler material 116 is incident on the first prism surface 115a, such as that described above, from below (third direction). The first prism surface 115a transmits the incident laser light Lt of each light-emitting element 108 and advances the laser light Lt onto an optical path within the prism 115. In addition, as shown in FIG. 10, the laser light Lr of each optical fiber 126 that has been incident on each fourth lens face 124 is internally incident on the first prism surface 115a from above. The first prism surface 115a transmits the internally incident laser light Lr of each optical fiber 126 towards each fifth lens face 125 side. The laser light Lr of each optical fiber 126 that has been transmitted in this way passes through the first filler material 116 and the first plate-shaped portion 103a, is internally incident on each fifth lens face 125, and is emitted by each fifth lens face 125 towards each corresponding second light-receiving element 129.

In addition, as shown in FIG. 10, the prism 115 has a second prism surface 115b that forms a portion (right sloping surface) of the surface of the prism 115. The second prism surface 115b is connected to a right end portion of the first prism surface 115a at a lower end portion of the second prism surface 115b. In addition, the second prism surface 115b has a predetermined slope angle in relation to the first prism surface 115a, such as to slope towards the second plate-shaped portion 103b side (left side) as the second prism surface 115b becomes farther from the first prism surface 115a.

As shown in FIG. 10, the laser light Lt of each light-emitting element 108 that has been incident on the first prism surface 115a and advanced on the optical path within the prism 115 is internally incident on the second prism surface 115b from below, such as that described above, at an angle of incidence that is greater than the critical angle. The second prism surface 115b then totally reflects the internally incident laser light Lt of each light-emitting element 108 towards each second lens face 112 (left side). In addition, as shown in FIG. 10, the laser light Lr of each optical fiber 126 that has been incident on each fourth lens face 124 and not yet incident on the first prism surface 115a is internally incident on the second prism surface 115b from the left side, such as that described above, at an angle of incidence that is greater than the critical angle. The second prism surface 115b then totally reflects the internally incident laser light Lr of each optical fiber 126 towards the first prism surface 115a. The laser light Lr of each optical fiber 126 that has been totally reflected in this way is internally incident on the first prism surface 115a as described above.

Furthermore, as shown in FIG. 10, the prism 115 has a third prism surface 115c that forms a portion (left sloping surface) of the surface of the prism 115. The third prism surface 115c is connected to a left end portion of the first prism surface 115a at a lower end portion of the third prism surface 115c. The third prism surface 115c is also connected to an upper end portion of the second prism surface 115b at an upper end portion. In addition, as shown in FIG. 10, the third prism surface 115c has a predetermined slope angle in relation to the first prism surface 115a such as to slope towards the side opposite to the second plate-shaped portion 103b (right side) as the third prism surface 115c becomes farther from the first prism surface 115a.

As shown in FIG. 10, the laser light Lt of each light-emitting element 8 that has been totally reflected by the second prism surface 115b and advanced on the optical path within the prism 115 is internally incident on the third prism surface 115c, such as that described above, from the right side. In addition, as shown in FIG. 10, the laser light Lr of each optical fiber 126 that has been incident on each fourth lens face 124 and not yet internally incident on the second prism surface 115b is incident on the third prism surface 115c from the left side. The laser light Lr of each optical fiber 126 that has been incident in this way is internally incident on the second prism surface 115b as described above, after having passed through the third prism surface 115c.

As shown in FIG. 10 and FIG. 12, in addition to the prism 115 such as this, the optical path control member 104 further has a thin reflection/transmission layer 117 on the third prism surface 115c, over an area that is the first plate-shaped portion 103a-side half (lower half) as a predetermined area including the incidence position of the laser light Lt of each light-emitting element 108 and excluding the incidence position of the laser light Lr of each optical fiber 126. The reflection/ transmission layer 117 may be formed by the third prism surface 115c being coated with a single layer film composed of a single metal, such as Ni, Cr, or Al, or a dielectric multi-layer film obtained by alternately stacking a plurality of dielectric bodies (such as $TiO_2$ and $SiO_2$) having differing dielectric constants. In this instance, a known coating technique, such as Inconel deposition, can be used for coating. When coating such as this is used, the reflection/transmission layer 117 can be formed having a very thin thickness that is, for example, 1 μm or less.

As shown in FIG. 10, the laser light Lt of each light-emitting element 108 that has been internally incident on the incidence position on the third prism surface 115c is immediately incident on the reflection/transmission layer 117 such as this. Then, the reflection/transmission layer 117 reflects the incident laser light Lt of each light-emitting element 108 at a predetermined reflectance towards the side of each third lens face 113 (downward) corresponding with each monitor light M, as the monitor light M of each light-emitting element 108 with each light-emitting element 108. In addition, the reflection/transmission layer 117 transmits the laser light Lt of each light-emitting element 108 towards the side of each second lens face 12 (left side) at a predetermined transmittance. At this time, because the thickness of the reflection/transmission layer 117 is thin, refraction of the laser light Lt passing through the reflection/transmission layer 117 can be ignored (considered straight-advancing transmittance). The reflectance and transmittance of the reflection/transmission layer 117 can be set to desired values based on the material, thickness, and the like of the reflection/transmission layer 117, with the restriction that monitor light M of an amount sufficient to monitor the output of the laser light Lt can be obtained. For example, when the reflection/transmission layer 117 is formed by the above-described single layer film, the reflectance of the reflection/transmission layer 117 can be 20% and the transmittance 60% (absorption 20%), depending on the thickness. In addition, for example, when the reflection/transmission layer 117 is formed by the above-described dielectric multi-layer film, the reflectance of the reflection/transmission layer 117 can be 10% and the transmittance 90%, depending on the thickness and the number of layers.

In this way, the monitor light M of each light-emitting element 108 that has been reflected by the reflection/transmission layer 117 advances on the optical path within the prism 115 and successively passes through the first prism surface 115a, the first filler material 116, and the first plate-shaped portion 103a. Thereafter, the monitor light M of each light-emitting element 108 is internally incident on the corresponding third lens face 113 and emitted from each third lens face 113 towards the corresponding light-receiving element 9.

In addition, as shown in FIG. 10, the area between the reflection/transmission layer 117 and a fourth surface S4 (right end surface) of the second plate-shaped portion 3b opposite to the second surface S12 is filled with a second filler material 18 composed of a light-transmitting adhesive, such as a thermoset resin or an ultra-violet hardening resin. Therefore, the prism 115 is more stably bonded to the lens array main body 103 using the adhesive force of the second filler material 18 in addition to the first filler material 116. The difference in refractive index between the second filler material 18 and the prism 115 is a predetermined value or less. The difference in refractive index is preferably 0.01 or less, and more preferably 0.005 or less. For example, when the prism 115 is formed by OKP4HT manufactured by Osaka Gas Chemicals Co., Ltd. as polyester, the second filler material 18 may be formed by EA-0200 manufactured by Osaka Gas Chemicals Co., Ltd. as an ultra-violet hardening resin. In this instance, the refractive indexes of the prism 115 and the second filler material 18 in relation to light having a wavelength of 850 nm can both be 1.61.

As shown in FIG. 10, the laser light Lt of each light-emitting element 108 that has been transmitted by the reflection/transmission layer 117 is immediately incident on the second filler material 18, such as that described above. At this time, the direction of incidence of the laser light Lt of each light-emitting element 108 in relation to the second filler material 18 can be considered the same as the direction of incidence of the laser light Lt of each light-emitting element 108 in relation to the reflection/transmission layer 117. This is because the reflection/transmission layer 117 is very thin, and refraction of the laser light Lt at this layer 117 can be ignored. Then, the laser light Lt of each light-emitting element 108 that has been incident on the second filler material 118 advances on an optical path within the second filler material 118 towards the side of each second lens face 112. At this time, because the difference in refractive index between the second filler material 118 and the prism 115 is sufficiently small, when the laser light Lt of each light-emitting element 108 is incident on the second filler material 118, refraction does not occur in the laser light Lt. Then, the laser light Lt of each light-emitting element 108 that has advanced on the optical path within the second filler material 118 passes through the second plate-shaped portion 103b, is internally incident on each second lens face 112, and is emitted by each second lens face 12 towards the end face 106a of each optical fiber 106 for optical transmission corresponding thereto. In addition, as shown in FIG. 10, the laser light Lr of each optical fiber 126 that has been incident on each fourth lens face 124 and not yet incident on the third prism surface 115c is incident on the second filler material 118 from the left side. The laser light Lr of each optical fiber 126 that has advanced on the optical path within the second filler material is then incident on the incidence position on the third prism surface 115c, as described above. At this time, because the difference in refractive index between the second filler material 118 and the prism 115 is sufficiently small, when the laser light Lr of each optical fiber 126 is incident on the third prism surface 115c, refraction does not occur in the laser light Lr.

In a configuration such as that described above, the laser light Lt of each light-emitting element 108 that has been incident on the first lens faces 111 in each row is totally reflected by the second prism surface 115b. Thereafter, the laser light Lt of each light-emitting element 108 is divided by the reflection/transmission layer 117 towards the side of each second lens face 112 and the side of each third lens face 113. Then, the laser light Lt of each light-emitting element 108 that has been divided (transmitted) towards the side of each second lens face 112 is emitted by each second lens face 112 towards the side of the end face 106a of each optical fiber 106. In addition, the monitor light M of each light-emitting element 108 that has been divided (reflected) towards the side of the third lens face 113 in each row with sufficient reflectance can be emitted from each third lens face 113 towards the side of each first light-receiving element 109. On the other hand, the laser light Lr of each optical fiber 126 for optical reception that has been incident on each fourth lens face 124 is transmitted through the area of the third prism surface 115c on which the reflection/transmission layer 117 is not formed. Thereafter, the laser light Lr of each optical fiber 126 for optical reception is totally reflected by the second prism surface 115b towards the side of each fifth lens face 125, and emitted by each fifth lens face 125 towards the side of each second light-receiving element 129. As a result, optical coupling of each light-emitting element 108 and the end face 106a of each optical fiber 106 for optical transmission can be appropriately performed, and the monitor light can be efficiently obtained with certainty. In addition, optical coupling of the end face 126a of each optical fiber 126 and each second light-receiving element 129 for optical reception can be appropriately performed. In addition, as a result of a total reflection function (115b) and a light-dividing function (117) being concentrated in positions near each other on a single component 115, a compact and simple design can be achieved. Furthermore, instead of the area for optical transmission and the area for optical reception being divided in the array direction of the lens faces as in Patent Literature 1, the areas can be separated in the direction perpendicular to the array direction of the lens faces, and separation of the optical path for optical transmission and the optical path for optical reception can be selected by whether or not the reflection/transmission layer 117 is formed. As a result, when more channels are achieved as in the present invention, excessive increase in the width of the lens array main body 103 in the array directions of the lens faces 111, 112, 113, 124, and 125 can be suppressed. In addition, the optical path for optical reception can be disposed outside of the components (reflection/transmission layer 117) for optical transmission by a simple method. Therefore, a design that is compact while having multiple channels and a simple design for the optical path for optical reception can be achieved. In addition, as a result of the prism 115 and the second filler material 118 being formed such that the difference in refractive index is a predetermined value or less, linearity between the optical path between the second prism surface 115b and the third prism surface 115c and the optical path within the second filler material 118 can be ensured. Therefore, in an instance in which the laser light Lt incident on each second lens face 112 is confirmed to be misaligned from the center of each lens face 112 during product inspection, the areas requiring size adjustment to resolve the misalignment can be reduced. Moreover, this configuration contributes to facilitation of manufacturing. Specifically, in a configuration in which, for example, linearity between the optical path between the second prism surface 115b and the third prism surface 115c and the optical path within the second filler material 118 cannot be ensured, to correct the axial misalignment of incident light on each second lens face 12 to be within an allowable limit, the slope angle of the third prism surface 115c may be required to be adjusted. On the other hand, according to the present embodiment, if the total reflection direction at the second prism surface 115b is appropriately ensured, complicated size adjustment, such as resetting the third prism surface 115c to an optimal angle, is not required.

Furthermore, according to the present embodiment, as described above, in the first photoelectric conversion device 105, the row of second light-receiving elements 129 is disposed in a position between the row of light-emitting elements 108 and the row of first light-receiving elements 109. In accompaniment, the row of fifth lens faces 125 is disposed in a position between the row of first lens faces 111 and the row of third lens faces 113. In addition, in the second prism surface 115b, the total-reflection position of the laser light Lt of each light-emitting element 108 is set further towards the first plate-shaped portion 103 side than the total-reflection position of the laser light Lr of each optical fiber 126. In the third prism surface 115c, the incidence position of the laser light Lt of each light-emitting element 108 is set further towards the first plate-shaped portion 103a side than the incidence position of the laser light Lr of each optical fiber 126. Furthermore, the reflection/transmission layer 117 is formed in part of an area on the first plate-shaped portion 103a side of the third prism surface 115c, and the row of second lens faces 112 is disposed in a position towards the first plate-shaped portion 103a side in relation to the row of fourth lens faces 124.

In a configuration such as this, regarding the laser light Lt of each light-emitting element 108 of which high accuracy is required for the expected coupling efficiency in relation to the end face 106a of each optical fiber 106 for optical transmission, optical path design can be achieved in which the optical path length within the prism 115 that has superior optical stability based on uniformity of density than the second filler material 118 is longer than the optical path length within the second filler material 118. Therefore, the coupling efficiency in relation to the end face 106a of each optical fiber 106 can be stably ensured.

In addition to the above-described configuration, furthermore, according to the present embodiment, as shown in FIG. 10, the third surface S13 is formed such as to be perpendicular to the optical axis OA(11) of each first lens face 111. In addition, the first prism surface 115a is disposed in parallel with the third surface S31.

In a configuration such as this, the laser light Lt of each light-emitting element 108 can be perpendicularly incident on the first filler material 116 and the first prism surface 151a. Therefore, a simple design can be achieved in which linearity of the optical path between each first lens face 111 and the second prism surface 115b is ensured. In addition, the degree of freedom in the selection of materials (refractive index) for the lens array main body 103, the first filler material 116, and the prism 115 can be widened.

In addition to the above-described configuration, furthermore, according to the present embodiment, as shown in FIG. 10, the fourth surface S14 is formed such as to be perpendicular to the optical axis OA(12) of each second lens face 112 and the optical axis OA(14) of each fourth lens face 124. The laser light Lt of each light-emitting element 108 that has passed through the reflection/transmission layer 117 is perpendicularly incident on the fourth surface S14 from the second filler material 118 side. In addition, the laser light Lr of each optical fiber 126 that has been incident on each fourth lens face 124 is perpendicularly incident on the second filler material 118.

In a configuration such as this, a simple design can be achieved in which linearity of the optical path before and after the fourth surface S14 is ensured. In addition, the degree of freedom in the selection the materials (refractive index) for the lens array main body 103 and the second filler material 118 can be widened.

In addition to the above-described configuration, furthermore, according to the present embodiment, as shown in FIG. 10 and FIG. 12, the slope angle of the second prism surface 115b is 45° in the clockwise direction in FIG. 10 and FIG. 12 with reference to the first prism surface 115a (0°). In addition, as shown in FIG. 10 and FIG. 12, the slope angle of the third prism surface 115c is 45° in the counter-clockwise direction in FIG. 10 and FIG. 12 with reference to the first prism surface 115a. In other words, the third prism surface 115c is at a right angle to the second prism surface 115b.

In a configuration such as this, because the prism 115 can be formed into an isosceles right triangle, measurement of the dimensional accuracy of the prism 115 can be easily performed, and handleability can be improved. In addition, optical path design is further facilitated because the total-reflection angle of the laser light Lt of each light-emitting element 108 at the second prism surface 115b, the total-reflection angle of the laser light Lr of each optical fiber 126, and the total-reflection angle of the laser light Lr of each light-emitting element 108 at the reflection/transmission layer 117 can be designed to be 90°.

In addition to the above-described configuration, furthermore, the lens array main body 103 and the first filler material 116 may be formed such that the difference in refractive index is a predetermined value or less (such as 0.01 or less [preferably 0.005 or less]).

In a configuration such as this, because refraction and Fresnel reflection of the laser light Lt of each light-emitting element 108 at the boundary between the third surface S13 and the first filler material 116 can be suppressed, a simple design can be performed in which linearity of the optical path before and after the third surface S13 is ensured without being restricted by the linearity between the third surface S13 and the optical axis OA(11) of each first lens face 11, described above. In addition, generation of stray light that is a hindrance to optical transmission and reception, and monitoring can be suppressed.

In addition to the above-described configuration, furthermore, the first filler material 116 and the prism 115 may be formed such that the difference in refractive index is a predetermined value or less (such as 0.01 or less [preferably 0.005 or less]).

In a configuration such as this, because refraction and Fresnel reflection of the laser light Lt of each light-emitting element 108 at the boundary between the first filler material 116 and the first prism surface 115a can be suppressed, a simple design can be performed in which linearity of the optical path before and after the first prism surface 115a is ensured without being restricted by the linearity between the first prism surface 115a and the optical axis OA(11) of each first lens face 11. In addition, generation of stray light that is a hindrance to optical transmission and reception, and monitoring can be suppressed.

In addition to the above-described configuration, furthermore, the lens array main body 103 and the second filler material 118 may be formed such that the difference in refractive index is a predetermined value or less (such as 0.01 or less [preferably 0.005 or less]).

In a configuration such as this, because refraction and Fresnel reflection of the laser light Lt of each light-emitting element 108 and the laser light Lr of each optical fiber 126 at the boundary between the second filler material 118 and the fourth surface S14 can be suppressed, a simple design can be performed in which linearity of the optical path before and after the fourth surface S14 is ensured without being restricted by the linearity between fourth surface S14 and the optical axis OA(12) of each second lens face 112, as described above. In addition, generation of stray light that is a hindrance to optical transmission and reception, and monitoring can be suppressed.

In addition to the above-described configuration, furthermore, the first filler material 116 and the second filler material 118 may be the same material.

In a configuration such as this, because an operation for changing the filler material is not required during assembly, the manufacturing process can be simplified, and easier manufacturing can be performed.

In addition to the above-described configuration, furthermore, the lens array main body 103 and the prism 115 may be composed of the same material.

In a configuration such as this, cost reduction can be achieved by unifying the material.

In addition to the above-described configuration, as shown in FIG. 10 and FIG. 14, the lens array main body 103 has a device-side circumferential projecting portion 103c for holding the first photoelectric conversion device 105. The device-side circumferential projecting portion 103c is formed such as to project further towards the first photoelectric conversion device 105 side (downward in FIG. 10) than the first surface S11 and the first lens faces 111, such as to enclose the first surface S11 from four directions. In addition, the device-side circumferential projecting portion 103c comes into contact with and holds the first photoelectric conversion device 105 at the tip surface (lower end surface). The tip surface of the device-side circumferential projecting portion 103c is in parallel and flush with the first surface S11. In addition, as shown in FIG. 10 and FIG. 13, the lens array main body 103 has a fiber-side circumferential projecting portion 103d for holding the optical fibers 106 and 126. The fiber-side circumferential projecting portion 103d is formed such as to project further towards the optical fiber 106 and 126 side (left side in FIG. 10) than the second surface S12 and the second lens faces 112, such as to enclose the second surface S12 from four directions. In addition, the fiber-side circumferential projecting portion 103d comes into contact with and holds the optical fibers 106 and 126 at the tip surface (left end surface). The tip surface of the fiber-side circumferential projecting portion 103d is in parallel and flush with the second surface S12. In addition, a positioning means may be formed in the device-side circumferential projecting portion 103c and the first photoelectric conversion device 105 (semiconductor substrate 107) to position the first photoelectric conversion device 105 to the lens array 102, by mechanically or optically engaging the device-side circumferential projecting portion 103c and the first photoelectric conversion device 105 to each other. As the positioning means, a combination of a pin formed on either of the device-side circumferential projecting portion 103c and the first photoelectric conversion device 105 and a through-hole or a hole for pin insertion formed on the other, optically detectable marks formed in predetermined positions on the device-side circumferential projecting portion 103c and the first photoelectric conversion device 105, and the like can be given. In a similar manner, a positioning means (such as a combination of a pin and a hole or through-hole, or optical marks) may be formed in the fiber-side circumferential projecting portion 103d and the optical fibers 106 and 126 (connector 110) to position the optical fibers 106 to the lens array 102, by mechanically or optically engaging the fiber-side circumferential projecting portion 103d and the optical fibers 106 and 126 to each other. As an example of the positioning means, in FIG. 10, FIG. 11, and FIG. 13, a pin 130 formed in the fiber-side circumferential projecting portion 103d is shown. Furthermore, as shown in FIG. 10 and FIG. 11, a third plate-shaped portion 103e is formed in the lens array main body 103 that opposes the second plate-shaped portion 103b and is perpendicularly connected to a right end portion of the first plate-shaped portion 103a. The third plate-shaped portion 103e can be provided as required.

Furthermore, in addition to the above-described configurations, various variation examples can be applied to the present invention.

(First Variation Example)

For example, as shown in FIG. 15, as the prism 115, that in which a wall portion 120 for preventing leakage of the second filler material 118 onto the second prism surface 115b is erected in a boundary position between the second prism surface 115b and the third prism surface 115c may be used.

In a configuration such as this, when filling with the second filler material 118, leakage of the second filler material 118 onto the second prism surface 115b can be suppressed with certainty as a result of the wall portion 120 blocking the second filler material 118. Therefore, the total reflection function of the second prism surface 115b can be appropriately ensured.

(Second Variation Example)

Figure 16:
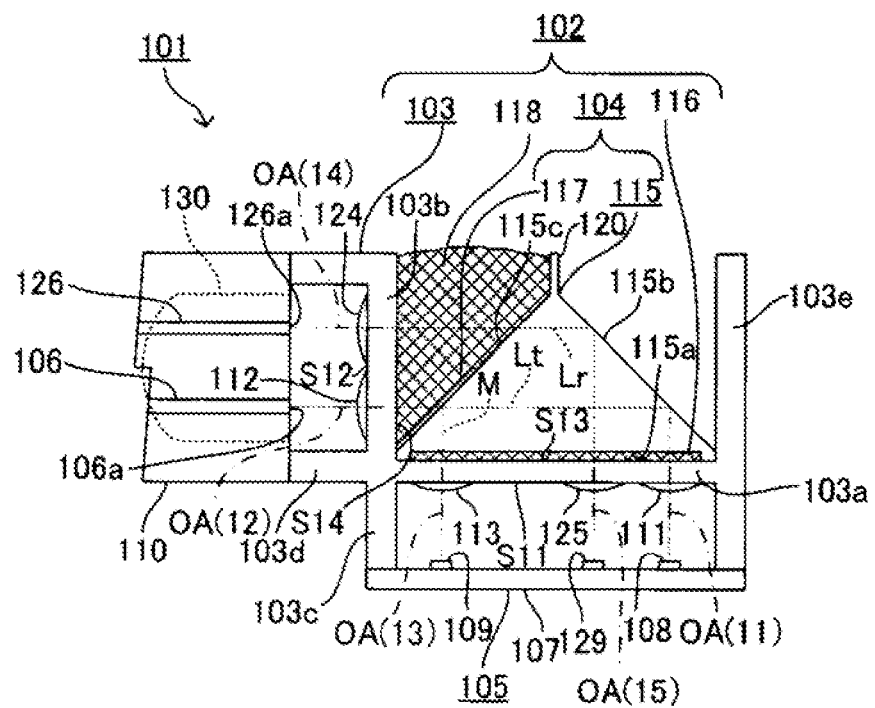
[FIG. 16] A vertical cross-sectional view of a second variation example of the second invention

In addition, as shown in FIG. 16, instead of the third surface S13 being formed into the recessing plane, the first prism surface 115a may be formed into a recessing plane.

In a configuration such as this as well, the filling space (gap portion) for the first filler material 116 between the third surface S13 and the first prism surface 115a can be easily ensured.

(Third Variation Example)

Figure 17A:
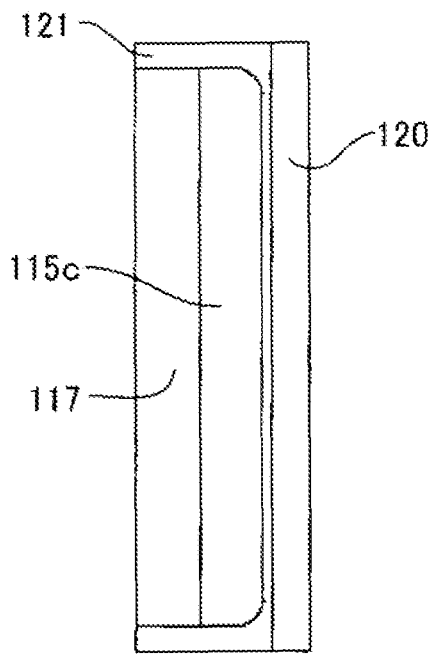
[FIG. 17] (a) A left-side view and (b) a planar view of a third variation example of the second invention
Figure 17B:
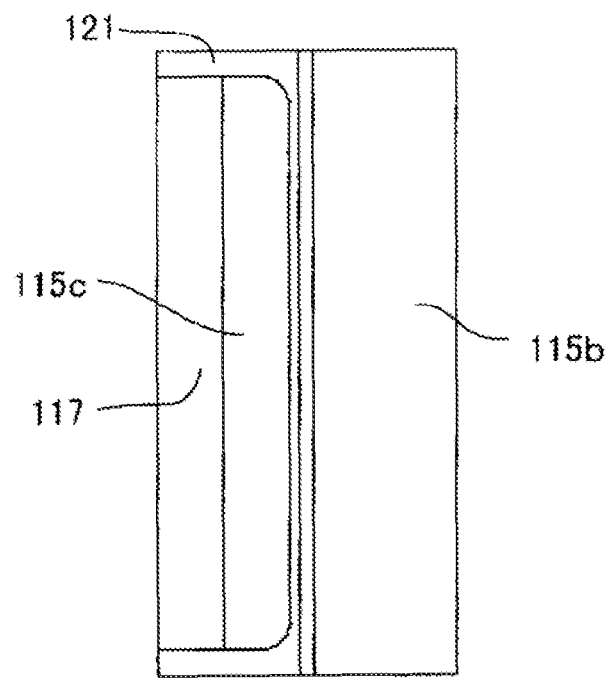

Furthermore, as shown in the left-side view in FIG. 17A and the planar view in FIG. 17B, as the prism 115, that in which a projecting stepped portion 121 for preventing leakage of the second filler material 118 onto the second prism surface 115b is formed in an edge portion of the third prism surface 115c may be used. The projecting stepped portion 121 is formed having a substantially U-shaped planar shape such as to enclose the reflection/transmission layer 117, and projects further, by a predetermined dimension, in the normal direction of the third prism surface 115c than the reflection/transmission layer 117.

In a configuration such as this, because the projecting stepped portion 121 allows the second filler material 118 to more easily accumulate on the third prism surface 115c and the reflection/transmission layer 117, leakage of the second filler material 118 onto the second prism surface 115b can be effectively suppressed. The total reflection function of the second prism surface 115c can be appropriately ensured.

(Fourth Variation Example)

Figure 18:
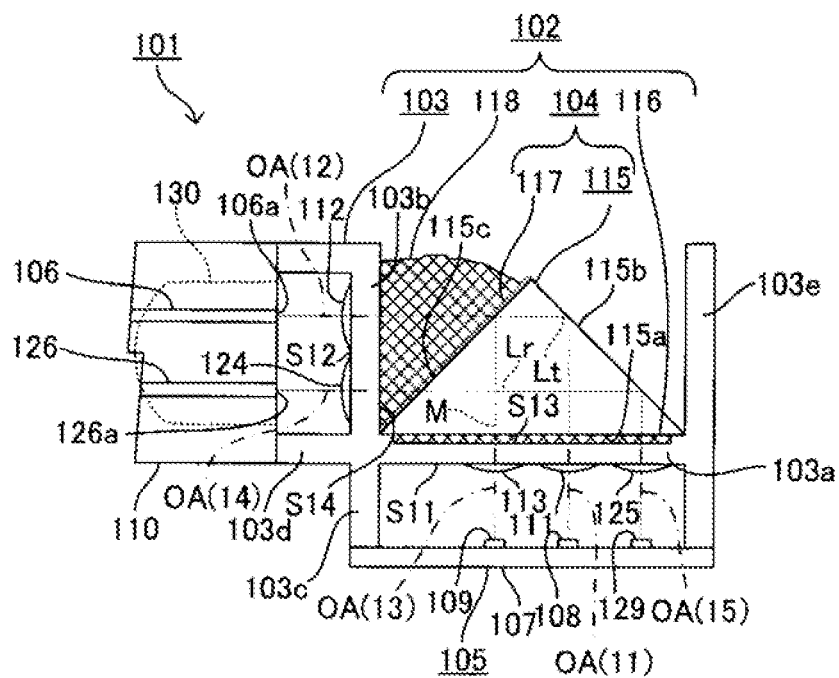
[FIG. 18] A vertical cross-sectional view of a fourth variation example of the second invention

Still further, regarding each component, the above-described lens faces 111 to 113, 124, and 125, the light-emitting element 108, the light-receiving elements 109 and 129, the optical fibers 106 and 126, and the reflection/transmission layer 117, the layout may be changed as shown in FIG. 18 while maintaining respective optical performances.

In other words, as shown in FIG. 18, in the present variation example, in the first photoelectric conversion device 105, the row of second light-receiving elements 129 is disposed in a position on the right side in relation to the row of light-emitting elements 108 (position on the second direction side and the side opposite to the optical fibers 106 and 126). In addition, in accompaniment, as shown in FIG. 18, the row of fifth lens faces 125 is disposed in a position on the right side in relation to the row of first lens faces 111 (position on the second direction side and the side opposite to the second plate-shaped portion 103b). Furthermore, as shown in FIG. 18, in the second prism surface 115b, the total-reflection position of the laser light Lt of each light-emitting element 108 is set further towards the side opposite to the first plate-shaped portion 103a (above) than the total-reflection position of the laser light Lr of each optical fiber 126. In addition, in the third prism surface 115c, the incidence position of the laser light Lt of each light-emitting element 108 is set further towards the side opposite to the first plate-shaped portion 103a than the incidence position of the laser light Lr of each optical fiber 126. Still further, as shown in FIG. 18, the reflection/transmission layer 117 is formed on the third prism surface 115c over a part of an area (upper half) on the side opposite to the first plate-shaped portion 103a as a predetermined area in the present variation example. In addition, as shown in FIG. 18, the row of second lens faces 112 is disposed in a position on the upper side in relation to the row of fourth lens faces 124 (position on the third direction side and the side opposite to the first plate-shaped portion 103a).

In a configuration such as this, the optical path of the laser light Lt of each light-emitting element 108 subsequent to the second prism surface 115b can be shortened. Therefore, even when a manufacturing (resin formation) or assembly error occurs in the slope angle of the second prism surface 115b, the effect the error has on the coupling efficiency of the laser light Lt of each light-emitting element 108 can be reduced.

The first to third variation examples of the present invention may, of course, be combined with the configuration of the present variation example.

(Fifth Variation Example)

Figure 19:
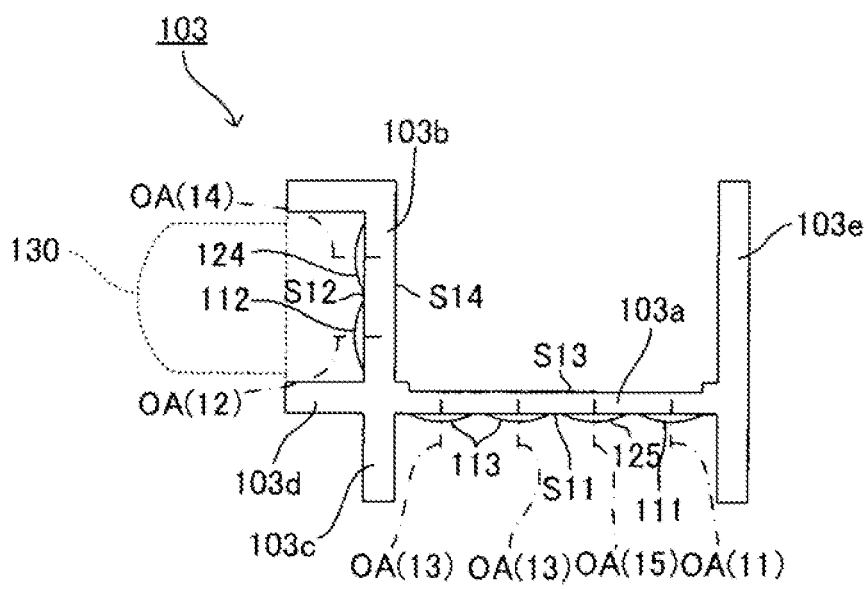
[FIG. 19] A vertical cross-sectional view of a lens array main body in a fifth variation example of the second invention

In addition, as shown in FIG. 19, two rows of the third lens faces 113 may be disposed on the first surface S11, such as to be adjacent to each other in the lateral direction (second direction).

Figure 20:
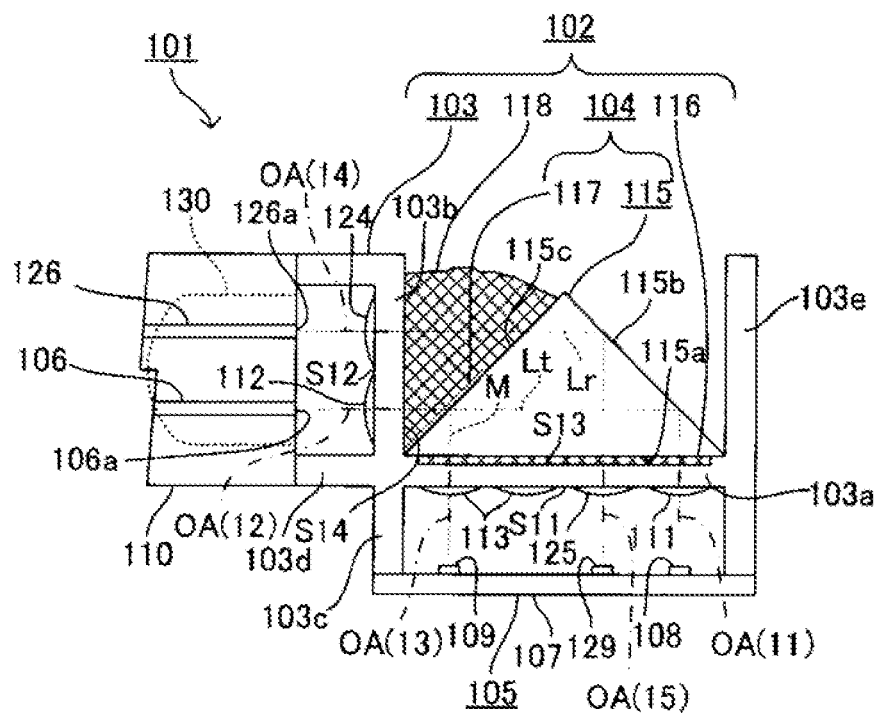
[FIG. 20] An overall configuration diagram of an optical module for transmission and reception in the fifth variation example of the second invention

As shown in FIG. 20, the lens array main body 103 of the present variation example such as this can configure the lens array 102 and the optical module 101 for optical transmission and reception, in a state in which the above-described first photoelectric conversion device 105, the prism 115 in which the reflection/transmission layer 117 is formed over the predetermined area on the third prism surface 115c, and the optical fibers 106 and 126 for optical transmission and for optical reception are disposed. The lens array 102 shown in FIG. 20 is similar to the configuration shown in FIG. 10 to FIG. 14, aside from a row of third lens faces 113 that do not function optically being added.

Figure 21:
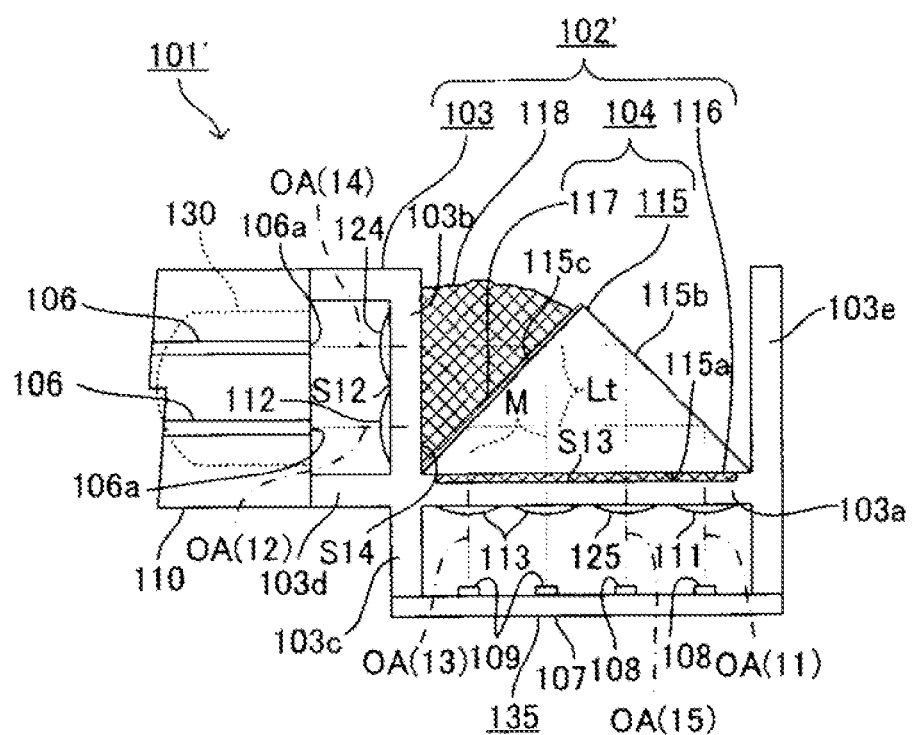
[FIG. 21] An overall configuration diagram of a state of transition to transmission-dedicated in the fifth variation example of the second invention

On the other hand, as shown in FIG. 21, the lens array main body 103 of the present variation example such as this can configure a lens array 102' and an optical module 101' that are optical transmission-dedicated, in a state in which a second photoelectric conversion device 135 that is optical transmission-dedicated, the prism 115 in which the reflection/transmission layer 117 is formed over the overall third prism surface 115c, and two rows of optical fibers 106 for optical transmission-dedicated are disposed. However, as shown in FIG. 21, the second photoelectric conversion device 135 has two rows of light-emitting elements 108 as a result of a row of light emitting elements 108 being formed instead of the row of second light-receiving elements 129 in a position equivalent to the disposal position of the row of second light-receiving elements 129 in the first photoelectric conversion device 105, and has two rows of first light-receiving elements 109 in correspondence with the two rows of light-emitting elements 108.

As shown in FIG. 21, in an optical transmission-dedicated usage state, the laser light Lt of each light-emitting element 108 in the row differing from the row corresponding with each first lens faces 111 among the two rows of light-emitting elements 108 is incident on each fifth lens face 125. In addition, as shown in FIG. 21, the laser light Lt of each light-emitting element 108 that has been incident on each fifth lens face 125 is incident on the first prism surface 115a. Furthermore, as shown in FIG. 21, the second prism surface 115b totally reflects the laser light Lt of each light-emitting element 108 that has been incident on the first prism surface 115a after having been incident on each fifth lens face 125 towards each fourth lens face 124. Still further, as shown in FIG. 21, the reflection/transmission layer 117 reflects, at a predetermined reflectance, the laser light Lt of each light-emitting element 108 that has been incident on the third prism surface 115c after passing through each fifth lens face 125, first prism surface 115a, and second prism surface 115b towards each third lens face 113 in the row differing from the row corresponding to each first lens face 11 among the two rows of third lens faces 113, as the monitor light M of each light-emitting element 108. In addition, the reflection/transmission layer 117 transmits the laser light Lt of each light-emitting element 108 towards each fourth lens face 124 side, at a predetermined transmittance. In addition, as shown in FIG. 21, each fourth lens face 124 emits the laser light Lt of each light-emitting element 108 that has been transmitted by the reflection/transmission layer 117 towards the end face 106a of each optical fiber 106 for optical transmission. In this way, the light-emitting elements 108 in the two rows and the end faces 106a of the optical fibers 106 in the two rows for optical transmission can be optically coupled. At this time, monitoring for each row can be performed.

In a configuration such as this, the optical transmission-dedicated lens array 102' can be selected by the prism 115 being selected in which the reflection/transmission layer 117 is formed on the overall surface. On the other hand, the lens array 102 for optical transmission and reception can be selected by the prism 115 being selected in which the reflection/transmission layer 117 is formed over a predetermined area. Therefore, selection of the usage state between optical transmission and reception, and optical transmission-dedicated can be performed easily and at low cost.

The first to fourth variation examples of the present invention may, of course, be combined with the configuration of the present variation example.

The above-described second invention is not limited by the above-described embodiment and may be variously modified to the extent that features thereof are not compromised.

For example, two rows or more of the light-emitting element 108, the first light-receiving element 109, the second light-receiving element 129, and the first to fifth lens faces 111 to 113, 124, and 125 may be provided. In addition, the present invention can also be effectively applied to an optical transmission body other than the optical fibers, such as an optical waveguide.

Next, an embodiment of a lens array and an optical module including the lens array of a third invention of the present application will be described with reference to FIG. 22 to FIG. 29.

Figure 22:
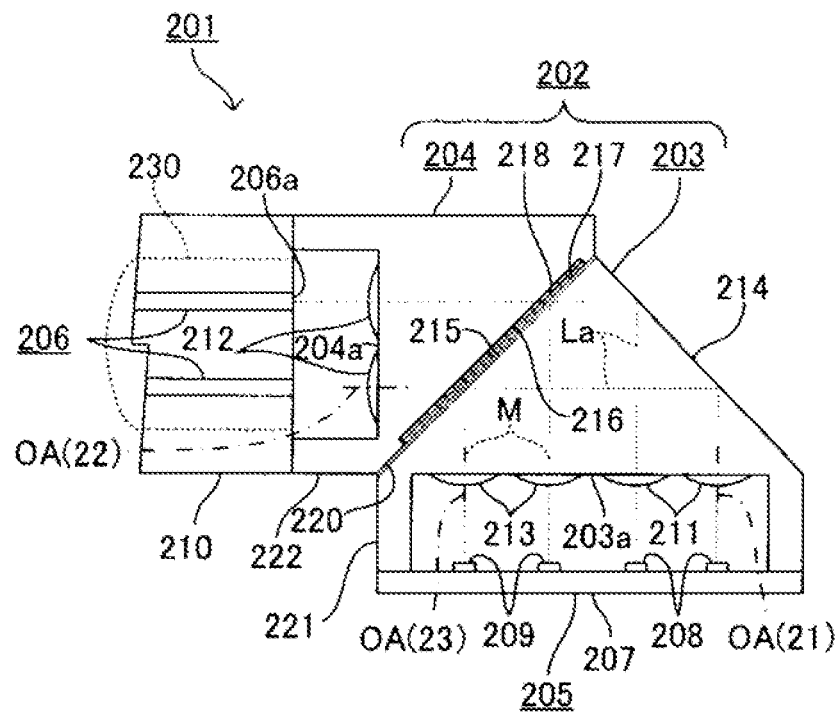
[FIG. 22] An overall configuration diagram of an optical module according to an embodiment of a third invention
Figure 23:
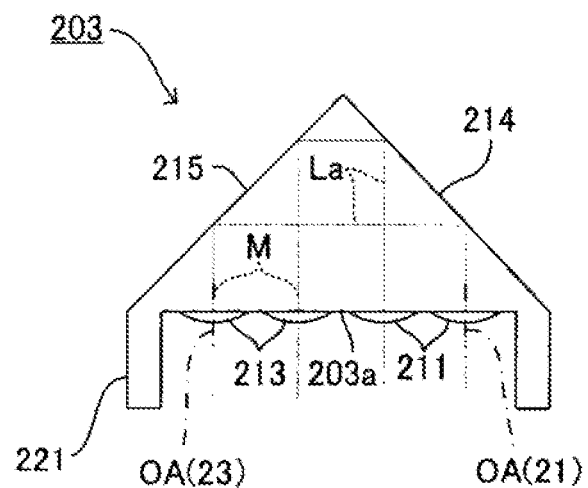
[FIG. 23] A vertical cross-sectional view of a first lens member of a lens array according to the embodiment of the third invention
Figure 24:
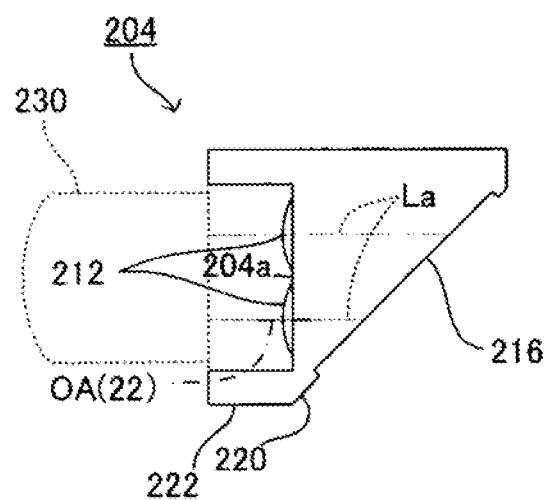
[FIG. 24] A vertical cross-sectional view of a second lens member of the lens array according to the embodiment of the third invention
Figure 25:
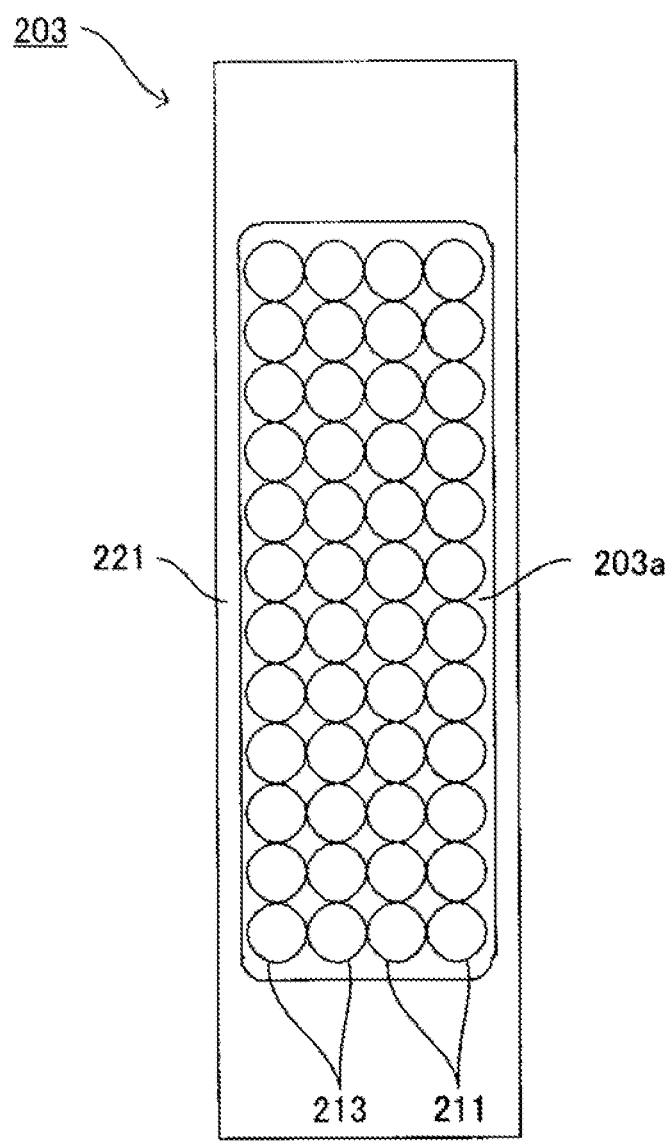
[FIG. 25] A bottom view of FIG. 23
Figure 26:
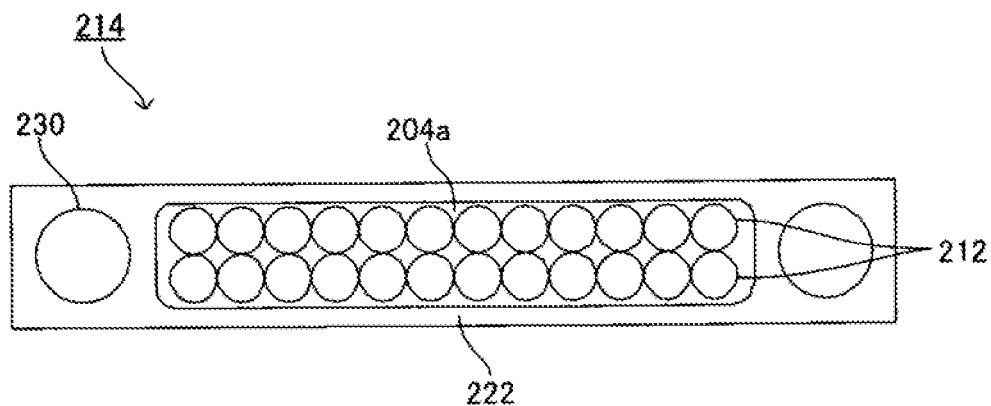
[FIG. 26] A left-side view of FIG. 24

Here, FIG. 22 is an overall configuration diagram showing an overview of an optical module 201 according to the embodiment of the third invention of the present application together with a vertical cross-sectional view of a lens array 202 according to the present embodiment. In addition, FIG. 23 is a vertical cross-sectional view of a first lens member 203 configuring the lens array 202. Furthermore, FIG. 24 is a vertical cross-sectional view of a second lens member 204 configuring the lens array 202 together with the first lens member 203 in a state in which the second lens member 204 is bonded with the first lens member 203. Still further, FIG. 25 is a bottom view of FIG. 23. FIG. 26 is a left-side view of FIG. 24.

As shown in FIG. 22, the lens array 202 according to the present embodiment is disposed between a photoelectric conversion device 205 and optical fibers 206 serving as an optical transmission body.

Here, the photoelectric conversion device 205 has a plurality of light-emitting elements 208 on a surface of a semiconductor substrate 207 facing the lens array 202, the light emitting-elements 208 emitting laser light La in a direction perpendicular to this surface (upward direction in FIG. 22). The light-emitting elements 208 configure the above-described VCSEL. The emission direction of the laser light La from each light-emitting element 208 is equivalent to a third direction in the present invention. The light-emitting elements 208 (12 light-emitting elements 208 according to the present embodiment) are formed in an array at an even pitch along a direction that is perpendicular to the surface of the paper on which FIG. 22 is printed in FIG. 22 and is a predetermined first direction, thereby forming a row of light-emitting elements 208 (single row). In addition, a plurality of such rows of light-emitting elements 208 (two rows according to the present embodiment) are formed in parallel along a lateral direction in FIG. 22 that is a predetermined second direction. According to the present embodiment, the number of light-emitting elements 208 is the same for each row of light-emitting elements 208. In addition, the positions of the light-emitting elements 208 in the array direction are aligned (match) among the rows. However, the present invention is not limited to a configuration such as this. Furthermore, as shown in FIG. 22, the photoelectric conversion device 205 has light-receiving elements 209, the number of which is the same as the number of light-emitting elements 208, on the surface of the semiconductor substrate 207 facing the lens array 202, in a position near the left side in FIG. 22 that is a position on the second direction side and the optical transmission body side in relation to the plurality of rows of light-emitting elements 208. The light-receiving elements 209 receive monitor light M for monitoring output (such as intensity or amount of light) of the laser light La emitted from each light-emitting element 8 in the plurality of rows. In a manner similar to the light-emitting elements 208, a plurality of light-receiving elements 209 (12 light-receiving elements 209) are arrayed at an even pitch along the direction that is perpendicular to the surface of the paper on which FIG. 22 is printed in FIG. 22, thereby forming a row of light-receiving elements 209. In addition, a plurality of such rows of light-receiving elements 209 (two rows) are formed in parallel along the lateral direction in FIG. 22. Furthermore, between the light-receiving elements 209 of each row and an optically corresponding (with which a light monitoring relationship is established) row of light-emitting elements 208, the positions in the array direction of the elements 8 and 9 that are in the same order when counted from one array direction, match each other. However, such positional matching is also established between a row of light-emitting elements 208 and a row of light-receiving elements 209 that do not optically correspond, in an instance in which a configuration is used in which the positions in the array direction of the light-emitting elements 208 are aligned (matched) among the rows of light-emitting elements 208. In FIG. 22, a light-emitting element 208 in a first row counted from the right side optically corresponds with a light-receiving element 209 in a first row counted from the left side. In addition, a light-emitting element 208 in a second row from the right side optically corresponds with a light-receiving element 209 in a second row from the left side. The light-receiving element 209 may be a photodetector. Furthermore, a control circuit (not shown) that controls the output of the laser light La emitted from the light-emitting element 208 based on the intensity and the amount of light of the monitor light M received by the light-receiving element 209 is connected to the photoelectric conversion device 205. As shown in FIG. 22, the photoelectric conversion device 205 such as this is disposed opposing the first lens member 203 in a state in which the semiconductor substrate 207 is in contact with the first lens member 203. The photoelectric conversion device 205, together with the lens array 202, configures the optical module 201 by, for example, being attached to the first lens member 203 by a known fixing means (not shown) such as a clamp spring.

In addition, the optical fibers 206 according to the present embodiment are provided, the number thereof being the same as the number of light-emitting elements 208 and the number of light-receiving elements 209. A plurality of optical fibers 206 (12 optical fibers 206) are arrayed along the direction that is perpendicular to the surface of the paper on which FIG. 22 is printed in FIG. 22, thereby forming a row. In addition, a plurality of such rows of optical fibers 206 (two rows) are disposed such as to be arrayed in parallel along a vertical direction (third direction) in FIG. 22. Between the optical fibers 206 of the plurality of rows and an optically corresponding (with which a light coupling relationship is established) row of light-emitting elements 208, the positions in the array direction of the optical fiber 206 and the light-emitting element 208 that are in the same order when counted from one array direction, match each other. However, such positional matching is also established between a row of light-emitting elements 208 and a row of optical fibers 206 that do not optically correspond, in an instance in which a configuration is used in which the positions in the array direction of the light-emitting elements 208 are aligned among the rows of light-emitting elements 208. In FIG. 22, an optical fiber 206 in a first row counted from the top optically corresponds with the light-emitting element 208 in the second row from the right side. In addition, an optical fiber 206 in the second row when from the top optically corresponds with the light-emitting element 208 in the first row from the right side. The optical fibers 206 of each row are, for example, multi-mode optical fibers 206 having the same dimensions as one another. A section of each optical fiber 206 on an end face 206a side is held within a multi-core integrated optical connector 210, such as a mechanically transferable [MT] connector. As shown in FIG. 22, the optical fibers 206 in the plurality of rows such as this are attached to the second lens member 204 by a known fixing means (not shown) (such as a clamp spring) in a state in which an end surface of the optical connector 210 on the second lens member 204 side is in contact with the second lens member 204.

The lens array 202 optically couples the light-emitting elements 208 in the plurality of rows with the corresponding end faces 206a of the optical fibers 206 in the plurality of rows, in a state in which the lens array 202 is disposed between the photoelectric conversion device 205 and the optical fibers 206 in this way.

The lens array 202 will be described in further detail. As shown in FIG. 22, the first lens member 203 is composed of a light-transmitting material (such as a resin material). The outer shape of the vertical cross-section of the first lens member 203 is formed into a substantially triangular shape. As shown in FIG. 22, a lower end surface 203a of the first lens member 203 is a surface facing the photoelectric conversion device 205 from above. First lens faces (convex lens faces) 211 having a circular planar shape are formed on the lower end surface 203a, the number of first lens faces 211 being the same as the number of light-emitting elements 208. Here, as shown in FIG. 23 and FIG. 25, a plurality of first lens faces 211 (12 first lens faces 211) are arrayed at an even pitch along the direction that is perpendicular to the surface of the paper on which FIG. 23 is printed in FIG. 23 (vertical direction in FIG. 25), thereby forming a row of first lens faces 211. In addition, a plurality of such rows of first lens faces 211 (two rows) are formed in parallel along the lateral direction in FIG. 23 and FIG. 25. The first lens faces 211 in each row are formed having the same size. In addition, between the first lens faces 211 in each row and the optically corresponding (with which a light incidence relationship is established) row of light-emitting elements 208, the positions in the array direction of the first lens face 211 and the light emitting element 208 that are in the same order when counted from one array direction, match each other. However, such positional matching is also established between a row of light-emitting elements 208 and a row of first lens faces 211 that do not optically correspond, in an instance in which a configuration is used in which the positions in the array direction of the light-emitting elements 208 are aligned between the rows of light-emitting elements 208. In FIG. 22, a first lens face 211 in a first row when counted from the right side optically corresponds with the light-emitting element 208 in the first row when counted from the right side that directly opposes the first lens face 211 from below. In addition, a first lens face 211 in a second row from the right side optically corresponds with the light-emitting element 208 in the second row from the right side that directly opposes the first lens face 211 from below. As shown in FIG. 25, first lens faces 211 that are adjacent to each other in the array direction (vertical direction) and the parallel direction (lateral direction) may be formed in an adjacent state in which the respective circumferential end portions are in contact with each other. In addition, as shown in FIG. 22, an optical axis OA(21) of each first lens face 211 preferably matches the center axis of the laser light La emitted from each light-emitting element 208 that optically corresponds with each first lens face 211. More preferably, the optical axis OA(21) of each first lens face 211 is perpendicular to the lower end surface 203a.

As shown in FIG. 22, the laser light La emitted from each optically corresponding row of light-emitting elements 208 is incident on the first lens faces 211 in each row, such as those described above. More specifically, emitted light from a light-emitting element 208 is incident on a single arbitrary first lens face 211 belonging to a row of first lens faces 211, the light-emitting element 208 being in the same order as the single arbitrary first lens face 211 when counted from one array direction, among the light-emitting elements 208 belonging to the optically corresponding row of light-emitting elements 208. Then, the first lens faces 211 in each row advance the incident laser light La of each light-emitting element 208 in each row towards the interior of the first lens member 203 (upwards). The first lens faces 211 in each row may collimate or converge the incident laser light La of each light-emitting element 208 in each row. Alternatively, the laser light La may by dispersed by the first lens faces 211 of each row being formed into concave lens faces.

In addition, third lens faces (convex lens faces) 213 having a circular planar shape are formed on the lower end surface 203a of the first lens member 203 in a position near the left side in relation to the first lens faces 211 in each row, the number of third lens faces 213 being the same as the number of light-emitting elements 208. Here, as shown in FIG. 23 and FIG. 25, a plurality of third lens faces 213 (12 third lens faces 213) are arrayed at an even pitch along the direction that is perpendicular to the surface of the paper on which FIG. 23 is printed in FIG. 23 (vertical direction in FIG. 25), thereby forming a row of third lens faces 213. In addition, a plurality of such rows of third lens faces 213 (two rows) are formed in parallel along the lateral direction in FIG. 23 and FIG. 25. The third lens faces 213 in each row are formed having the same size. In addition, between the third lens faces 213 in each row and the optically corresponding (with which a light incidence relationship is established) row of light-emitting elements 208, the positions in the array direction of the third lens face 213 and the light-emitting element 208 that are in the same order when counted from one array direction, match each other. However, such positional matching is also established between a row of light-emitting elements 208 and a row of third lens face 213 that do not optically correspond, in an instance in which a configuration is used in which the positions in the array direction of the light-emitting elements 208 are aligned between the rows of light-emitting elements 208. In FIG. 22, a third lens face 213 in a first row when counted from the left side optically corresponds with the light-emitting element 208 in the first row when counted from the right side. In addition, a third lens face 213 in a second row from the left side optically corresponds with the light-emitting element 208 in the second row from the right side. As shown in FIG. 25, third lens faces 213 that are adjacent to each other in the array direction and the parallel direction may be formed in an adjacent state in which the respective circumferential end portions are in contact with each other. In addition, an optical axis OA(23) of the third lens faces 213 in each row preferably matches the center axis of a light-receiving surface of the light-receiving elements 209 in each row that optical correspond (with which a light coupling relationship is established) with the third lens faces 213 in each row. More preferably, the optical axis OA(23) of the third lens faces 213 in each row is perpendicular to the lower end surface 203*a*.

As shown in FIG. 22, the monitor light M of each light-emitting element 208 in each row corresponding with the third lens faces 213 in each row is incident on the third lens faces 213 in each row from the inner side of the first lens member 203 (above). The third lens faces 213 in each row converge the incident monitor light M of each light-emitting element 208 in each row and respectively emit the monitor light M towards the light-receiving elements 209 in each row that optically corresponds with the third lens faces 213 in each row. A means for generating the monitor light M will be described hereafter.

Furthermore, as shown in FIG. 22, the first lens member 203 has a first sloped surface 214 that is disposed on the side opposite to the photoelectric conversion device 205 (above) in relation to the lower end surface 203*a*. As shown in FIG. 22, a lower end portion of the first sloped surface 214 is disposed near a right end portion of the lower end surface 203*a*. In addition, the first sloped surface 214 has a predetermined slope angle in relation to the lower end surface 203*a*, such as to slope towards the optical fiber 206 side (left side) as the first sloped surface 214 becomes farther from the lower end surface 203*a* in the upward direction.

As shown in FIG. 22, the laser light La of each light-emitting element 208 in each row that has been incident on the first lens faces 211 in each row and advanced on the optical path within the first lens member 203 is internally incident on the first sloped surface 214, such as that described above, from below at an angle of incidence that is greater than the critical angle. The first sloped surface 214 then totally reflects the internally incident laser light La of each light-emitting element 208 in each row towards the optical fiber 206 side (left side).

Still further, as shown in FIG. 22, the first lens member 203 has a second sloped surface 215 that is disposed on the side opposite to the photoelectric conversion device 205 (above) in relation to the lower end surface 203*a*, and on the optical fiber 206 side (left side) in relation to the first sloped surface 214. As shown in FIG. 22, a lower end portion of the second sloped surface 215 is disposed near a left end portion of the lower end surface 203*a* and an upper end portion is connected to an upper end portion of the first sloped surface 214. In addition, as shown in FIG. 22, the second sloped surface 215 has a predetermined slope angle in relation to the lower end surface 203*a*, such as to slope towards the side opposite to the optical fibers 206 (right side) as the second sloped surface 215 becomes farther from the lower end surface 203*a* in the upward direction.

As shown in FIG. 22, the laser light La of each light-emitting element 208 in each row that has been totally reflected by the first sloped surface 214 and advanced on the optical path within the first lens member 203 is internally incident on the second sloped surface 215, such as that described above, from the right side.

On the other hand, as shown in FIG. 22, the second lens member 204 is composed of a light-transmitting material (such as a resin material). The outer shape of the vertical cross-section of the second lens member 204 is formed into a substantially triangular shape. A left end surface 204*a* of the second lens member 204 is a surface facing the end faces 206*a* of the optical fibers 206. In addition, as shown in FIG. 22, the second lens member 204 has a third sloped surface 216 that faces the second sloped surface 215 with a predetermined space therebetween. As shown in FIG. 22, a lower end portion of the third sloped surface 216 is disposed near a lower end portion of the left end surface 204*a*. In addition, the third sloped surface 216 has a predetermined slope angle in relation to the left end surface 204*a* such as to slope towards the side opposite to the photoelectric conversion device 205 (upper side) as the third sloped surface 216 becomes farther from the left end surface 204*a* in the rightward direction. The third sloped surface 216 may be formed in parallel with the second sloped surface 215.

As shown in FIG. 22, the laser light La of each light-emitting element 208 in each row that has been incident on the second sloped surface 215 is incident on the third sloped surface 216, such as this, from the right side.

In addition, as shown in FIG. 24 and FIG. 26, second lens faces (convex lens faces) 212 having a circular planar shape are formed on the left end surface 204*a* of the second lens member 204, the number of second lens faces 212 being the same as the number of light-emitting elements 208. Here, as shown in FIG. 24 and FIG. 26, a plurality of second lens faces 212 (12 second lens faces 212) are arrayed at an even pitch along the direction that is perpendicular to the surface of the paper on which FIG. 24 is printed in FIG. 24 (lateral direction in FIG. 256), thereby forming a row of second lens faces 212. In addition, a plurality of such rows of second lens faces 212 (two rows) are formed in parallel along the lateral direction in FIG. 24 and FIG. 26. The second lens faces 212 in each row are formed having the same size. In addition, between the second lens faces 212 in each row and the optically corresponding (with which a light incidence relationship is established) row of light-emitting elements 208, the positions in the array direction of the second lens faces 212 and the light emitting element 208 that are in the same order when counted from one array direction, match each other. However, such positional matching is also established between a row of light-emitting elements 208 and a row of second lens faces 212 that do not optically correspond, in an instance in which a configuration is used in which the positions in the array direction of the light-emitting elements 208 are aligned between the rows of light-emitting elements 208. In FIG. 22, a second lens face 212 in a first row when counted from the top optically corresponds with the light-emitting element 208 in the second row when counted from the right side. In addition, a second lens face 212 in a second row from the top optically corresponds with the light-emitting element 208 in the first row from the right side. As shown in FIG. 26, second lens faces 212 that are adjacent to each other in the array direction and the parallel direction may be formed in an adjacent state in which the respective circumferential end portions are in contact with each other. In addition, as shown in FIG. 22, an optical axis OA(22) of each second lens face 212 preferably matches the center axis of the end face 206*a* of each optical fiber 206 that optically corresponds (with which a light coupling relationship is established) with each second lens face 12. More preferably, the optical axis OA(22) of each second lens face 212 is perpendicular to the left end surface 204a.

As shown in FIG. 22, the laser light La of each light-emitting element 208 of each row that has been incident on the third sloped surface 216 and advanced on the optical path within the second lens member 204 is incident on the second lens faces 212 in each row, such as those described above. More specifically, the emitted light from a light-emitting element 208 is incident on a single arbitrary second lens face 212 belonging to a row of second lens faces 12, the light-emitting element 208 being in the same order as the single arbitrary second lens face 212 when counted from one array direction, among the light-emitting elements 208 belonging to the optically corresponding row of light-emitting elements 208, and the light having passed through the first lens face 211 in the same order. At this time, the center axis of the laser light La of each light-emitting element 208 in each row preferably matches the optical axis OA(22) of the corresponding second lens faces 212 in each row. The second lens faces 212 in each row then converge the incident laser light La of each light-emitting element 208 in each row and respectively emit the laser light La towards the end faces 206a of the optical fibers 206 in each row corresponding to the second lens faces 212 in each row.

In this way, the light-emitting elements 208 in each row and the end faces 206a of the optical fibers 206 in each row are optically coupled via the first lens faces 211 in each row and the second lens faces 212 in each row.

Furthermore, as shown in FIG. 22, the lens array 202 has a thin reflection/transmission laser 217 that is formed on the overall surface of the second sloped surface 215. The reflection/transmission layer 217 may be formed by the second sloped surface 215 being coated with a single layer film composed of a single metal, such as Ni, Cr, or Al, or a dielectric multi-layer film obtained by alternately stacking a plurality of dielectric bodies (such as $TiO_2$ and $SiO_2$) having differing dielectric constants. In this instance, a known coating technique, such as Inconel deposition, can be used for coating. When coating such as this is used, the reflection/transmission layer 217 can be formed having a very thin thickness that is, for example, 1 μm or less.

As shown in FIG. 22, the laser light La of each light-emitting element 208 in each row that has been internally incident on the second sloped surface 215 is immediately incident on the reflection/transmission layer 217 such as this. Then, the reflection/transmission layer 217 reflects the incident laser light La of each light-emitting element 208 in each row at a predetermined reflectance towards the side of the third lens faces 213 in each row (downward) corresponding with each monitor light M, as the monitor light M of each light-emitting element 208 in each row corresponding with the light-emitting elements 208 in each row. In addition, the reflection/transmission layer 17 transmits the laser light La of each light-emitting element 208 in each row towards the third sloped surface 216 side (left side) at a predetermined transmittance. At this time, because the thickness of the reflection/transmission layer 217 is thin, refraction of the laser light La passing through the reflection/transmission layer 217 can be ignored (considered straight-advancing transmittance). The reflectance and transmittance of the reflection/transmission layer 217 can be set to desired values based on the material, thickness, and the like of the reflection/transmission layer 217, with the restriction that monitor light M of an amount sufficient to monitor the output of the laser light La can be obtained. For example, when the reflection/transmission layer 217 is formed by the above-described single layer film, the reflectance of the reflection/transmission layer 217 can be 20% and the transmittance 60% (absorption 20%), depending on the thickness. In addition, for example, when the reflection/transmission layer 217 is formed by the above-described dielectric multi-layer film, the reflectance of the reflection/transmission layer 217 can be 10% and the transmittance 90%, depending on the thickness and the number of layers.

In this way, the monitor light M of each light-emitting element 208 in each row that has been reflected by the reflection/transmission layer 217 advances on the optical path within the first lens member 203 and then is internally incident on the corresponding third lens faces 213 in each row. The third lens faces 213 in each row then respectively emit the monitor light M towards the corresponding light-receiving elements 209 in each row.

On the other hand, as shown in FIG. 22, the area between the reflection/transmission layer 217 and the third sloped surface 216 is filled with a filler material 218 composed of a light-transmitting adhesive, such as a thermoset resin or an ultra-violet hardening resin. Therefore, the first lens member 203 and the second lens member 204 are more stably adhered (bonded) to each other by the adhesive force of the filler material 218. In addition, the difference in refractive index between the filler material 218, and the first lens member 203 and the second lens member 204 is a predetermined value or less. The difference in refractive index is preferably 0.01 or less, and more preferably 0.005 or less. For example, when the first lens member 203 and the second lens member 204 are formed by OKP4HT manufactured by Osaka Gas Chemicals Co., Ltd. as polyester, the filler material 218 may be formed by EA-0200 manufactured by Osaka Gas Chemicals Co., Ltd. as an ultra-violet hardening resin. In this instance, the refractive indexes of the first lens member 203 and the second lens member 204, and the filler material 218 in relation to light having a wavelength of 850 nm can both be 1.61.

As shown in FIG. 22, the laser light La of each light-emitting element 208 in each row that has been transmitted by the reflection/transmission layer 217 is immediately incident on the filler material 218, such as that described above. At this time, the direction of incidence of the laser light La of each light-emitting element 208 in each row in relation to the filler material 218 can be considered the same as the direction of incidence of the laser light La of each light-emitting element 208 in each row in relation to the reflection/transmission layer 217. This is because the reflection/transmission layer 217 is very thin, and refraction of the laser light La at this layer 217 can be ignored.

The laser light La of each light-emitting element 208 in each row that has been incident on the filler material 218 in this way advances on an optical path within the filler material 218 towards the third sloped surface 216 side. At this time, because the difference in refractive index between the filler material 218 and the first lens member 203 is sufficiently small, when the laser light La of each light-emitting element 208 in each row is incident on the filler material 218, refraction does not occur in the laser light La.

Next, the laser light La of each light-emitting element 208 in each row that has advanced on the optical path within the filler material 218 by a small distance is incident on the third sloped surface 216. At this time, because the difference in refractive index between the filler material 218 and the second lens member 204 is sufficiently small, when the laser light La of each light-emitting element 208 in each row is incident on the third sloped surface 216, refraction does not occur in the laser light La.

The laser light La of each light-emitting element 208 in each row that has been incident on the third sloped surface 216 in this way is emitted by the second lens faces 212 in each row towards the end faces 206a of the optical fibers 206 in each row, as described above.

In a configuration such as that described above, the laser light La of each light-emitting element 208 in each row that has been incident on the first lens faces 211 in each row is totally reflected by the first sloped surface 214. Thereafter, the laser light La of each light-emitting element 208 in each row is divided by the reflection/transmission layer 217 towards the third sloped surface 216 side and the side of the third lens faces 213 in each row. Then, the laser light La of each light-emitting element 208 in each row that has been divided (transmitted) towards the third sloped surface 216 side is emitted by the second lens faces 12 in each row towards the side of the end faces 6a of the optical fibers 6 in each row. In addition, the monitor light M of each light-emitting element 208 in each row that has been divided (reflected) towards the side of the third lens faces 213 in each row with sufficient reflectance can be emitted from the third lens faces 213 in each row towards the side of the light-receiving elements 209 in each row. As a result, optical coupling of the light-emitting elements 208 in each row and the end faces 206a of the optical fibers 206 in each row can be appropriately performed, and the monitor light can be efficiently obtained with certainty. Multichannel (24ch) optical transmission can be stably performed. In addition, as a result of the gap portion between the second sloped surface 215 and the third sloped surface 216 being used for the placement of the reflection/transmission layer 217 (in other words, light division) and placement of the filler material 218 (in other words, bonding of lens components), and a total reflection function (214) and a light-dividing function (217) being concentrated in positions near each other on a single component 3, a compact and simple design can be achieved. Furthermore, as a result of the first lens member 203 and the second lens member 204, and the filler material 218 being formed such that the difference in refractive index is a predetermined value or less, linearity between the optical path between the first sloped surface 214 and the second sloped surface 215 in the first lens member 203 and the optical path in the second lens member 204 can be ensured. Therefore, in an instance in which the laser light La incident on the second lens faces 212 in each row is confirmed to be misaligned from the centers of the lens faces 212 during product inspection, the areas requiring size adjustment to resolve the misalignment can be reduced. This configuration contributes to facilitation of manufacturing. Specifically, in a configuration in which, for example, linearity between the optical path between the first sloped surface 214 and the second sloped surface 215 and the optical path in the second lens member 204 cannot be ensured, to correct the axial misalignment of incident light on each second lens face 212 to be within an allowable limit, the slope angles of the second sloped surface 215 and the third sloped surface 216 may be required to be adjusted. On the other hand, according to the present embodiment, if the total reflection direction at the first sloped surface 214 is appropriately ensured, complicated size adjustment, such as resetting the second sloped surface 215 and the third sloped surface 216 to an optimal angle, is not required. In addition, as described above, when the first lens member 203 and the second lens member 204 are formed by the same material, an easier design can be achieved by unifying the refractive index of the lens members 203 and 204, and further cost reduction can be achieved by using the same material. Furthermore, according to the present invention, as a result of the filler material 218 also serving as an adhesive, the number of components can be reduced.

In addition to the above-described configuration, furthermore, according to the present embodiment, as shown in FIG. 22, the third sloped surface 216 is a recessing plane that is formed recessing further than an outer surface 220 of the third sloped surface 216, such as to ensure a space to be filled with the filler material 218. As a result, the outer surface 220 is a stepped surface 220 that projects further towards the first lens member 203 side than the third sloped surface 216. As shown in FIG. 22, the stepped surface 220 is parallel to the second sloped surface 215. On the other hand, the second sloped surface 215 is formed into a surface that is flat over an area corresponding to the third sloped surface 216 and the stepped surface 220. The first lens member 203 and the second lens member 204 are bonded in a state in which the stepped surface 220 and the second sloped surface 215 are in contact with each other.

In a configuration such as this, bonding of the first lens member 203 and the second lens member 204 can be performed stably while placing both lens members 203 and 204 in contact with each other.

In addition to the above-described configuration, furthermore, according to the present embodiment, as shown in FIG. 22 and FIG. 23, the slope angle of the first sloped surface 214 is 45° in the clockwise direction in FIG. 22 and FIG. 23 with reference to the lower end surface 203a of the first lens member 203 (0°). In addition, according to the present embodiment, the slope angle of the second sloped surface 215 is 45° in the counter-clockwise direction in FIG. 22 and FIG. 23 with reference to the lower end surface 203a. In other words, the second sloped surface 215 is at a right angle to the first sloped surface 214. On the other hand, as shown in FIG. 22 and FIG. 24, the slope angle of the third sloped surface 216 is 45° in the clockwise direction in FIG. 22 and FIG. 24 with reference to the left end surface 202a of the second lens member 204.

In a configuration such as this, because the first to third sloped surfaces 214 to 216 are formed into sloped surfaces of 45°, measurement of the dimensional accuracy of the sloped surfaces 214 to 216 can be easily performed, and handleability can be improved. In addition, because the reflection angle at the first sloped surface 214 can be set to 90°, optical path design can be further facilitated.

In addition to the above-described configuration, as shown in FIG. 22 and FIG. 25, the first lens member 203 has a device-side circumferential projecting portion 221 for holding the photoelectric conversion device 205. The device-side circumferential projecting portion 221 is formed such as to project further towards the photoelectric conversion device 205 side (downward in FIG. 22) than the lower end surface 203a and the first lens faces 211, such as to enclose the lower end surface 203a from four directions. In addition, the device-side circumferential projecting portion 211 comes into contact with and holds the photoelectric conversion device 205 at the tip surface (lower end surface). The tip surface of the device-side circumferential projecting portion 211 is in parallel and flush with the lower end surface 203a. On the other hand, as shown in FIG. 22 and FIG. 26, the second lens member 204 has a fiber-side circumferential projecting portion 222 for holding the optical fibers 206. The fiber-side circumferential projecting portion 22 is formed such as to project further towards the optical fiber 206 side (left side in FIG. 22) than the left end surface 204a and the second lens faces 12, such as to enclose the left end surface 204a from four directions. In addition, the fiber-side circumferential projecting portion 222 comes into contact with and holds the optical fibers 6 at the tip surface (left end surface). The tip surface of the fiber-side circumferential projecting portion 222 is in parallel and flush with the left end surface 204a. In addition, a positioning means may be formed in the first lens member 203 and the photoelectric conversion device 205 (semiconductor substrate 207) to position the photoelectric conversion device 205 to the lens array 202, by mechanically or optically engaging the first lens member 203 and the photoelectric conversion device 205 to each other. As the positioning means, a combination of a pin formed on either of the first lens member 203 and the photoelectric conversion device 205 and a through-hole or a hole for pin insertion formed on the other, optically detectable marks formed in predetermined positions on the first lens member 203 and the photoelectric conversion device 205, and the like can be given. In a similar manner, a positioning means (such as a combination of a pin and a hole or through-hole, or optical marks) may be formed in the second lens member 204 and the optical fibers 206 (connector 110) to position the optical fibers 206 to the second lens member 204, by mechanically or optically engaging the second lens member 204 and the optical fibers 206 to each other. As an example of the positioning means, in FIG. 22, FIG. 24, and FIG. 26, a pin 230 formed in the second lens member 204 is shown.

Furthermore, in addition to the above-described configurations, various variation examples can be applied to the present invention.

(First Variation Example)

Figure 27:
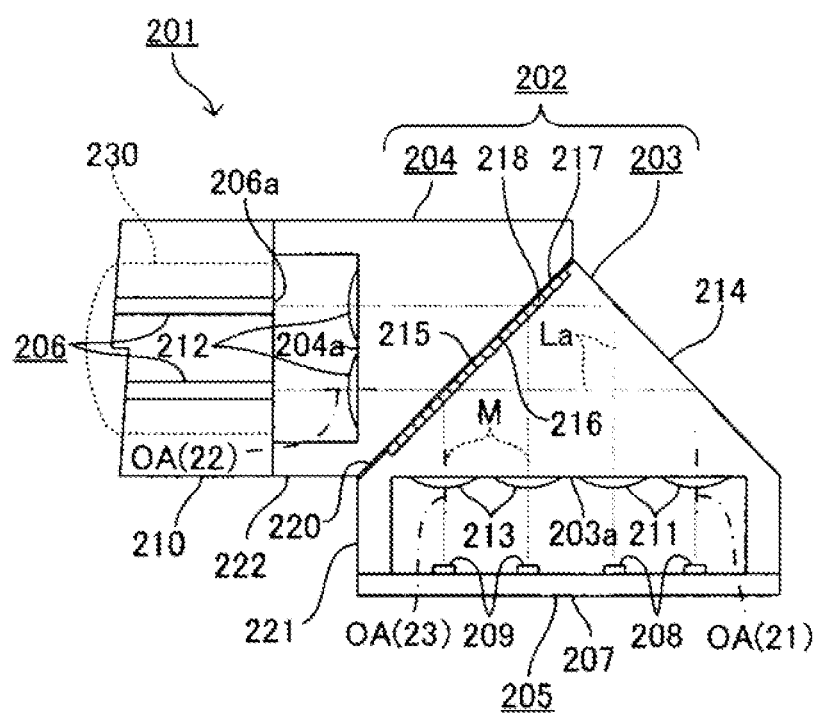
[FIG. 27] A diagram of a first variation example of the third invention

For example, instead of the third sloped surface 216 being formed into the recessing plane as described above, as shown in FIG. 27, the second sloped surface 215 may be formed into a recessing plane. However, in this instance, as shown in FIG. 27, the stepped surface 220 that projects further towards the second lens member 204 side than the second sloped surface 215 is formed on the outer side of the second sloped surface 215. In addition, as shown in FIG. 27, the third sloped surface 216 is formed into a surface that is flat over an area corresponding to the second sloped surface 215 and the stepped surface 220, and the reflection/transmission layer 217 is formed on the third sloped surface 216.

In a configuration such as this as well, the filling space for the filler material 218 can be ensured. In addition, as a result of the third sloped surface 216 and the stepped surface 220 being placed in contact, bonding between the first lens member 203 and the second lens member 204 can be stably performed.

(Second Variation Example)

Figure 28:
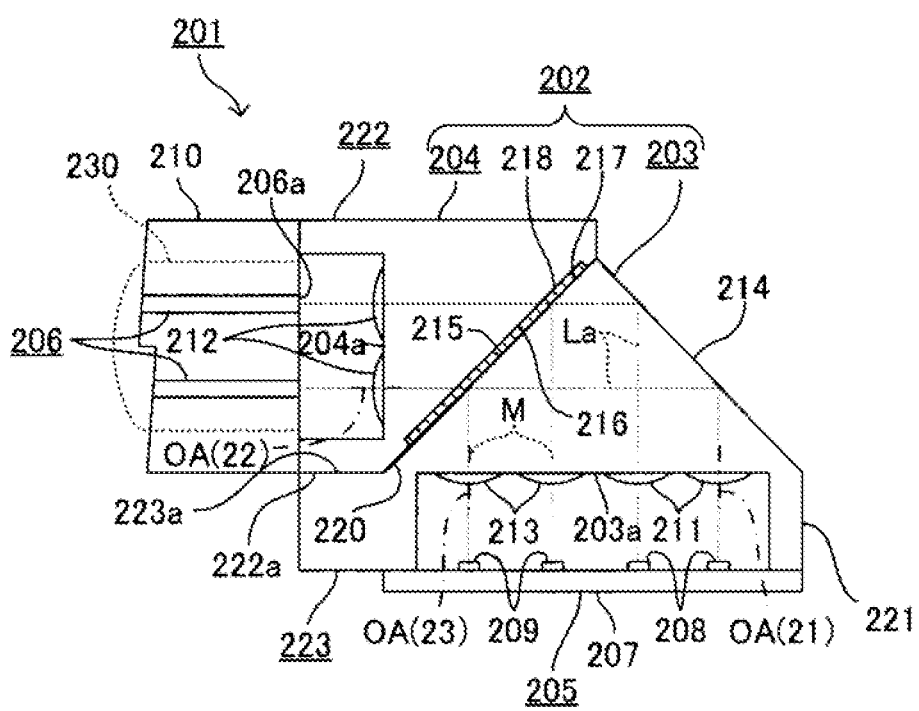
[FIG. 28] A diagram of a second variation example of the third invention

In addition, as shown in FIG. 28, contact surfaces other than the second sloped surface 215 and the stepped surface 220 may be added to the first lens member 203 and the second lens member 204. In other words, as shown in FIG. 28, in the present variation example, the first lens member 203 has an extending portion 223 that extends to the left side from a left end portion of the device-side circumferential projecting portion 221. An upper end surface 223a of the extending portion 232 is a contact surface 223a on the first lens member 203 side that extends to the left side from a lower end portion of the second sloped surface 215. On the other hand, as shown in FIG. 28, a lower end surface 222a of the fiber-side circumferential projecting portion 222 is a contact surface 222a on the second lens member 204 side that extends to the left side from a lower end portion of the stepped surface 220. Then, the contact surface 223a on the first lens member 203 side and the contact surface 222a on the second lens member 204 side come into contact with each other in a state having a predetermined angle in relation to the second sloped surface 215 and the stepped surface 220.

In a configuration such as this, the first lens member 203 and the second lens member 204 can be stably placed in contact by the contact surfaces that have a chevron shape as a whole. Therefore, bonding between the first lens member 203 and the second lens member 204 can be more stably performed with high accuracy.

Instead of the extending portion 223 being formed on the first lens member 203 side, an extending portion that extends downward from a lower end portion of the fiber-side circumferential projecting portion 222 may be formed on the second lens member 204 side. A right end surface of the extending portion may be the contact surface on the second lens member 204 side. In this instance, a left end surface of the device-side circumferential projecting portion 221 that does not have an extending portion may be the contact surface on the first lens member 203 side.

(Third Variation Example)

Figure 29:
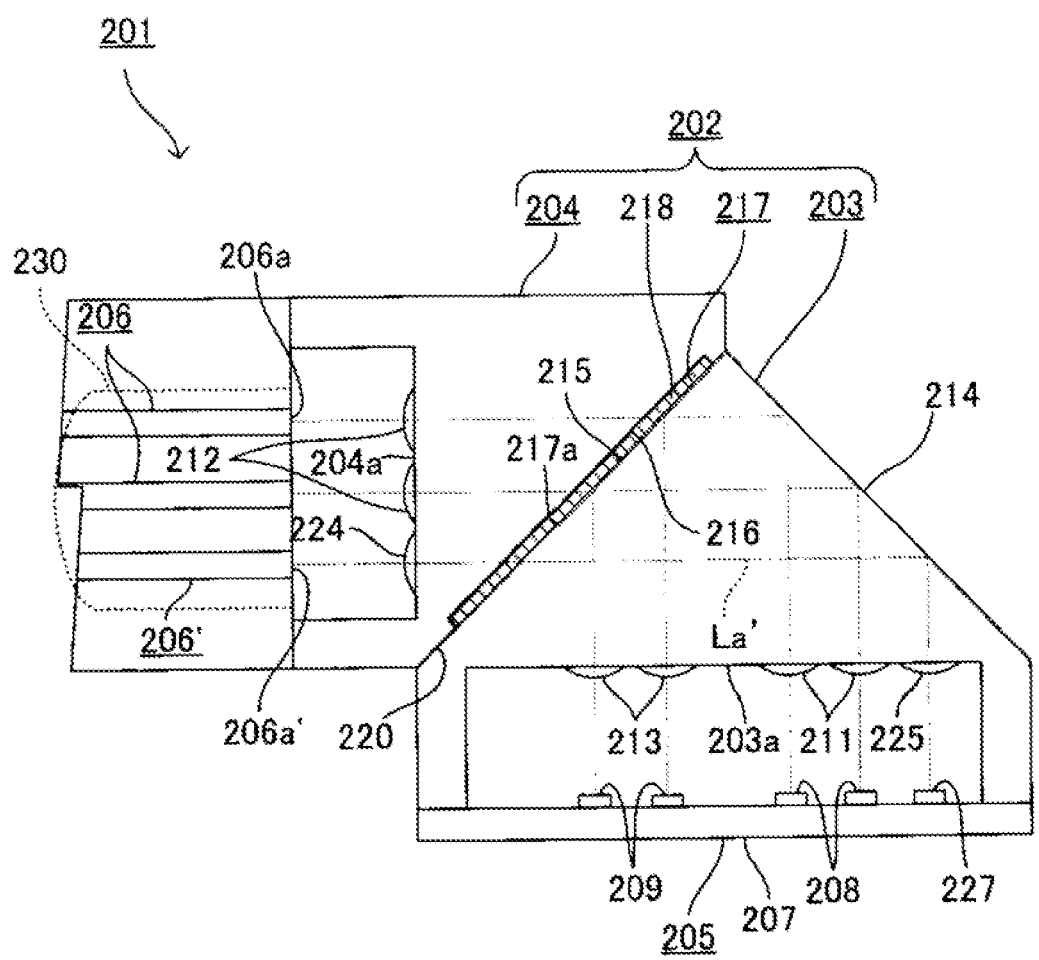
[FIG. 29] A diagram of a third variation example of the third invention

Furthermore, a configuration that also supports reception of optical signals, such as that shown in FIG. 29, may be used. In other words, as shown in FIG. 29, a plurality of optical fibers 206' for reception are arrayed near a lower portion of the optical fibers 206 in each row, along the direction that is perpendicular to the surface of the paper on which FIG. 29 is printed in FIG. 29. In addition, as shown in FIG. 29, fourth lens faces 224 for reception are formed in an array in a position facing end faces 206a' of the optical fibers 206' for reception on the left end surface 204a of the second lens member 204 along the direction that is perpendicular to the surface of the paper on which FIG. 29 is printed in FIG. 29, the number of fourth lens faces 224 being the same as the number of optical fibers 206' for reception. Furthermore, as shown in FIG. 29, a lower end portion of the second sloped surface 215 extends further than a lower end portion of the reflection/transmission layer 217. Still further, as shown in FIG. 29, five lens faces 225 for reception are formed in an array on the lower end surface 203a of the first lens member 203 along the direction that is perpendicular to the surface of the paper on which FIG. 29 is printed in FIG. 29, the number of fifth lens faces 225 being the same as the number of optical fibers 206' for reception. In addition, as shown in FIG. 29, the photoelectric conversion device 205 includes light-receiving elements 227 for reception, the number thereof being the same as the number of optical fibers 206' for reception.

In a configuration such as this, laser light La' for reception emitted from the end faces 206a' of the optical fibers 206' for reception are converged at the fourth lens faces 224 and successively passed through the third sloped surface 216, the filler material 218, and the extending portion of the second sloped surface 215. Thereafter, the light La' is totally reflected by the first sloped surface 214 towards the fifth lens faces 225 side, converged by the fifth lens faces 225, and appropriately coupled with the light-receiving elements 227 for reception.

The present invention is not limited by the above-described embodiment and may be variously modified to the extent that features thereof are not compromised.

For example, three or more rows of the light-emitting element 208, the light-receiving element 209, and the first to third lens faces 211 to 213 may be provided. In addition, two or more rows of the fourth lens face 224 and the fifth lens face 225 may be provided. Furthermore, the present invention an also be effectively applied to an optical transmission body other than the optical fibers, such as an optical waveguide.

EXPLANATIONS OF LETTERS OR NUMERALS 1 optical module
2 lens array
3 lens array main body
3a first plate-shaped portion 3b second plate-shaped portion
5 photoelectric conversion device
6 optical fiber
8 light-emitting element
9 light-receiving element
9 first lens face
11 second lens face
12 third lens face
13 prism
15a first prism surface
15b second prism surface
15c third prism surface
16 first filler material
17 reflection/transmission layer
18 second filler material
101 optical module
102 lens array
103 lens array main body
103a first plate-shaped portion
103b second plate-shaped portion
105 first photoelectric conversion device
106 optical fiber
108 light-emitting element
109 first light-receiving element
111 first lens face
112 second lens face
113 third lens face
115 prism
115a first prism surface
115b second prism surface
115c third prism surface
116 first filler material
117 reflection/transmission layer
118 second filler material
124 fourth lens face
125 fifth lens face
129 second light-receiving element
201 optical module
202 lens array
203 first lens member
204 second lens member
205 photoelectric conversion device
206 optical fiber
208 light-emitting element
209 light-receiving element
211 first lens face
212 second lens face
213 third lens face
214 first sloped surface
215 second sloped surface
216 third sloped surface
217 reflection/transmission layer
218 filler material

The invention claimed is:

1. A lens array disposed between a photoelectric conversion device and an optical transmission body, which lens array is capable of optically coupling a plurality of light-emitting elements and an end face of the optical transmission body, in which photoelectric conversion device the plurality of light-emitting elements and a plurality of light-receiving elements are formed, the plurality of light-receiving elements each receiving, respectively, monitor light of each light-emitting element for monitoring light emitted from the plurality of light-emitting elements, wherein:

as the photoelectric conversion device, a photoelectric conversion device is disposed in which a row of the light-emitting elements formed by the plurality of light-emitting elements being arrayed along a predetermined first direction are arrayed in parallel in a plurality of rows along a predetermined second direction that is perpendicular to the first direction, and a row of the light-receiving elements formed by the plurality of light-receiving elements being arrayed along the first direction in a position on the second direction side and the optical transmission body side in relation to the light-emitting elements in the plurality of rows are arrayed in parallel in a plurality of rows along the second direction; and the lens array includes a first plate-shaped portion of a lens array main body that faces the photoelectric conversion device in a third direction perpendicular to the first direction and the second direction;

a second plate-shaped portion of the lens array main body that is connected to an end portion of the first plate-shaped portion on the second direction side and the optical transmission body side, faces the end face of the optical transmission body in the second direction, and has a same refractive index as the first plate-shaped portion;

first lens faces in a plurality of rows, in which a plurality of first lens faces are formed in an array along the first direction on a first surface of the first plate-shaped portion facing the photoelectric conversion device and the first lens faces are formed in a plurality of rows in parallel along the second direction, each on which the light emitted from each light-emitting element in the plurality of rows is incident;

second lens faces in a plurality of rows, in which a plurality of second lens faces are formed in an array along the first direction on a second surface of the second plate-shaped portion facing the end face of the optical transmission body and the second lens faces are formed in a plurality of rows in parallel along the third direction, each emitting the light of each light-emitting element in the plurality of rows that has been incident on each first lens face in the plurality of rows towards the end face of the optical transmission body;

third lens faces in a plurality of rows, in which a plurality of third lens faces are formed in an array along the first direction on the first surface in a position on the second direction side and the second plate-shaped portion side in relation to the first lens faces in the plurality of rows and the third lens faces are formed in a plurality of rows in parallel along the second direction, each emitting the monitor light of each light-emitting element in the plurality of rows that has been incident from an inner side of the first plate-shaped portion towards the light-receiving elements in the plurality of rows;

a prism that is disposed to provide a predetermined gap on the third direction side and the photoelectric conversion device side in relation to a third surface on a side opposite to the first surface of the first plate-shaped portion, and forms an optical path of the light of each light-emitting element in the plurality of rows after being incident on the first lens faces in the plurality of rows;

a first prism surface that forms a portion of a surface of the prism and is disposed in a position facing the third surface, on which the light of each light-emitting element in the plurality of rows that has been incident on the first lens faces in the plurality of rows is incident;

a second prism surface that forms a portion of the surface of the prism, has a predetermined slope angle in relation to the first prism surface to slope towards the second plate-shaped portion side as the second prism surface becomes farther from the first prism surface, and totally reflects the light of each light-emitting element in the plurality of rows that has been incident on the first prism surface towards the second lens faces in the plurality of rows;

a third prism surface that forms a portion of the surface of the prism, has a predetermined slope angle in relation to the first prism surface to slope towards a side opposite to the second plate-shaped portion as the third prism surface becomes farther from the first prism surface, on which the light of each light-emitting element in the plurality of rows that has been totally reflected by the second prism surface is incident;

a reflection/transmission layer formed on the third prism surface that reflects the light of each light-emitting element in the plurality of rows that has been incident on the third prism surface towards a side of the third lens faces in the plurality of rows as the monitor light of each light-emitting element in the plurality of rows at a predetermined reflectance, and transmits the light of each light-emitting element in the plurality of rows towards the side of the second lens faces in the plurality of rows at a predetermined transmittance;

a first filler material that fills an area between the third surface and the first prism surface; and a second filler material that fills an area between the reflection/transmission layer and a fourth surface of the second plate-shaped portion on a side opposite to the second surface, and of which a refractive index difference with the prism is a predetermined value or less.

2. The lens array according to claim 1, wherein:
the third surface is formed to be perpendicular to an optical axis of the first lens faces in the plurality of rows; and
the first prism surface is disposed in parallel with the third surface.

3. The lens array according to claim 1, wherein:
the fourth surface is formed to be perpendicular to an optical axis of the second lens faces in the plurality of rows, and such that the light of each light-emitting element in the plurality of rows that has passed through the reflection/transmission layer is perpendicularly incident from the second filler material side.

4. The lens array according to claim 1, wherein:
the second prism surface is formed having a slope angle of 45° in relation to the first prism surface; and
the third prism surface is formed having a slope angle that is a right angle to the second prism surface and 45° in relation to the first prism surface.

5. An optical module comprising:
a lens array according to claim 1; and
a photoelectric conversion device, wherein the lens array is disposed between the photoelectric conversion device and an optical transmission body and is capable of optically coupling a plurality of light-emitting elements and an end face of the optical transmission body, in which the photoelectric conversion device the plurality of light-emitting elements and a plurality of light-receiving elements are formed, the plurality of light-receiving elements each receiving, respectively, monitor light of each light-emitting element for monitoring light emitted from the plurality of light-emitting elements, wherein the photoelectric conversion device is a photoelectric conversion device which is disposed in which a row of the light-emitting elements formed by the plurality of light-emitting elements being arrayed along a predetermined first direction are arrayed in parallel in a plurality of rows along a predetermined second direction that is perpendicular to the first direction, and a row of the light-receiving elements formed by the plurality of light-receiving elements being arrayed along the first direction in a position on the second direction side and the optical transmission body side in relation to the light-emitting elements in the plurality of rows are arrayed in parallel in a plurality of rows along the second direction.

6. A lens array disposed between a first photoelectric conversion device for optical transmission and reception and an optical transmission body, which lens array is capable of optically coupling a plurality of light-emitting elements and an end face of the optical transmission body for optical transmission and is capable of optically coupling the end face of the optical transmission body and a plurality of second light-receiving elements for optical reception, in which first photoelectric conversion device the plurality of light-emitting elements, a plurality of first light-receiving elements, and the plurality of second light-receiving elements are formed, the plurality of first light-receiving elements each receiving, respectively, monitor light of each light-emitting element for monitoring light emitted from the plurality of light-emitting elements, and the plurality of second light-receiving elements receiving light transmitted through the optical transmission body, wherein:

as the first photoelectric conversion device, a first photoelectric conversion device is disposed in which the plurality of light-emitting elements are formed in an array along a predetermined first direction, the plurality of first light-receiving elements are formed in an array along the first direction in a position on a second direction side perpendicular to the first direction and the optical transmission body side in relation to the row of light-emitting elements, and the plurality of second light-receiving elements are formed in an array along the first direction in a position on the second direction side and a side opposite to the optical transmission body in relation to the row of first light-receiving elements; and the lens array includes
a first plate-shaped portion of a lens array main body that faces the first photoelectric conversion device in a third direction perpendicular to the first direction and the second direction;

a second plate-shaped portion of the lens array main body that extends from an end portion of the first plate-shaped portion on the second direction side and the optical transmission body side towards the third direction and a side opposite to the first photoelectric conversion device, faces the end face of the optical transmission body in the second direction, and has a same refractive index as the first plate-shaped portion;

a plurality of first lens faces that are formed in an array along the first direction on a first surface of the first plate-shaped portion facing the first photoelectric conversion device, each on which the light emitted of each of the plurality of light-emitting elements is incident;

a plurality of second lens faces that are formed in an array along the first direction on a second surface of the second plate-shaped portion facing the end face of the optical transmission body, each emitting the light emitted of each of the plurality of light-emitting elements that has been incident on each of the plurality of first lens faces towards the end face of the optical transmission body;

a plurality of third lens faces that are formed in an array along the first direction on the first surface in a position on the second direction side and the second plate-shaped portion side in relation to the row of first lens faces, each emitting the monitor light of each of the plurality of light-emitting elements that has been incident from an inner side of the first plate-shaped portion towards the plurality of first light-receiving elements;

a plurality of fourth lens faces that are formed in an array along the first direction on the second surface in a position on the third direction side in relation to the row of second lens faces, on which transmitted light emitted from the end face of the optical transmission body is incident;

a plurality of fifth lens faces that are formed in an array along the first direction on the first surface in a position on the second direction side and a side opposite to the second plate-shaped portion in relation to the row of third lens faces, each emitting the transmitted light that has been incident on each of the plurality of fourth lens faces towards the plurality of second light-receiving elements;

a prism that is disposed to provide a predetermined gap on the third direction side and a side opposite to the first photoelectric conversion device in relation to a third surface on a side opposite to the first surface of the first plate-shaped portion, and forms an optical path of the light of each of the plurality of light-emitting elements after being incident on the plurality of first lens faces and an optical path of the transmitted light after being incident on the plurality of fourth lens faces;

a first prism surface that forms a portion of a surface of the prism and is disposed in a position facing the third surface, on which the light of each of the plurality of light-emitting elements after being incident on the plurality of first lens faces is incident, and that transmits the transmitted light that has been incident from the inner side of the prism and after being incident on the plurality of fourth lens faces towards the plurality of fifth lens faces side;

a second prism surface that forms a portion of the surface of the prism, has a predetermined slope angle in relation to the first prism surface to slope towards the second plate-shaped portion side as the second prism surface becomes farther from the first prism surface, totally reflects the light of each of the plurality of light-emitting elements that has been incident on the first prism surface towards the plurality of second lens faces, and totally reflects the transmitted light that has been incident from the inner side of the prism and after being incident on the plurality of fourth lens faces and before being incident on the first prism surface towards the first prism surface;

a third prism surface that forms a portion of the surface of the prism, has a predetermined slope angle in relation to the first prism surface to slope towards a side opposite to the second plate-shaped portion as the third prism surface becomes farther from the first prism surface, on which the light of each of the plurality of light-emitting elements that has been totally reflected by the second prism surface is incident from the inner side of the prism, and on which the transmitted light after being incident on the plurality of fourth lens faces and before being incident on the second prism surface is incident and that transmits the incident transmitted light towards the second prism surface;

a reflection/transmission layer formed on the third prism surface over a predetermined area including an incidence position of the light of each of the plurality of light-emitting elements and excluding an incidence position of the transmitted light, that reflects the light of each of the plurality of light-emitting elements that has been incident on the third prism surface towards the plurality of third lens faces as the monitor light of each of the plurality of light-emitting elements at a predetermined reflectance, and transmits the light of each of the plurality of light-emitting elements towards the plurality of second lens faces side at a predetermined transmittance; a first filler material that fills an area between the third surface and the first prism surface; and a second filler material that fills an area between the third prism surface and a fourth surface of the second plate-shaped portion on a side opposite to the second surface, and of which a refractive index difference with the prism is a predetermined value or less.

7. The lens array according to claim 6, wherein:

in the first photoelectric conversion device, the row of second light-receiving elements is disposed in a position between the row of light-emitting elements and the row of first light-receiving elements;

the row of fifth lens faces is disposed in a position between the row of first lens faces and the row of third lens faces;

in the second prism surface, a total-reflection position of the light of each of the plurality of light-emitting elements is set further to the first plate-shaped portion side than a total-reflection position of the transmitted light;

in the third prism surface, an incidence position of the light of each of the plurality of light-emitting elements is set further to the first plate-shaped portion side than an incidence position of the transmitted light;

the reflection/transmission layer is formed in part of an area of the third prism surface on the first plate-shaped portion side; and the row of second lens faces is disposed in a position on the third direction side and the first-plate shaped portion side in relation to the row of fourth lens faces.

8. The lens array according to claim 6, wherein:

in the first photoelectric conversion device, the row of second light-receiving elements is disposed in a position on the second direction side and a side opposite to the optical transmission body in relation to the row of light-emitting elements;

the row of fifth lens faces is disposed in a position on the second direction side and a side opposite to the second plate-shaped portion in relation to the row of first lens faces;

in the second prism surface, a total-reflection position of the light of each of the plurality of light-emitting elements is set further on a side opposite to the first plate-shaped portion than a total-reflection position of the transmitted light;

in the third prism surface, an incidence position of the light of each of the plurality of light-emitting elements is set further to a side opposite to the first plate-shaped portion than an incidence position of the transmitted light;

the reflection/transmission layer is formed in part of an area of the third prism surface on a side opposite to first plate-shaped portion;

the row of second lens faces is disposed in a position on the third direction side and a side opposite to the first-plate shaped portion in relation to the row of fourth lens faces.

9. The lens array according to claim 6, wherein:

the third surface is formed to be perpendicular to an optical axis of the plurality of first lens faces; and the first prism surface is disposed in parallel with the third surface.

10. The lens array according to claim 6, wherein:

the fourth surface is formed to be perpendicular to an optical axis of the plurality of second lens faces, and such that the light of each of the plurality of light-mitting elements that has passed through the reflection/transmission layer is perpendicularly incident from the second filler material side.

11. The lens array according to claim 6, wherein:
the second prism surface is formed having a slope angle of 45° in relation to the first prism surface; and
the third prism surface is formed having a slope angle that is a right angle to the second prism surface and 45° in relation to the first prism surface.

12. The lens array according to claim 6, wherein:
instead of the first photoelectric conversion device, as a second photoelectric conversion device that is optical transmission-dedicated, the second photoelectric conversion device is disposed that has a plurality of the row of light-emitting elements by the row of light-emitting elements being formed instead of the row of second light-receiving elements, and has a plurality of the row of first light-receiving elements in correspondence with the plurality of rows of light-emitting elements, and in a state in which, instead of the prism in which the reflection/transmission layer is formed over the predetermined area on the third prism surface, the prism is disposed in which the reflection/transmission layer is formed on the overall third prism surface, is capable of optically coupling the plurality of rows of light-emitting elements with end face of the optical transmission body as that dedicated to optical transmission;
a plurality of rows of third lens faces are disposed to be adjacent to each other in the second direction on the first surface;
in a usage state as that dedicated to optical transmission,
the light of each of the plurality of light-emitting elements of a row differing from a row corresponding to the plurality of first lens faces in the plurality of rows of light-emitting elements is incident on the plurality of fifth lens faces,
the light of each of the plurality of light-emitting elements that has been incident on the plurality of fifth lens faces is incident on the first prism surface,
the second prism surface totally reflects the light of each of the plurality of light-mitting elements that has been incident on the first prism surface after being incident on the plurality of fifth lens faces towards the plurality of fourth lens faces,
the reflection/transmission layer reflects the light of each of the plurality of light-emitting elements that has been incident on the third prism surface after having passed through the plurality of fifth lens faces, the first prism surface, and the second prism surface towards the plurality of third lens faces in a row differing from a row corresponding with the plurality of first lens faces in the plurality of rows of third lens faces at a predetermined reflectance as the monitor light of each of the plurality of light-emitting elements, and transmits the light towards the plurality of fourth lens faces side at a predetermined transmittance; and
the plurality of fourth lens faces each emit the light of each of the plurality of light-emitting elements that has been transmitted by the reflection/transmission layer towards the end face of the optical transmission body.

13. An optical module used for optical transmission and reception, the optical module comprising:
a lens array according to claim 6; and
a first photoelectric conversion device, wherein the lens array is disposed between the first photoelectric conversion device for optical transmission and reception and an optical transmission body, which lens array is capable of optically coupling a plurality of light-emitting elements and an end face of the optical transmission body for optical transmission and is capable of optically coupling the end face of the optical transmission body and a plurality of second light-receiving elements for optical reception, in which first photoelectric conversion device the plurality of light-emitting elements, a plurality of first light-receiving elements, and the plurality of second light-receiving elements are formed, the plurality of first light-receiving elements each receiving, respectively, monitor light of each light-emitting element for monitoring light emitted from the plurality of light-emitting elements, and the plurality of second light-receiving elements receiving light transmitted through the optical transmission body, wherein the first photoelectric conversion device is a first photoelectric conversion device which is disposed in which the plurality of light-emitting elements are formed in an array along a predetermined first direction, the plurality of first light-receiving elements are formed in an array along the first direction in a position on a second direction side perpendicular to the first direction and the optical transmission body side in relation to the row of light-emitting elements, and the plurality of second light-receiving elements are formed in an array along the first direction in a position on the second direction side and a side opposite to the optical transmission body in relation to the row of first light-receiving elements.

14. A lens array disposed between a photoelectric conversion device and an optical transmission body, which lens array is capable of optically coupling a plurality of light-emitting elements and an end face of the optical transmission body, in which photoelectric conversion device the plurality of light-emitting elements and a plurality of light-receiving elements are formed, the plurality of light-receiving elements each receiving, respectively, monitor light of each light-emitting element for monitoring light emitted from the plurality of light-emitting elements, wherein:
as the photoelectric conversion device, a photoelectric conversion device is disposed in which a row of the light-emitting elements formed by the plurality of light-emitting elements being arrayed along a predetermined first direction are arrayed in parallel in a plurality of rows along a predetermined second direction that is perpendicular to the first direction, and a row of the light-receiving elements formed by the plurality of light-receiving elements being arrayed along the first direction in a position on the second direction side and the optical transmission body side in relation to the light-emitting elements in the plurality of rows are arrayed in parallel in a plurality of rows along the second direction; and
the lens array includes
a first lens member that faces the photoelectric conversion device in a third direction perpendicular to the first direction and the second direction;
a second lens member that is bonded to the first lens member and faces the end face of the optical transmission body in the second direction; in which
the first lens member includes
first lens faces in a plurality of rows, in which a plurality of first lens faces are formed in an array along the first direction on a surface facing the photoelectric conversion device and the first lens faces are formed in a plurality of rows in parallel along the second direction, each on which the light emitted from each light-emitting element in the plurality of rows is incident, third lens faces in a plurality of rows, in which a plurality of third lens faces are formed in an array along the first direction on the surface facing the photoelectric conversion device in a position on the second direction side and the optical transmission body side in relation to the first lens faces in the plurality of rows and the third lens faces are formed in a plurality of rows in parallel along the second direction, each emitting the monitor light of each light-emitting element in the plurality of rows that has been incident from an inner side of the first lens member towards the light-receiving elements in the plurality of rows, a first sloped surface that is disposed on the surface facing the photoelectric conversion device on a side opposite to the photoelectric conversion device, has a predetermined slope angle in relation to the surface facing the photoelectric conversion device to slope towards the optical transmission body side as the first sloped surface becomes farther from the surface, and totally reflects the light of each light-emitting element in the plurality of rows that has been incident on each of the first lens faces in the plurality of rows towards the optical transmission body side, and a second sloped surface that is disposed on the surface facing the photoelectric conversion device on a side opposite to the photoelectric conversion device and on the optical transmission body side in relation to the first sloped surface, has a predetermined slope angle in relation to the surface facing the photoelectric conversion device to slope towards a side opposite to the optical transmission body as the second sloped surface becomes farther from the surface, on which the light of each light-emitting element in the plurality of rows that has been totally reflected by the first slope surface is incident, the second lens member includes a third sloped surface that has a predetermined slope angle in relation to a surface facing the end face of the optical transmission body to slope towards a side opposite to the photoelectric conversion device as the third sloped surface becomes farther from the surface, faces the second sloped surface with a predetermined gap therebeween, and on which the light of each light-emitting element in the plurality of rows that has been incident on the second slope surface is incident, and second lens faces in a plurality of rows, in which a plurality of second lens faces are formed in an array along the first direction on the surface facing the end face of the optical transmission body and the second lens faces are formed in a plurality of rows in parallel along the third direction, each emitting the light of each light-emitting element in the plurality of rows that has been incident on the third slope surface towards the end face of the optical transmission body;

an area between the second sloped surface and the third sloped surface is filled by a filler material of which a refractive index difference with the first lens member and the second lens member is a predetermined value or less; and a reflection/transmission layer is formed on the second sloped surface or the third sloped surface, the reflection/transmission layer reflecting the light of each light-emitting element in the plurality of rows that has been incident on the second sloped surface towards a side of the third lens faces in the plurality of rows as the monitor light of each light-emitting element in the plurality of rows at a predetermined reflectance, and transmitting the light of each light-emitting element in the plurality of rows towards the third sloped surface side at a predetermined transmittance.

15. The lens array according to claim 14, wherein:
the third sloped surface is a recessing plane that is formed in a recessing manner ensure space to be filled with the filler material;
the second lens member has a stepped surface on an outer side of the third sloped surface that projects further towards the first lens member side than the third sloped surface and is parallel with the second sloped surface;
the second sloped surface is formed into a surface that is flat over an area corresponding to the third sloped surface and the stepped surface;
the reflection/transmission layer is formed on the second sloped surface; and
the first lens member and the second lens member are bonded in a state in which the stepped surface and the second sloped surface are in contact.

16. The lens array according to claim 14, wherein:
the second sloped surface is a recessing plane that is formed in a recessing manner ensure space to be filled with the filler material;
the first lens member has a stepped surface on an outer side of the second sloped surface that projects further towards the second lens member side than the second sloped surface and is parallel with the third sloped surface;
the third sloped surface is formed into a surface that is flat over an area corresponding to the second sloped surface and the stepped surface;
the reflection/transmission layer is formed on the third sloped surface; and
the first lens member and the second lens member are bonded in a state in which the stepped surface and the third sloped surface are in contact.

17. The lens array according to claim 15, wherein:
a contact surface on the first lens member side and a contact surface on the second lens member side are respectively formed on the first lens member and the second lens member, the contact surfaces respectively extending from the stepped surface and the sloped surface in contact therewith and coming into contact with each other in a state having a predetermined angle in relation to the stepped surface and the sloped surface.

18. The lens array according to any one of claims 14, wherein:
the first sloped surface is formed having a slope angle of 45° in relation to the surface facing the photoelectric conversion device;
the second sloped surface is formed having a slope angle that is a right angle to the first sloped surface and 45° in relation to the surface facing the photoelectric conversion device; and
the third sloped surface is formed having a slope angle of 45° in relation to the surface facing the end face of the optical transmission body.

19. An optical module comprising:
a lens array according to claim 14; and
a photoelectric conversion device, wherein the lens array is disposed between a photoelectric conversion device and an optical transmission body and is capable of optically coupling a plurality of light-emitting elements and an end face of the optical transmission body, in which photoelectric conversion device the plurality of light-emitting elements and a plurality of light-receiving elements are formed, the plurality of light-receiving elements each receiving, respectively, monitor light of each light-emitting element for monitoring light emitted from the plurality of light-emitting elements, wherein the photoelectric conversion device is a photoelectric conversion device which is disposed in which a row of the light-emitting elements formed by the plurality of light-emitting elements being arrayed along a predetermined first direction are arrayed in parallel in a plurality of rows along a predetermined second direction that is perpendicular to the first direction, and a row of the light-receiving elements formed by the plurality of light-receiving elements being arrayed along the first direction in a position on the second direction side and the optical transmission body side in relation to the light-emitting elements in the plurality of rows are arrayed in parallel in a plurality of rows along the second direction.

\* \* \* \* \*